United States Patent
Watari

(10) Patent No.: US 8,010,797 B2
(45) Date of Patent: Aug. 30, 2011

(54) ELECTRONIC APPARATUS AND RECORDING MEDIUM STORING PASSWORD INPUT PROGRAM

(75) Inventor: Masakazu Watari, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 982 days.

(21) Appl. No.: 11/672,346

(22) Filed: Feb. 7, 2007

(65) Prior Publication Data

US 2007/0198847 A1 Aug. 23, 2007

Related U.S. Application Data

(63) Continuation-in-part of application No. 11/419,774, filed on May 23, 2006, now abandoned.

(30) Foreign Application Priority Data

Feb. 20, 2006 (JP) .................................. 2006-042818
Nov. 24, 2006 (JP) .................................. 2006-317001

(51) Int. Cl.
*G06F 21/00* (2006.01)
(52) U.S. Cl. .......................................... 713/183; 726/28
(58) Field of Classification Search ........................ None
See application file for complete search history.

(56) References Cited

U.S. PATENT DOCUMENTS

| | | | | |
|---|---|---|---|---|
| 4,962,530 A * | 10/1990 | Cairns | ............................ | 713/183 |
| 5,428,349 A * | 6/1995 | Baker | ............................ | 340/5.54 |
| 5,940,511 A * | 8/1999 | Wilfong | ............................ | 713/183 |
| 6,549,194 B1 * | 4/2003 | McIntyre et al. | .............. | 345/173 |
| 6,658,574 B1 * | 12/2003 | Anvekar | ............................ | 726/16 |
| 7,539,874 B2 * | 5/2009 | Waterland | ............................ | 713/183 |
| 7,735,124 B2 * | 6/2010 | Lin et al. | ............................ | 726/7 |
| 2005/0162407 A1 * | 7/2005 | Sakurai et al. | ................. | 345/173 |
| 2005/0254650 A1 * | 11/2005 | Sakurai et al. | ................. | 380/268 |
| 2006/0005039 A1 * | 1/2006 | Hsieh | ............................ | 713/183 |
| 2006/0136737 A1 * | 6/2006 | Bauchot et al. | ................. | 713/183 |
| 2006/0161786 A1 * | 7/2006 | Rao | ............................ | 713/183 |
| 2006/0196929 A1 * | 9/2006 | Kelley et al. | .................. | 235/380 |
| 2007/0209014 A1 * | 9/2007 | Youmtoub | ..................... | 715/771 |
| 2009/0037986 A1 * | 2/2009 | Baker | ............................ | 726/5 |

FOREIGN PATENT DOCUMENTS

| | | |
|---|---|---|
| JP | 05-224802 | 9/1993 |
| JP | 07-210286 | 8/1995 |
| JP | 2000-029609 | 1/2000 |
| JP | 2005-018569 | 1/2005 |
| JP | 2005-078251 | 3/2005 |
| JP | 2005-174023 | 6/2005 |

* cited by examiner

*Primary Examiner* — Nathan Flynn
*Assistant Examiner* — Michael R Vaughan
(74) *Attorney, Agent, or Firm* — Fujitsu Patent Center

(57) ABSTRACT

The present invention relates to password input and contributes to facilitation and acceleration of the input. An electronic apparatus that accepts password input, comprising a displaying unit that includes a plurality of display positions displaying candidate symbols of a password, a processing unit that displays the candidate symbols at the display positions of the displaying unit, and an input unit that allows the candidate symbols to be selected with select buttons corresponding to the display positions of the displaying unit to input the password.

22 Claims, 41 Drawing Sheets

ELECTRONIC APPARATUS AND RECORDING MEDIUM STORING PASSWORD INPUT PROGRAM

CROSS-REFERENCE TO RELATED APPLICATIONS

This application is a continuation-in-part of application Ser. No. 11/419,774 filed May 23, 2006, now abandoned, and is based upon and claims the benefit of priority from the prior Japanese Patent Application No. 2006-42818, filed on Feb. 20, 2006, and Japanese Patent Application No. 2006-317001, filed on Nov. 24, 2006, the entire contents of which are incorporated herein by reference.

BACKGROUND OF THE INVENTION

1. Field of the Invention

The present invention relates generally to input of a password used for personal identification (authentication), and, more particularly, to an electronic apparatus able to perform password input with a simple input operation and a recording medium storing a password input program.

2. Description of the Related Art

When using various electronic apparatuses such as a personal computer, databases, information services, etc., a password such as an identical number is frequently used to authenticate a particular user, etc. This password is input by operating keys assigned with characters and symbols representing the password.

With regard to such password input and authentication thereof, Japanese Patent Application Laid-Open Publication No. H07 (1995)-210286 discloses that: in order to prevent that some keys not used on a keyboard are operated carelessly, a table directing key function to be invalid is provided for function of keyboard; it is checked whether or not invalidation is directed to key information generated by key operation of the keyboard by the table; if the key information is directed to be invalid, mask processing is carried out for the key information (abstract, paragraph No. 0002, FIG. 1, etc.).

Japanese Patent Application Laid-Open Publication No. 2000-29609 discloses generating password input display and a dummy symbols with use of random numbers, and arranging the password input display and the dummy symbols randomly (abstract, FIG. 2, etc.).

Japanese Patent Application Laid-Open Publication No. H05(1993)-224802 discloses that private codes and dummy codes are displayed on keytops randomly to compare codes inputted in series from the keytops with private codes stored in a private code storing circuit (abstract, FIG. 1, etc.).

By the way, in the invalidation of the key function of the keyboard (Japanese Patent Application Laid-Open Publication No. H07(1995)-210286), and the random arranging display of the password, private codes and dummy symbols, dummy codes (Japanese Patent Application Laid-Open Publication Nos. 2000-29609 and H05 (1993)-224802), since a user must respond to the invalidated key and the display thereof and it takes time to input a password, the password may be recognized by other persons from the operation. As the number of characters of a password is increased, it may take more time to input the password.

If keys corresponding to candidate characters of a password are required for inputting the password, the number of the keys must correspond to the number of the characters constituting the password and the password may be stolen by other persons.

Japanese Patent Application Laid-Open Publication Nos. H07 (1995)-210286, 2000-29609 and H05 (1993)-224802 do not disclose or indicate such problems and do not disclose means for solving the problems or do not include a concept thereof.

SUMMARY OF THE INVENTION

An object of the present invention relates to the password input and is to contribute to facilitation and acceleration of the input.

Another object of the present invention relates to the password input and is to increase a security.

Still another object of the present invention relates to the password input and is to reduce necessary input keys to contribute to accelerating the password input.

The present invention relates to an electronic apparatus accepting a password input, and achieves the above objects by setting invalidating of pressing down of select buttons at an input unit corresponding to a plurality of display positions set at a displaying unit displaying candidate symbols of a password and displaying the candidate symbols randomly at the display positions to select the candidate symbols of the display positions with pressing down of the invalidated select buttons to input the password. The candidate symbols include characters, graphics, etc.

To achieve the above objects, a first aspect of the present invention is an electronic apparatus that accepts password input, comprising a displaying unit that includes a plurality of display positions displaying candidate symbols of a password; a processing unit that displays the candidate symbols at the display positions of the displaying unit; and an input unit that allows the candidate symbols to be selected with select buttons corresponding to the display positions of the displaying unit to input the password.

In such a configuration, a plurality of the display positions for displaying the candidate symbols of the password is set at the displaying unit, and the select buttons of the input unit are set correspondingly to each display position of the displaying unit. That is, if a plurality of display positions exists, a symbol string constituted by the candidate characters of the number of the display positions is randomly displayed at certain timing. By operating the select buttons corresponding to the display positions of the candidate symbols corresponding to the password to select the candidate symbols, the password can be input and the above objects are achieved.

To achieve the above objects, preferably, the electronic apparatus comprises a random-number generating unit that generates random numbers; and a database that stores the candidate symbols of the password, wherein the processing unit acquires the candidate symbols from the database and displays the candidate symbols at the display positions of the displaying unit, using the random numbers acquired from the random-number generating unit.

In such a configuration, the candidate symbols acquired from the database are randomly displayed at the display positions; if a plurality of display positions exists, the symbol string may be displayed correspondingly to the number thereof; and the password can be input by selecting the candidate symbols with the select button corresponding to the candidate symbols of the password.

To achieve the above objects, preferably, in the electronic apparatus, the processing unit sets invalidation of pressing down of the select button to invalidate the candidate symbol selected with the select button to which the invalidation is set.

To achieve the above objects, preferably, in the electronic apparatus, the processing unit sets permission of display not including a candidate character applicable to the password at the display positions of the displaying unit to display the candidate symbols at the display positions.

To achieve the above objects, preferably, the electronic apparatus comprises a displaying unit in common with the displaying unit having the display positions or a displaying unit built separately from the displaying unit, wherein the displaying unit displays a dialogue display screen for setting any one or plural out of invalidation of pressing down of the select button, selection of the select button to which the invalidation is set, permission of display not including a candidate character applicable to the password at the display positions, or permission of display of a candidate character applicable to the password at the display position corresponding to the select button to which the invalidation is set.

To achieve the above objects, preferably, in the electronic apparatus, an input unit in common with the input unit provided with the select buttons corresponding to the display positions of the display unit or an input unit separate from the input unit is configured, and one or more of the select buttons in the input unit is selected to set invalidation of pressing down of the selected select button.

To achieve the above objects, preferably, in the electronic apparatus, the processing unit sets to permit to display the candidate symbol applicable to the password at the display position corresponding to the select button to which invalidation is set, so as to display the candidate symbol at the display position.

To achieve the above objects, preferably, in the electronic apparatus, the processing unit selects setting for invalidating of pressing down of the select button and setting for permitting to display the candidate symbol applicable to the password at the display position corresponding to the select button to which the invalidation is set, so as to make it possible to set to prioritize which of the settings.

To achieve the above objects, preferably, in the electronic apparatus, the processing unit sets input of a candidate symbol not applicable to the password at the display position corresponding to the select button after completion of input of the candidate symbols applicable to the password.

To achieve the above objects, preferably, in the electronic apparatus, the displaying unit is constituted by a portion of a main display or a sub-display that is installed in the electronic apparatus.

To achieve the above objects, preferably, in the electronic apparatus, the displaying unit is constituted by images on a display screen.

To achieve the above objects, preferably, in the electronic apparatus, the select buttons are constituted by images on a display screen.

To achieve the above objects, preferably, in the electronic apparatus, the candidate symbols include characters or graphics.

To achieve the above objects, a second aspect of the present invention is computer-readable recording medium storing a password input program, the password input program comprises the steps of generating candidate symbols of a password; displaying the generated candidate symbols at a plurality of display positions; and allowing the candidate symbols to be selected with select buttons corresponding to the display positions to input the password.

To achieve the above objects, preferably, the password input program comprises the steps of generating random numbers; and using the random numbers to acquire the candidate symbols of the password stored in a database.

To achieve the above objects, preferably, the password input program comprises the steps of setting invalidation of pressing down of the select button; and invalidating the candidate symbol selected by the select button to which the invalidation is set.

To achieve the above objects, preferably, the password input program comprises the steps of setting permission of display not including a candidate character applicable to the password at the display positions; and displaying the candidate symbols at the display positions.

To achieve the above objects, preferably, the password input program comprises the step of displaying a dialogue display screen for setting any one or plural out of invalidation of pressing down of the select button, selection of the select button to which the invalidation is set, permission of display not including a candidate character applicable to the password at the display positions, or permission of display of a candidate character applicable to the password at the display position corresponding to the select button to which the invalidation is set.

To achieve the above objects, preferably, the password input program comprises the step of setting permission to display the candidate symbol applicable to the password at the display position corresponding to the select button to which invalidation is set.

To achieve the above objects, preferably, the password input program comprises the steps of selecting setting for invalidating of pressing down of the select button and setting for permitting to display the candidate symbol applicable to the password at the display position corresponding to the select button to which invalidation is set; and setting prioritization of which of the settings.

To achieve the above objects, preferably, the password input program comprises the step of setting input of a candidate symbol not applicable to the password at the display position corresponding to the select button after completion of input of the candidate symbols applicable to the password.

To achieve the above objects, preferably, the password input program comprises the step of generating the display positions on images on a display screen.

To achieve the above objects, preferably, the password input program comprises the step of taking in the candidate symbol at the display position by selecting the select button.

To achieve the above objects, preferably, the password input program comprises the step of generating the select buttons on images on a display screen.

The features and advantages of the present invention are listed as follows.

(1) A password can be input by a simple operation to accelerate the password input.

(2) The security of passwords and the input thereof can be enhanced.

(3) Input keys or key operations necessary for the password input can be reduced to input a password quickly.

Other objects, features, and advantages of the present invention will become more apparent with reference to the accompanying drawings and embodiments.

BRIEF DESCRIPTION OF THE DRAWINGS

FIGS. 7A, 7B, 7C, 7D, 7E, 7F, 7G, 7H, and 7I show the display of the candidate symbols and the selection of the select buttons;

DETAILED DESCRIPTION OF THE PREFERRED EMBODIMENTS

First Embodiment

Figure 1:
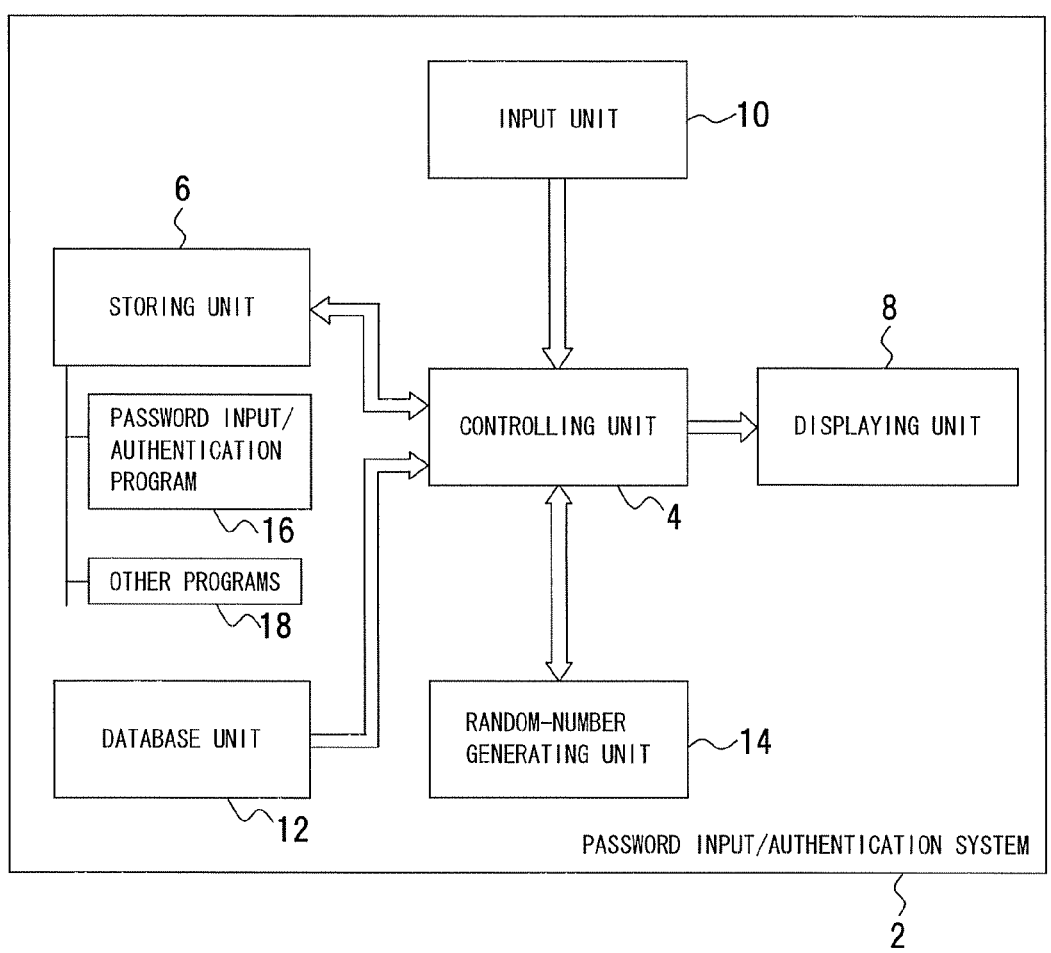
FIG. 1 is a block diagram of one configuration example of a password input/authentication system according to a first example.
Figure 2:
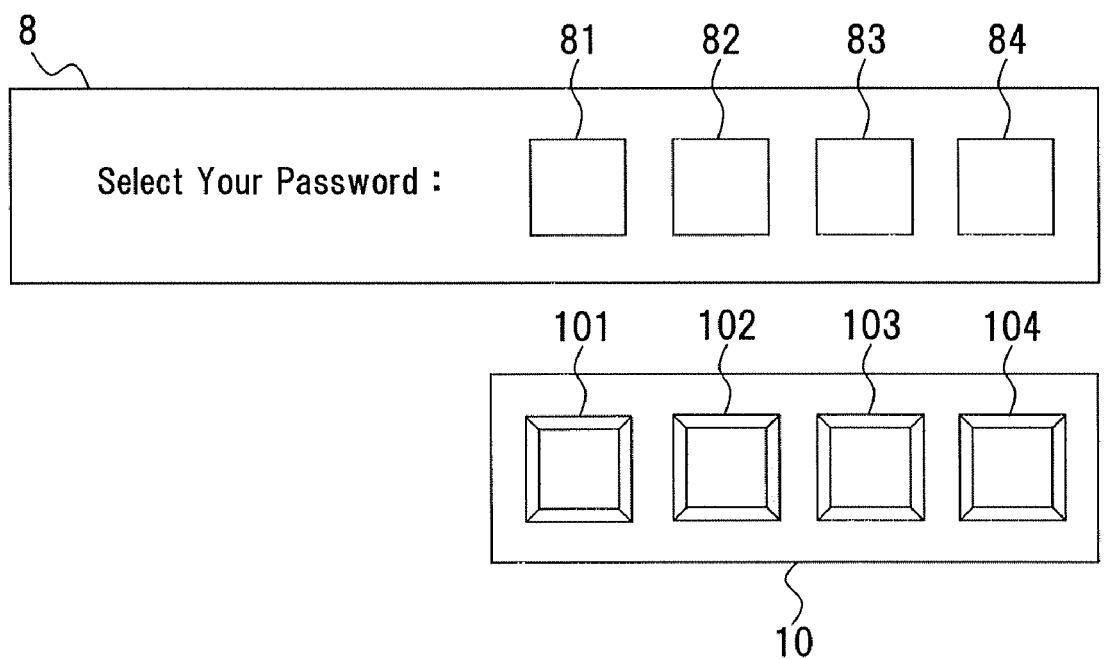
FIG. 2 shows one configuration example of a displaying unit and an input unit.
Figures 3A, 3B:
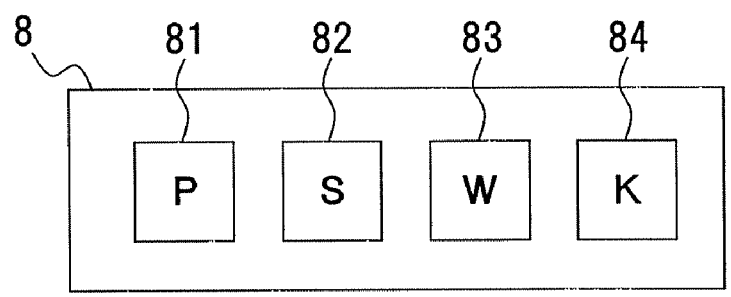
FIGS. 3A and 3B show examples of candidate symbols of a password.

A first embodiment of the present invention will be described with reference to FIGS. 1, 2, 3A, and 3B. FIG. 1 is a block diagram of one configuration example of a password input/authentication system; FIG. 2 shows one configuration example of a displaying unit and an input unit; and FIGS. 3A and 3B show examples of candidate symbols of a password.

This password input/authentication system 2 is a computer system and is used to input a password and to authenticate the password for various electronic apparatuses such as a personal computer (PC). The password input/authentication system 2 includes a controlling unit 4, a storing unit 6, a displaying unit 8, an input unit 10, a database unit 12, a random-number generating unit 14, etc.

The controlling unit 4 is a processing unit that performs the password input and authentication process, is constituted by, for example, a CPU (Central Processing Unit), executes a password input/authentication program 16, etc. of the storing unit 6, and performs processes such as controlling the read-out of data from the displaying unit 8, the input unit 10, the database unit 12 and the random-number generating unit 14, displaying password data on the displaying unit 8 based on random numbers, controlling the password input from the input unit 10, and determining whether or not the input password is identical to the registered password, etc.

The storing unit 6 is constituted by an on volatile memory, a hard disk device, etc. as a recording medium and stores the password input/authentication program 16 and other programs 18.

The displaying unit 8 is constituted by a sub-display, etc. of an electronic apparatus such as a personal computer and sets a plurality digit of display positions for displaying candidate symbols (FIGS. 3A and 3B) such as characters and symbols constituting a password. The input unit 10 includes a plurality of select buttons corresponding to the display positions of the displaying unit 8 and detects the operated position of the select buttons. As shown in FIG. 2, for example, the displaying unit 8 and input unit 10 are disposed adjacently to correlate the display with the input; in the displaying unit 8, for example, four-digit display positions 81, 82, 83, 84 are set as a plurality of the display positions; and in the input unit 10, for example, select buttons 101, 102, 103, 104 are disposed as a plurality of the select buttons corresponding to the display positions 81, 82, 83, 84. The select buttons 101, 102, 103, 104 may be dedicated keys disposed in the input unit 10 or the input unit 10 may be constituted by a keyboard including symbol keys, etc. to assign arbitrary keys such as the symbol keys on the keyboard.

The database unit 12 is constituted by a nonvolatile memory, ROM (Read-Only Memory), etc. and stores a password established in advance and password data used for the password. The password data are one or more candidate symbols such as alphabetical letters and numeric characters as well as graphics and colors. In this case, the candidate symbols include characters and graphics as well as coloring, etc.

The random-number generating unit 14 is constituted by a ROM, etc. and uses a technique of generating pseudo random numbers to generate pseudo random numbers used for controlling the candidate symbols and the display positions 81, 82, 83, 84 of a password.

As shown in FIG. 3A, the candidate symbols used for a password are displayed on the display positions 81, 82, 83, 84 of the displaying unit 8 to form a symbol string and, as shown in FIG. 3B, the candidate symbols may be any or combination of characters, such as hiragana, alphabet letters, numeric characters, symbols, and katakana, and graphics, such as a circle, a triangle, etc., or may be any forms as long as the symbols can be displayed and recognized at the display positions 81, 82, 83, 84.

In such a configuration, when the password input/authentication program 16 is executed, the random numbers are acquired from the random-number generating unit 14 and the candidate symbols are read as the password data from the database unit 12 to determine the display positions 81, 82, 83, 84 of the candidate symbols with the use of the random numbers. In this case, the read candidate symbols constitute a symbol string and the digit number of symbols corresponds to the display positions 81, 82, 83, 84. That is, the display positions 81, 82, 83, 84 are randomly determined for these candidate symbols by the random numbers. The displayed symbol string includes at least one or more candidate symbols identical to the registered password and the same candidate symbols may be displayed at two display positions, for example, the display positions 81, 82.

When a user operates any select buttons 101, 102, 103, 104 corresponding to the positions of the candidate symbols displayed at the display positions 81, 82, 83, 84, the candidate symbol at that position is selected and input, and if the password is composed of four-digit candidate symbols, four candidate symbols are selected by four input operations to complete the password input. The authentication is performed to determine whether or not the input password is identical to the registered password; the password input is completed if the passwords are identical; and the password must be input again if not identical.

Figure 4:
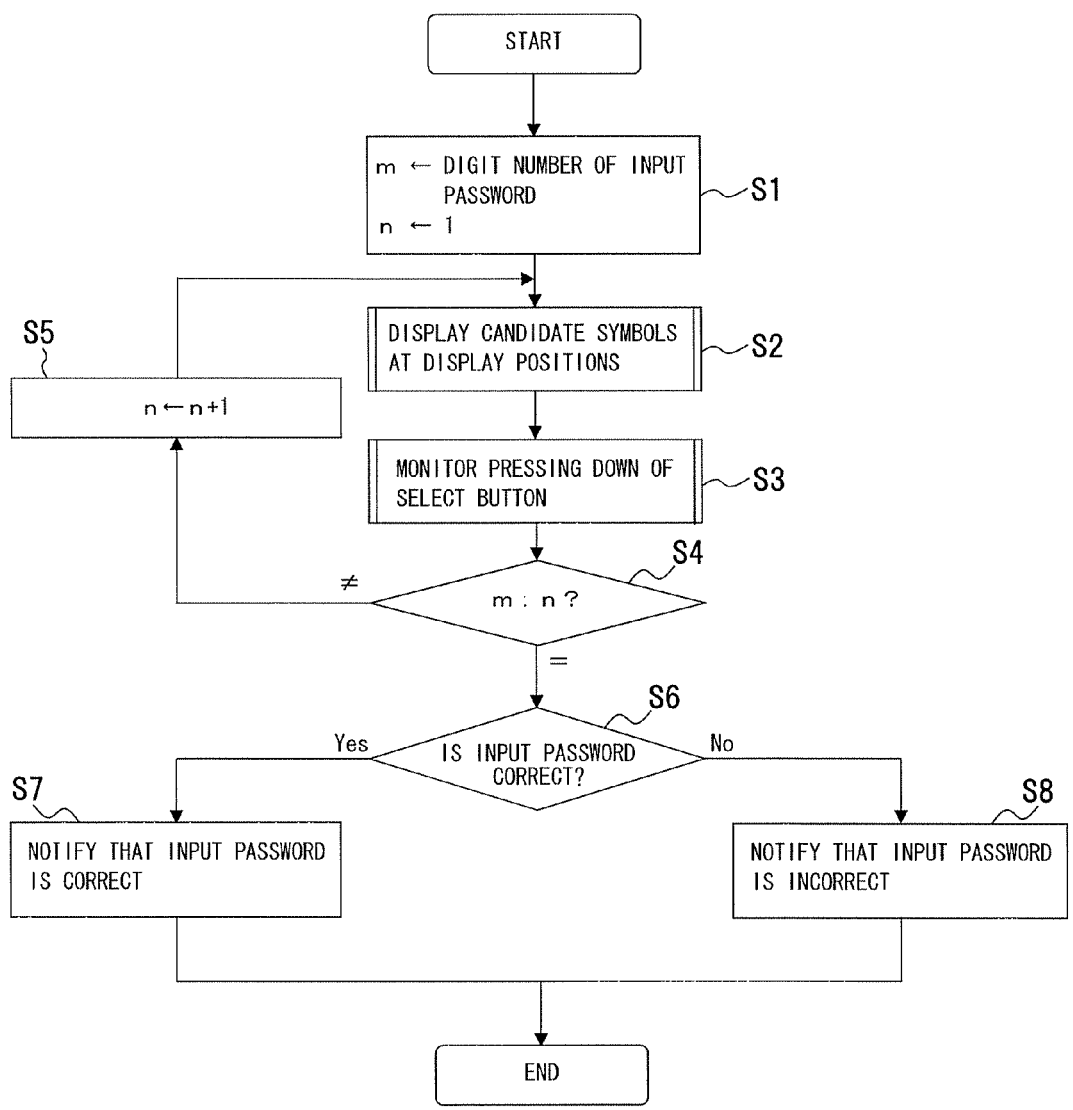
FIG. 4 is a flowchart of a process procedure for password input and authentication.

A process procedure of the password input and authentication will be described with reference to FIG. 4. FIG. 4 is a flowchart of a process procedure for the password input and authentication.

This process includes processes of determining the candidate symbols and the display positions of the password, displaying the password, and authenticating the input password.

The password input/authentication program 16 is executed and the display positions are determined for the candidate symbols, which are password data (step S1). At step S1, m is a digit number of the input password, and when the password is four-digit, m=4. n is a digit position in digit number m and n=1, 2, 3, . . . .

When the nth digit of the password is specified, the nth-digit candidate symbol are picked up from the password data along with candidate symbols of other digits, and these candidate symbols are displayed as input candidate symbols at the display positions 81, 82, 83, 84 of the displaying unit 8 (step S2). The pressing down of the select buttons 101, 102, 103, 104 is monitored correspondingly to the display (step S3); if any one of select button 101, 102, 103, 104 is selected, the number of digits is determined (m:n?) (step S4); a (n+1) process is performed as a process for incrementing the input digit number n until m=n (step S5); and the display of the candidate symbols and the monitoring of the pressing down of the select buttons 101, 102, 103, 104 are performed.

For the input password authentication process, it is determined whether the input password is correct or not, that is, whether the input password is identical to the registered password or not (step S6); if the input password is correct (Yes at step S6), it is notified that the input password is correct (step S7); if the input password is incorrect (No at step S6), it is notified that the input password is incorrect (step S8); and the password input/authentication process is completed. The notification of whether the input password is correct or incorrect may be displayed on the displaying unit 8 or may be displayed on other displaying units of the electronic apparatus.

Figure 5:
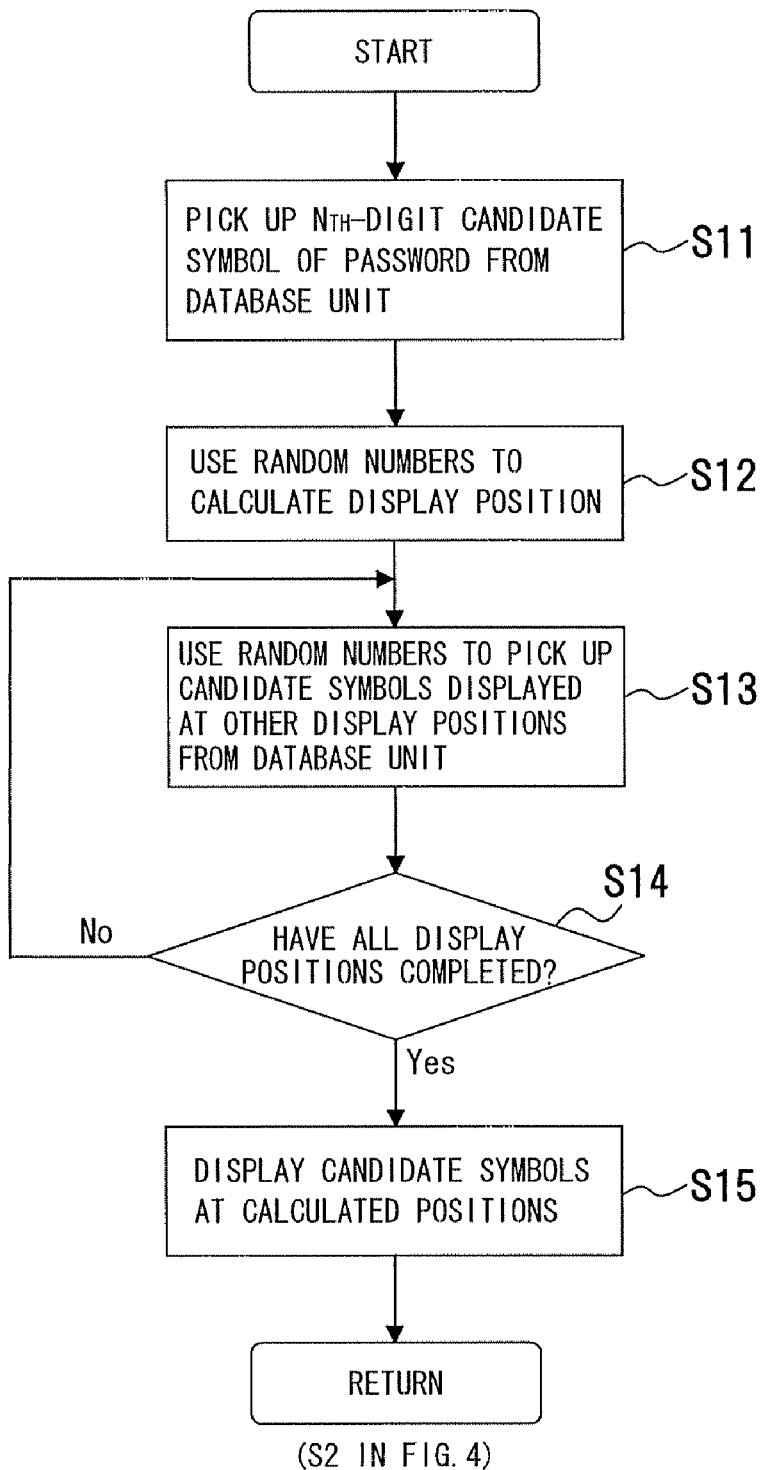
FIG. 5 is a flowchart of an example of a process procedure for input candidates of a password.

Description will be made of the display of the input candidate symbols on the displaying unit 8 with reference to FIG. 5. FIG. 5 is a flowchart of an example of a process procedure for the input candidates of a password.

This process procedure includes calculating the display positions of the password data with the use of random numbers and displaying the password data at all the display positions.

The specified nth-digit candidate symbol is picked up from the database unit 12 (step S11), and based on the execution of the password input/authentication program 16, any one of the display positions 81, 82, 83, 84 is calculated with the use of the random numbers generated by the random-number generating unit 14 (step S12). If the display position 81 is calculated, the candidate symbols displayed at other display positions 82, 83, 84 are picked up from the database unit 12 using the random numbers (step S13); it is determined whether all the display positions 81, 82, 83, 84 are completed or not (step S14); and the processes of steps S13 and S14 are performed until all the display positions 81, 82, 83, 84 and the candidate symbols to be displayed are determined. When all the display positions 81, 82, 83, 84 and the candidate symbols are selected (Yes at step S14), the candidate symbols are displayed at the calculated display positions 81, 82, 83, 84 (step S15), and the procedure goes back to step S2 (FIG. 4).

In such a process, the candidate symbols of the password are displayed at arbitrary display positions 81, 82, 83, 84 to perform the input preparation process for the password.

Figure 6:
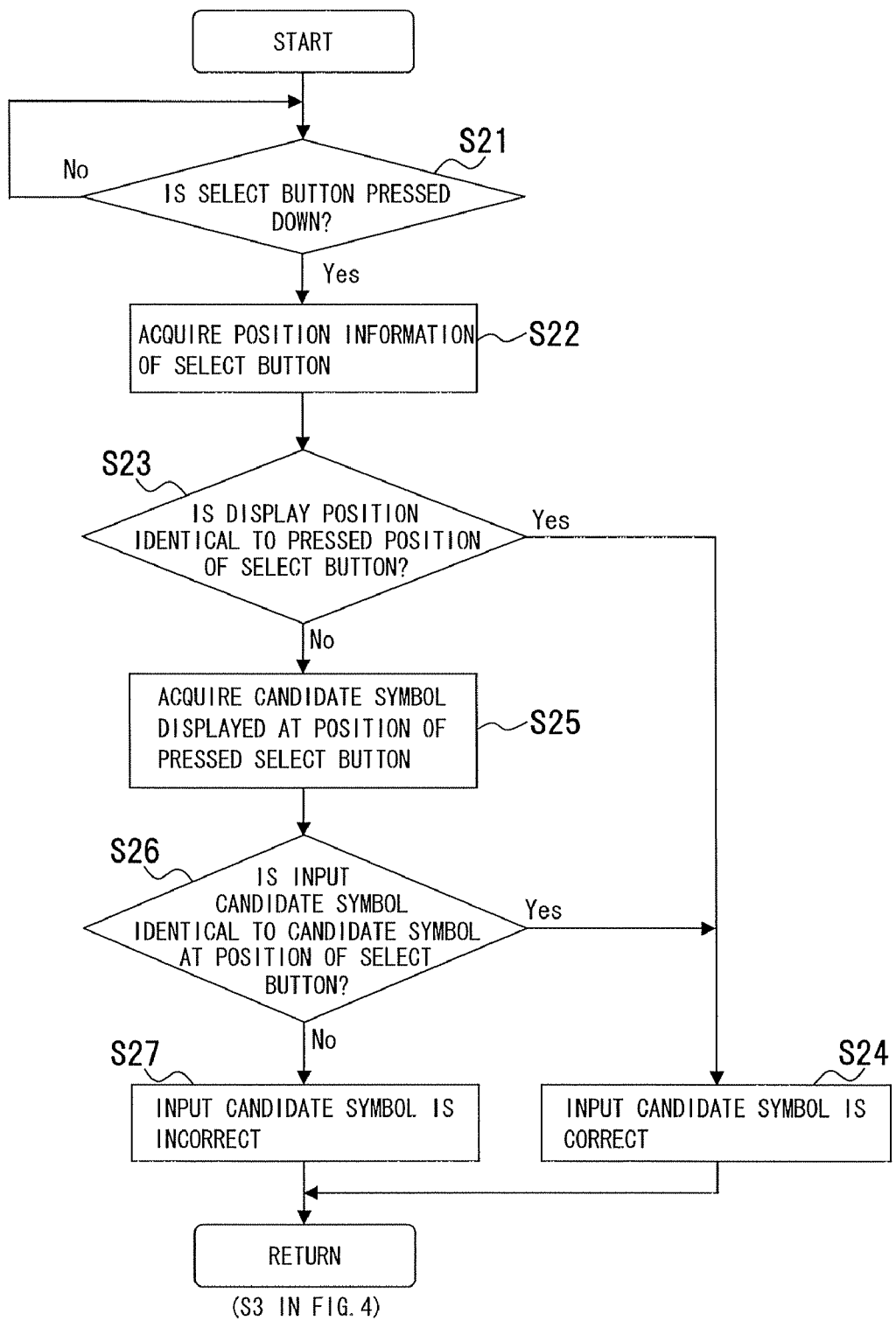
FIG. 6 is a flowchart of an example of a process procedure for monitoring select buttons.

Description will be made of the monitoring process for the select buttons with reference to FIG. 6. FIG. 6 is a flowchart of an example of a process procedure for monitoring the select buttons.

This process procedure includes processes of pressing down the select buttons 101, 102, 103, 104, acquiring the position information thereof, determining whether the input password is correct or incorrect, etc.

In the monitoring process for the select buttons 101, 102, 103, 104, it is determined whether anyone of the select buttons 101, 102, 103, 104 is pressed down or not (step S21) and if any one of button is pressed down (Yes at step S21), the position information representing the pressed select button 101, 102, 103, 104 is acquired (step S22). This position information is information that identifies the select buttons 101, 102, 103, 104. Based on such acquisition of the position information, it is determined whether or not the display position 81, 82, 83, 84 of the candidate symbol of the password is identical to the position of the pressed select button 101, 102, 103, 104 (step S23), and since anyone of the display position 81, 82, 83, 84 of the candidate symbol constituting the password is determined at step S12 of the flowchart shown in FIG. 5 and the display is performed at step S15 through step S12, if the positions are identical (Yes at step S23), it is determined that the input password data is correct, that is, the candidate symbol is correct (step S24).

If the display position 81, 82, 83, 84 of the candidate symbol of the password is not identical to the operated position of the select button 101, 102, 103, 104 (No at step S23), the password data displayed at the position of the pressed select button 101, 102, 103, 104, i.e., the candidate symbol is acquired (step S25). It is determined whether or not the candidate symbol inputted by the pressed select button 101, 102, 103, 104 is identical to the candidate symbol of the password (step S26), and if the symbols are identical (Yes at step S26), it is determined that the input candidate symbol is correct (step S24). If the candidate symbol inputted by pressing down any one of the select buttons 101, 102, 103, 104 is not identical to the candidate symbol of the password (No at step S26), it is determined that the input candidate symbol is incorrect (step S27) and the procedure goes back to step S3 (FIG. 4).

In such a process, when the symbol string including the candidate symbol of the password is displayed at the display positions 81, 82, 83, 84, the password can be inputted by pressing down the select button 101, 102, 103, 104 at the position of the candidate symbol. Even when the same candidate symbols are displayed at two or more display positions 81, 82, 83, 84, if any one of the corresponding select buttons 101, 102, 103, 104 is pressed down, the candidate symbol can be inputted and the input password can be matched with the registered password.

The input of the password will be described with reference to FIGS. 7A to 7I, FIGS. 8A and 8B, and FIG. 9. FIGS. 7A to 7I and FIGS. 8A and 8B show the display of the candidate symbols and the selection of the select buttons and FIG. 9 shows the operation of the select buttons. In FIGS. 7A to 9, the same numerals are added to the portions same as FIG. 2.

Figure 7A:
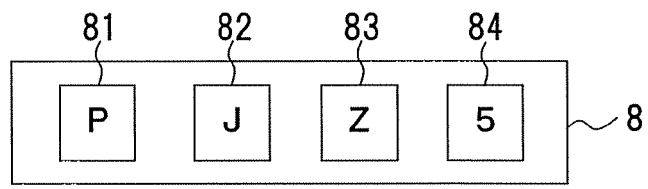
Figure 7B:
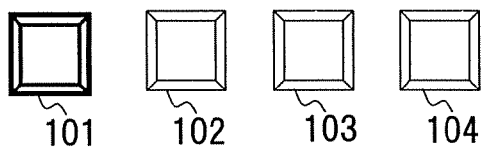
Figure 7C:
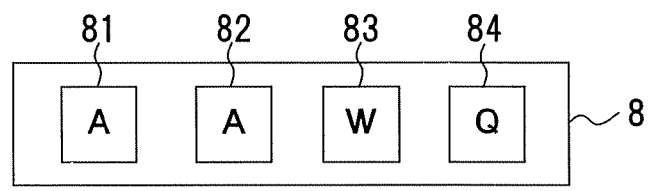
Figure 7D:
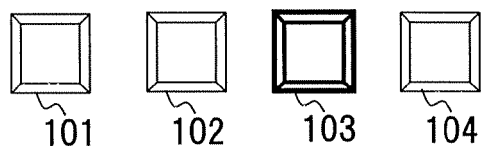
Figure 7E:
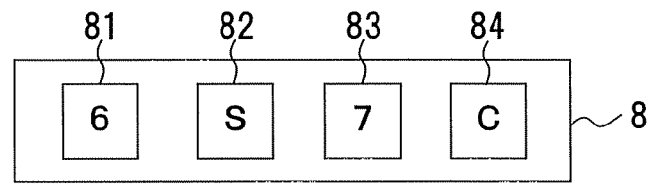
Figure 7F:
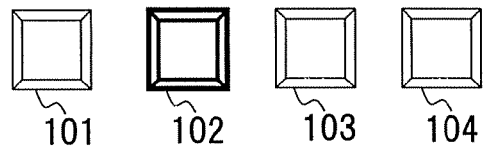
Figure 7G:
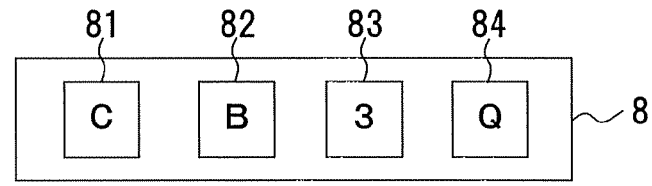
Figure 7H:
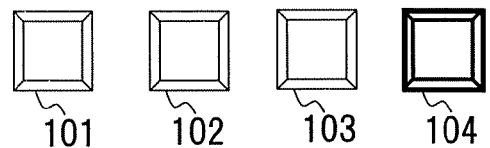

In this example, a password is assumed to be "PWSQ". As shown in FIG. 7A, it is then assumed that a symbol string including the candidate symbol "P" is displayed at the display positions 81, 82, 83, 84 of the displaying unit 8 by the position control using the random numbers. If a user presses down the select button 101 at the display position 81 of the password candidate symbol "P" in the symbol string as shown in FIG. 7B, the candidate symbol "P" is selected. After this selection, if a symbol string including the password candidate symbol "W" is displayed at the display positions 81, 82, 83, 84 of the displaying unit 8 as shown in FIG. 7C and if the user presses down the select button 103 at the display position 83 of the password candidate symbol "W" in the displayed symbol string as shown in FIG. 7D, the candidate symbol "W" is selected. If a symbol string including the password candidate symbol "S" is then displayed at the display positions 81, 82, 83, 84 of the displaying unit 8 as shown in FIG. 7E and if the user presses down the select button 102 at the display position 82 of the password candidate symbol "S" in the displayed symbol string as shown in FIG. 7F, the candidate symbol "S" is selected. If a symbol string including the password candidate symbol "Q" is displayed at the display positions 81, 82, 83, 84 of the displaying unit 8 as shown in FIG. 7G and if the user presses down the select button 104 at the display position 84 of the candidate symbol "Q" as shown in FIG. 7H, the candidate symbol "Q" is selected. In this way, the input of the password "PWSQ" is completed as shown in FIG. 7I.

The input password is compared with the registered password and if the input password is identical to the registered password, the input of the password is completed.

Figure 8A:
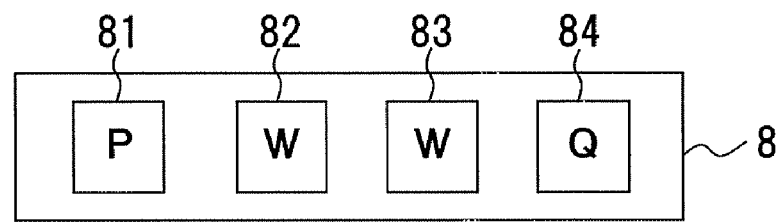
FIGS. 8A and 8B show the display of the candidate symbols and the selection of the select buttons.
Figure 8B:
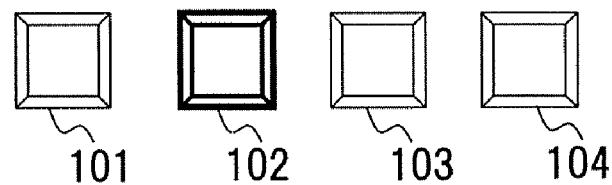
Figure 9:
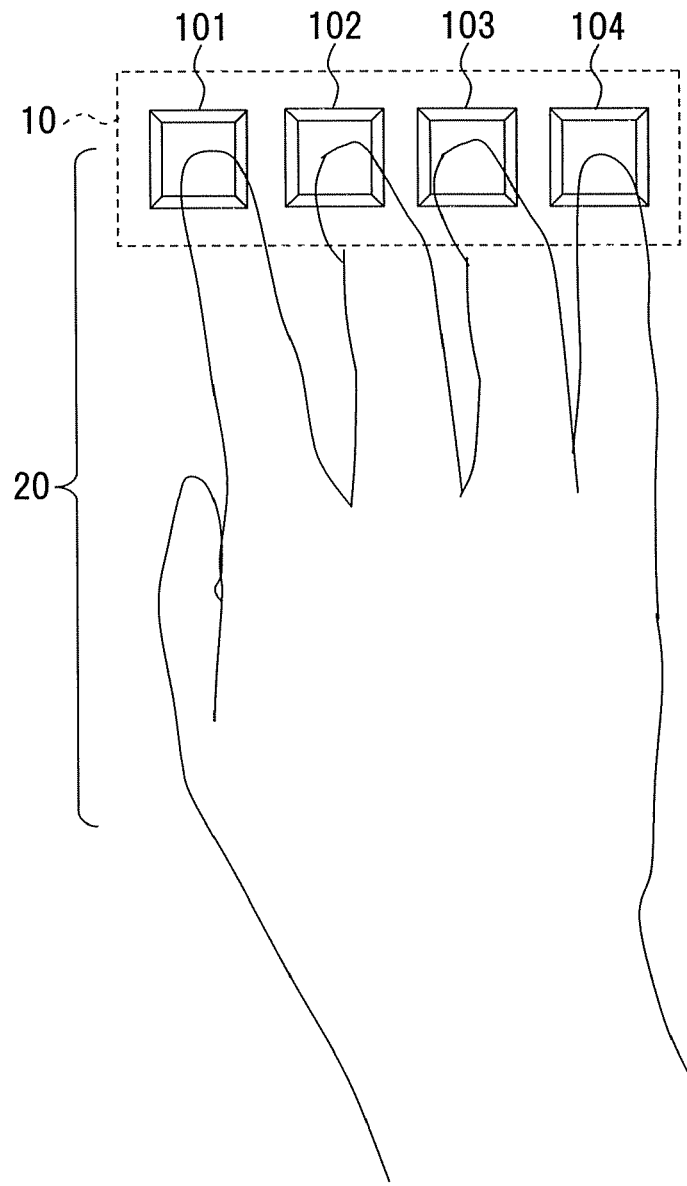
FIG. 9 shows the operation of the select buttons.

If the password candidate symbol "W" is displayed at a plurality of positions, for example, at the display positions 82, 83 of the display positions 81, 82, 83, 84 of the displaying unit 8 as shown in FIG. 8A, any one of the select buttons 102, 103 corresponding to the display positions 82, 83 may be pressed down as shown in FIG. 8B, and in this case, the candidate symbol "W" at the display position 82 is inputted by pressing down the select button 102. The input process, the right/wrong decision, and the taking in of the input password are performed in steps S22 to S27 of FIG. 6.

In the process of the flowchart shown in FIG. 6, since the right/wrong decision is weighted by determining whether the input candidate symbol (input password data) is correct or incorrect and performing the right/wrong decision for the input password in the flowchart (FIG. 4) to which the procedure is returned, the credibility of the password input and the right/wrong decision can be enhanced.

As shown in FIG. 9, the operation can be performed easily by placing fingers 20 on the select buttons 101, 102, 103, 104 set correspondingly to the display positions 81, 82, 83, 84 of the displaying unit 8, and the password can be inputted quickly by the finger operation corresponding to the display positions 81, 82, 83, 84.

As described above, according to this embodiment, since the password input can be achieved with less select buttons 101, 102, 103, 104 and the display positions 81, 82, 83, 84 and the candidate symbol data are displayed randomly, the password can be prevented from leaking out due to peeking, and since a few buttons are operated, the input operation is simple, which contributes to the reduction of the operation time and the speeding up of the input operation.

Second Embodiment

Figure 10:
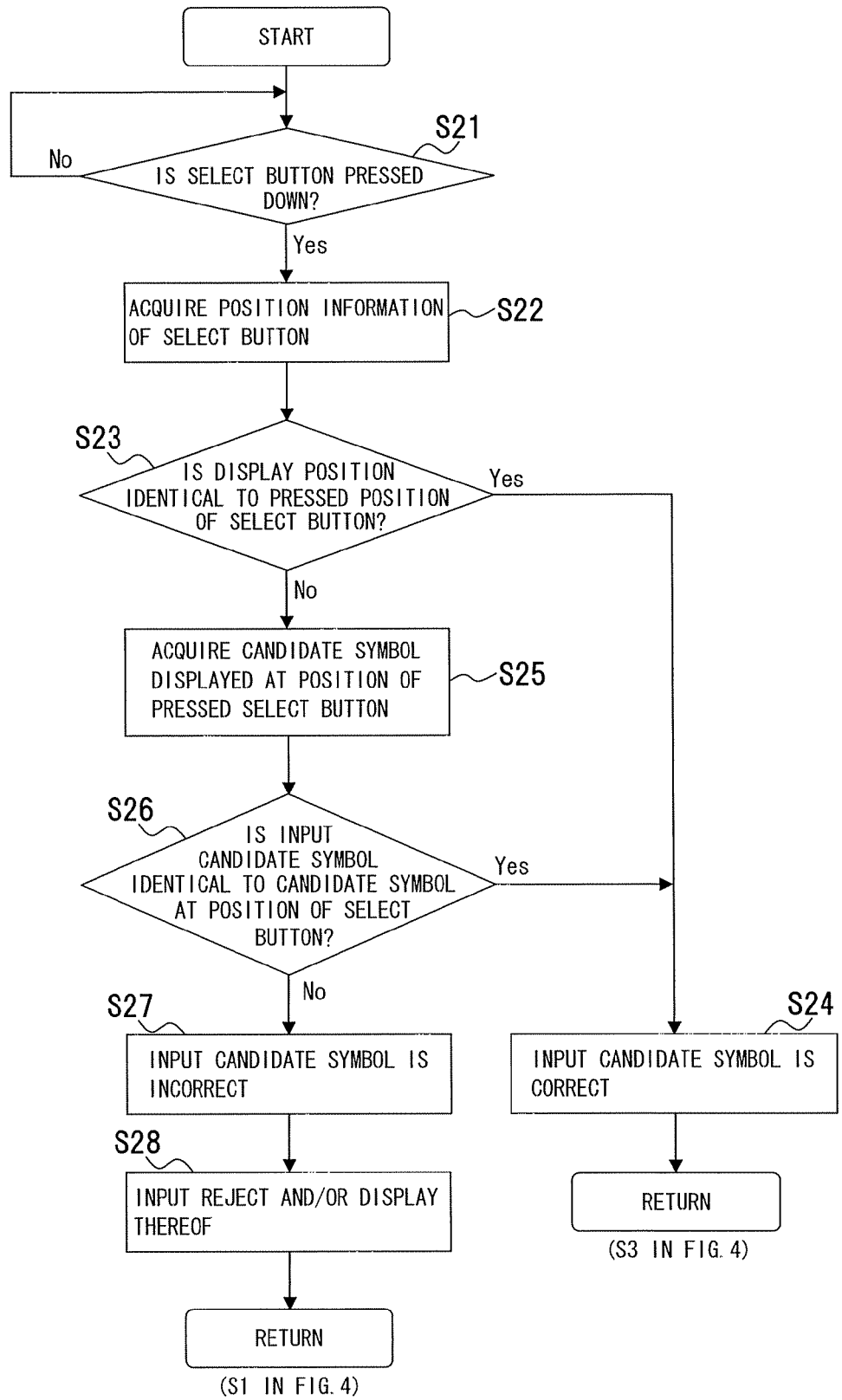
FIG. 10 is a flowchart of another example of a process procedure for monitoring the select buttons, according to a second example.

A second embodiment of the present invention will be described with reference to FIG. 10. FIG. 10 is a flowchart of another example of a process procedure for monitoring the select buttons. In FIG. 10, the same numerals are added to the portions same as the flowchart of FIG. 6.

In this embodiment, the password input/authentication system 2 (FIG. 1), the displaying unit 8 and the input unit 10 (FIG. 2), and the process procedure for the password input and authentication (FIG. 4) described above are also used.

The process procedure of this embodiment includes a process of input reject and/or display thereof if the input password data are incorrect, even in the middle of the input.

If the input password data are correct in the process of steps S21 to S26 (Yes at step S23, Yes at step S26, and step S24), the procedure is returned to step S3 of the flowchart of FIG. 4, and if a portion of the input password data is not identical, that is, if the candidate symbol is not identical in the middle of input (No at step S26), it is determined that the input password is incorrect (step S27), the password input is rejected and/or the input reject is displayed (step S28), and the procedure may be returned to step S1 of the flowchart of FIG. 4.

Third Embodiment

Figure 11:
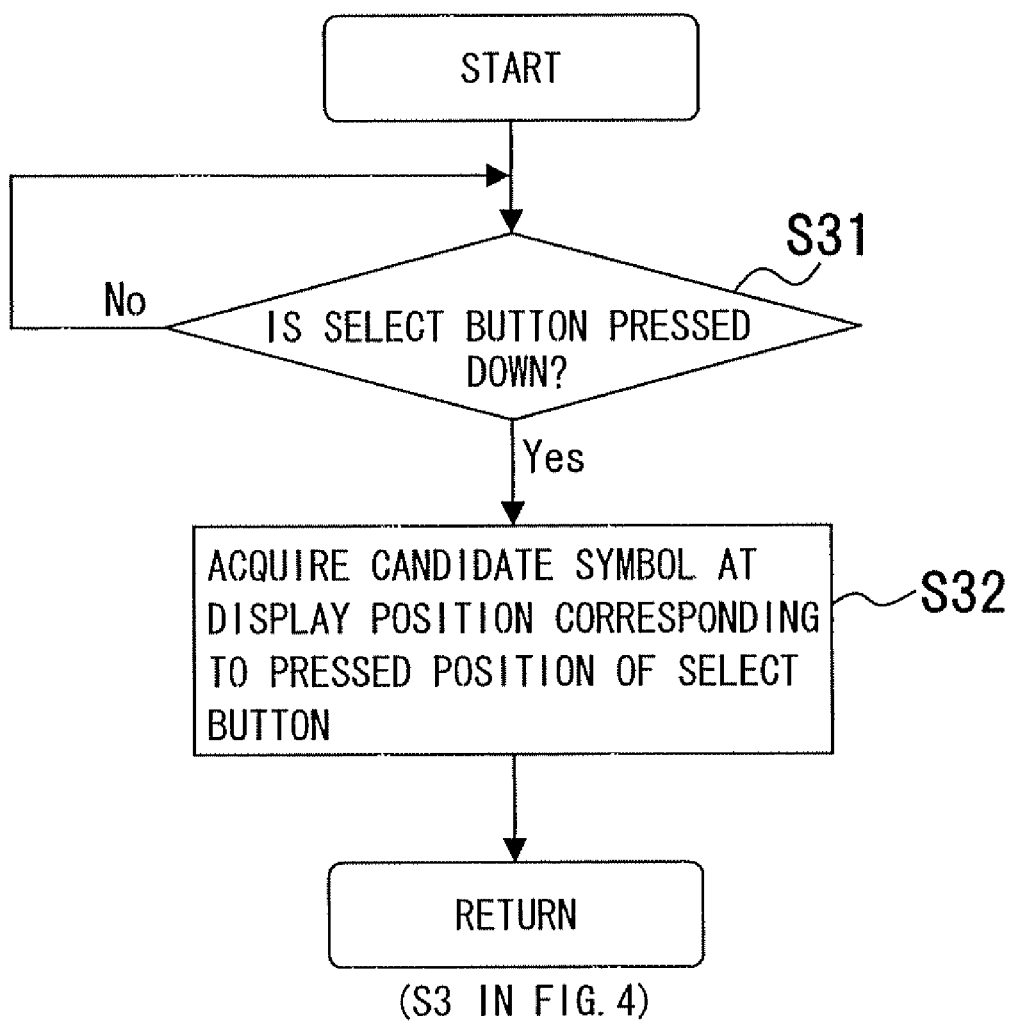
FIG. 11 is a flowchart of another example of a process procedure for monitoring the select buttons, according to a third example.

A third embodiment of the present invention will be described with reference to FIG. 11. FIG. 11 is a flowchart of another example of a process procedure for monitoring the select buttons.

In this embodiment, the password input/authentication system 2 (FIG. 1), the displaying unit 8 and the input unit 10

(FIG. 2), and the process procedure for the password input and authentication (FIG. 4) described above are also used.

The process procedure of this embodiment is the select button monitoring process that takes in only the selection input of the candidate symbols by the pressing down of the select buttons.

The pressing down of the select buttons 101, 102, 103, 104 is monitored (step S31); the candidate symbol is acquired at the display position 81, 82, 83, 84 corresponding to the operated position of the pressed select button 101, 102, 103, 104 (step S32); and the procedure is returned to step S3 of the flowchart of FIG. 4.

In such a configuration, since the input password is compared with the registered password as well, no problem occurs in the password input and this contributes to the quick password input process.

Fourth Embodiment

Figure 12:
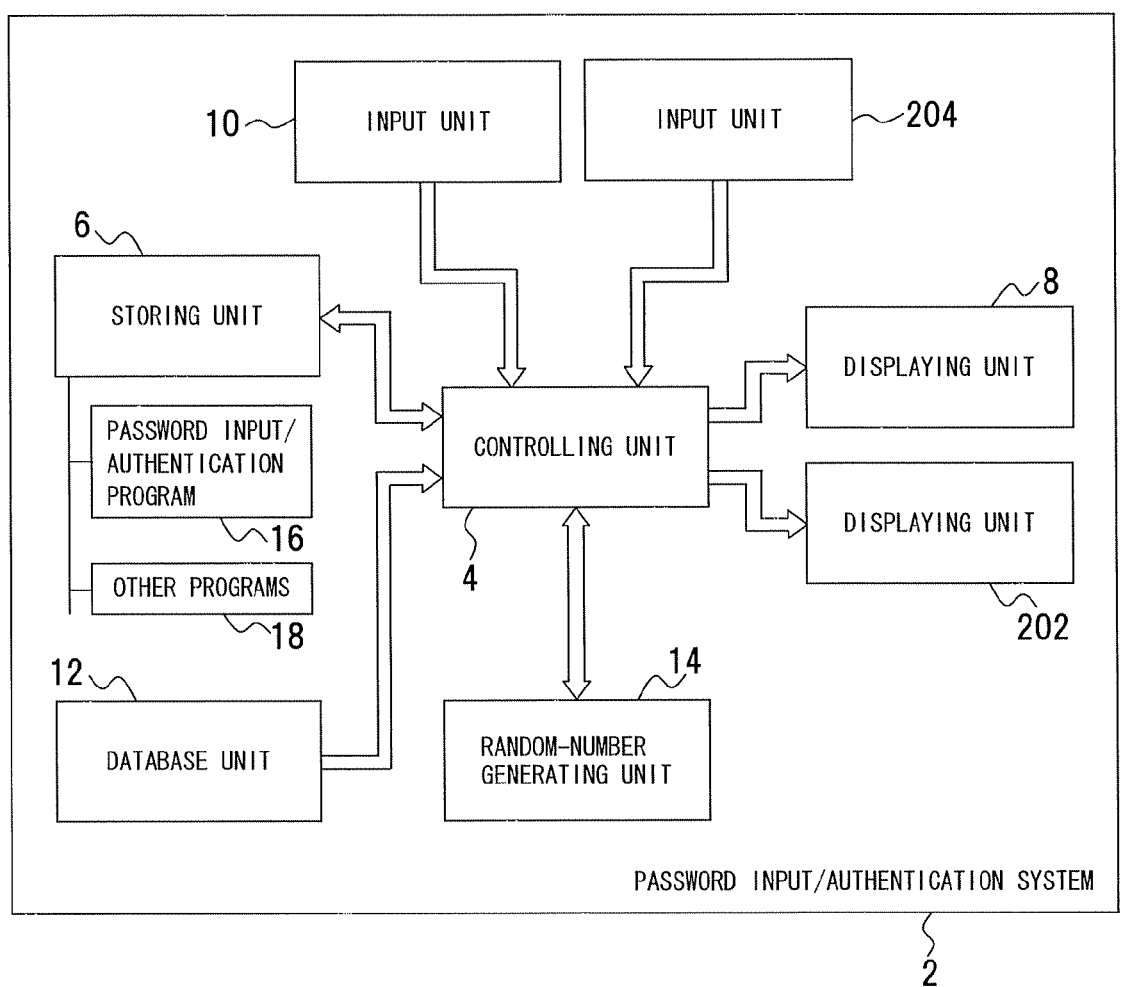
FIG. 12 is a block diagram of one configuration example of a password input/authentication system according to a forth embodiment.
Figure 13:
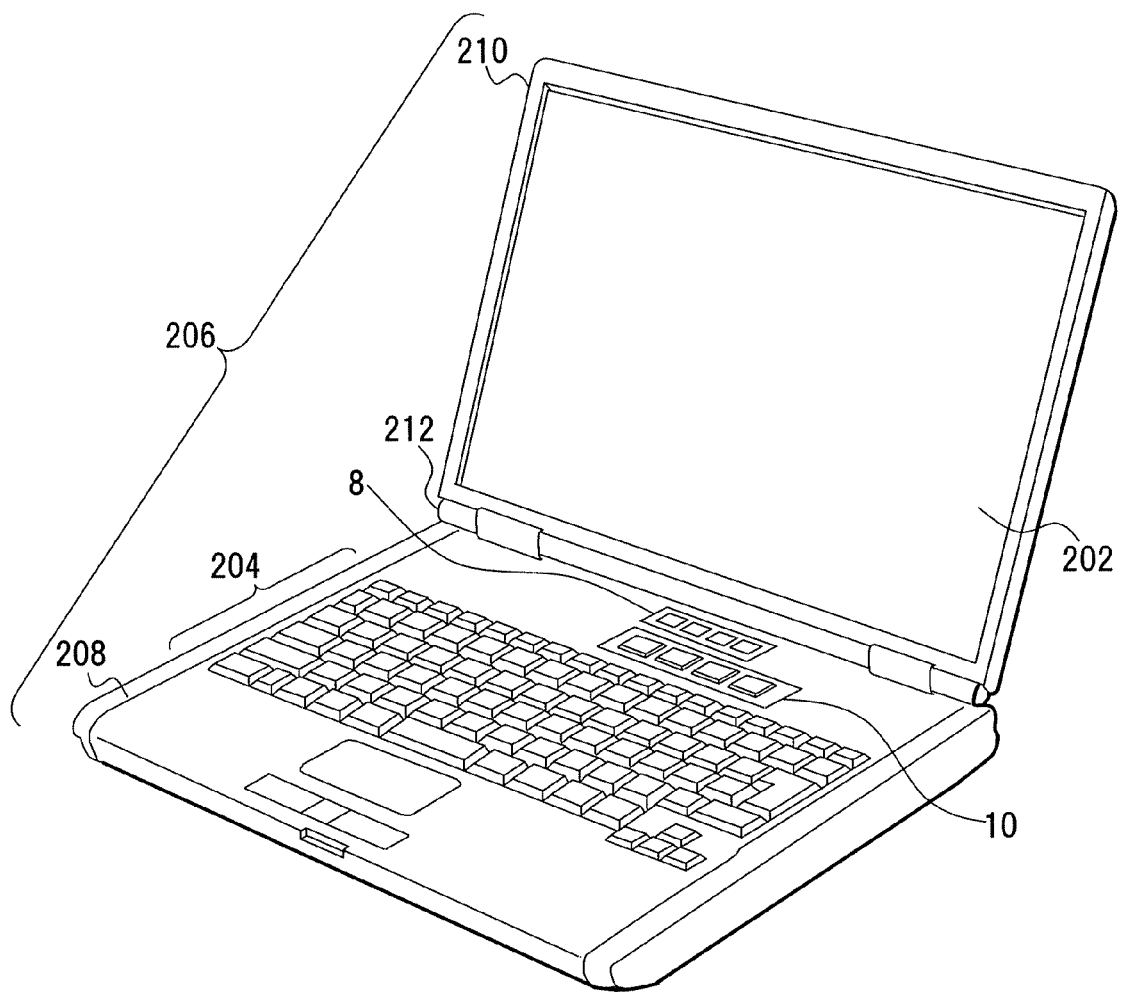
FIG. 13 shows a PC (Personal Computer) equipped with the password input/authentication system.

A forth embodiment of the present invention will be described with reference to FIGS. 12 and 13. FIG. 12 is a block diagram of one configuration example of a password input/authentication system according to the forth embodiment. FIG. 13 shows a PC (Personal Computer) equipped with the password input/authentication system. In FIGS. 12 and 13, the same numerals are added to the portions same as FIGS. 1 and 2.

The password input/authentication system 2 in this embodiment is an example of electronic apparatuses such as a PC and is used to input a password and to authenticate the password. The password input/authentication system 2 is, for example, constituted by a PC or with including a PC so as to equip the password input and authentication function described above. Unlike the above described embodiment, the password input/authentication system 2 is provided with invalidation setting for ignoring a pressing down of a particular select button in the input unit 10 in FIG. 1, etc., thereby password input is made possible by pressing down the select button to which the invalidation has been set and the other select buttons.

In such a configuration, it is possible to input a password simply with few select buttons, so higher security is enhanced in addition to simplification and acceleration of the password input. That is to say, if a valid position as a password input is defined in an input password string, it is possible to realize to prevent from leaking out due to peeking, etc. However it is necessary for a user to remember the valid position defined by the user and memorize candidate symbols of the password and their input positions, hence the user is forced to bear the burden. On the other hand, in case where a setting for the user to specify a select button being set the invalidation for ignoring the pressing down of the select buttons is set up, the leaking out of the password such as peeking can be prevented without the user's burden.

This password input/authentication system 2 includes a controlling unit 4, a storing unit 6, a database unit 12, a random-number generating unit 14, a first displaying unit 8, a second displaying unit 202, a first input unit 10, a second input unit 204, etc. The password input/authentication system 2 has function similar to that of the first embodiment, and realizes the invalidation setting for ignoring the pressing down of the specific select button and the input process of the password. In this password input/authentication system 2, the second displaying unit 202 and the second input unit 204 are added to the password input/authentication system 2 according to the first embodiment as well as enhancing the contents of processing of the controlling unit 4 and storing unit 6.

The controlling unit 4 is a processing unit that processes the password input, and describing in detail, constitutes the processing unit that performs the invalidation setting for ignoring the pressing down of the specific select button, the password input, authentication process, etc. In order to perform such processes, the controlling unit 4 is constituted by, for example, a CPU (Central Processing Unit), executes a password input/authentication program 16, etc. of the storing unit 6, and performs processes such as controlling the password input, determining whether or not the input password is identical to the registered password, etc. that include processes of controlling the read-out of data from the displaying unit 202, the input unit 204, the database unit 12 and the random-number generating unit 14, displaying password data based on random numbers, and ignoring the pressing down of the select button corresponding to the invalidation setting. That is, the controlling unit 4 decides display position displaying candidate symbols of the password by using random numbers acquired from the random-number generating unit 14, for the other display position, picks up a candidate symbol from candidate list of passwords in the database unit 12 by using random numbers acquired from the random-number generating unit 14 so as to display the candidate symbol on the displaying unit 8, and compares the displayed candidate symbol with positions of the select buttons 101, 102, 103 and 104 inputted to the input unit 10 so as to determine whether the candidate symbol applicable to the password is selected.

The storing unit 6 is constituted by an on volatile memory, a hard disk device, etc. and stores the password input/authentication program 16 and other programs 18.

The displaying unit 8 is constituted by, for example, a LCD (Liquid Crystal Display) device, etc. displays the candidate symbols of a password at specified positions. Where, for example, four-digit display positions 81, 82, 83, 84 are set in the display unit 8 as a plurality of digits for displaying candidate symbols such as characters and symbols constituting a password the display positions (FIG. 2). The display unit 202 is constituted by, for example, a display device such as a LCD device, etc. and displays after-mentioned dialogues, etc. The display unit 8 is a sub display and the display unit 202 is a main display.

The input unit 10 is provided with the above-described select buttons 101, 102, 103, 104 corresponding to the display positions 81, 82, 83, 84 of the display unit 8 or with a keyboard including these select buttons 101, 102, 103, 104, etc. so as to detect the pressing down of the select buttons 101, 102, 103, 104. The input unit 204 is constituted by a keyboard for use in input operation to the dialogue, etc. That is, the input unit 10 constitutes a means for detecting an operated position of the select buttons 101, 102, 103, 104. In this case, the input unit 10 may be constituted by the display unit 202 and may be constituted by a part of the input unit 204.

In the database unit 12, registered password data and lists of candidates symbols, constituting the password, such as alphabet letters, numeric characters, and graphics are registered together with invalidation information for invalidating the pressing down of buttons, etc.

The random-number generating unit 14 generates pseudo random numbers. Mersenne Twister, etc. may be used in generation of the pseudo random numbers.

Also in this embodiment, the symbol string displayed on the display positions 81, 82, 83, 84 of the display unit 8 (FIG. 3A) is used for the candidate symbols used for a password. The candidate symbols may be any or combination of characters, such as hiragana, alphabet letters, numeric characters, symbols, and katakana, and graphics, such as a circle and a triangle, etc. (FIG. 3B).

In a personal computer (PC) 206 equipped with such a password input/authentication system 2, as shown in FIG. 13, a case 208 and a case 210 are constituted in a manner openable and closable by means of a hinge 212. The display unit 8 and the input units 10, 204 are disposed in the case 208 side. The display unit 202 is disposed in the case 210 side.

Figure 14:
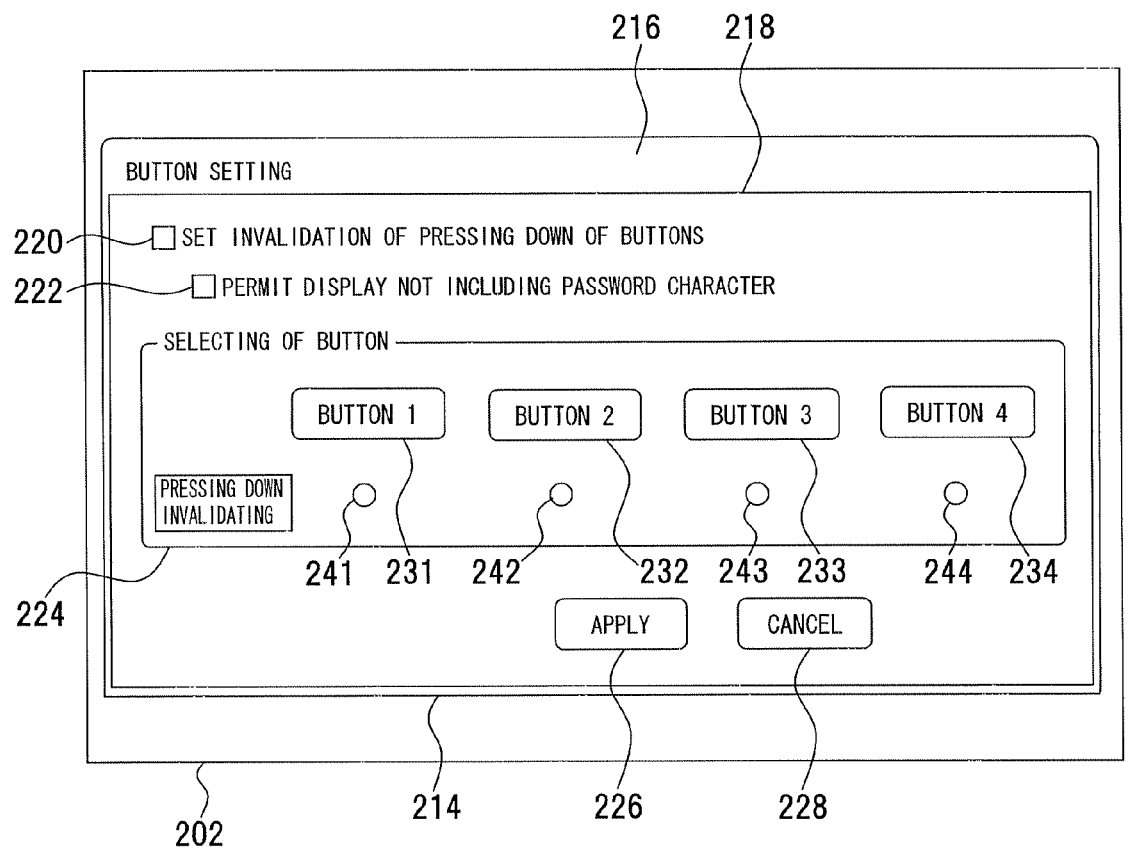
FIG. 14 shows an example of a function selection setting screen.

A setting of function selection will be described with reference to FIG. 14. FIG. 14 shows an example of a function selection setting screen. In FIG. 14, the same numerals are added to the portions same as FIGS. 12 and 13.

A dialogue display screen 214 as an example of this function selection setting screen is a screen for realizing a dialogue function to set the invalidation of the pushing down of the select buttons as well as to set permission or no permission of displaying characters not including the password characters. The invalidation setting for invalidating the pressing down of any of one or more of the select buttons 101, 102, 103, 104 is performed by setting up a function selection setting mode and by displaying the dialogue display screen 214 on the display unit 202. On the dialogue display screen 214 are displayed a title bar 216 and a dialogue display field 218. On the title bar 216 is displayed "Button setting" as an example of a title indicating the invalidation setting. On the dialogue display field 218 are displayed a check box 220 with "Setting the invalidation of the pressing down of the buttons" as an example of a message for indicating setting content to be selected, and a check box 222 with "Permitting display not including the password character" as an example of a message for indicating permitting display not including the password character (i.e. the candidate symbol constituting the password) as setting content to be selected. On the dialogue display field 218 is set a button-selecting field 224. On the button-selecting field 224 are displayed "Selecting of buttons" as an example of a message for selecting the button to be selected, and icons 231, 232, 233, 234 corresponding to the select buttons 101, 102, 103, 104, respectively. On the icons 231, 232, 233, 234 are respectively displayed "Button 1", "Button 2", "Button 3", and "Button 4" that represent the select buttons 101, 102, 103, 104, respectively. Below each of the icons 231, 232, 233, 234 are respectively displayed check boxes 241, 242, 243, 244 for selecting "Button 1", "Button 2", "Button 3", "Button 4", respectively, together with "Pressing down invalidating" as an example of a message indicating setting content. On a lower field in the dialogue display screen 214 are displayed an application button 226 as an example of an application input part for applying the selected content and a cancel button 228 as an example of a cancel input part for canceling the selected content.

On the dialogue display screen 214 (FIG. 14), checking the box on any of the check boxes 241, 242, 243, 244 selects any of the select buttons 101, 102, 103, 104 in response to the checking. Checking the check box 220 selects the invalidation of the pushing down of the selected select button 101, 102, 103 or 104. Checking the check box 222 selects the permission of the display not including the password character. In response to these selections, inputting of the application button 226 applies the selected content. In this case, the pressing down of the selected select button is invalidated and the permission of the display not including the password character is set, however, the permission of the display not including the password character does not have to be set.

Figure 15:
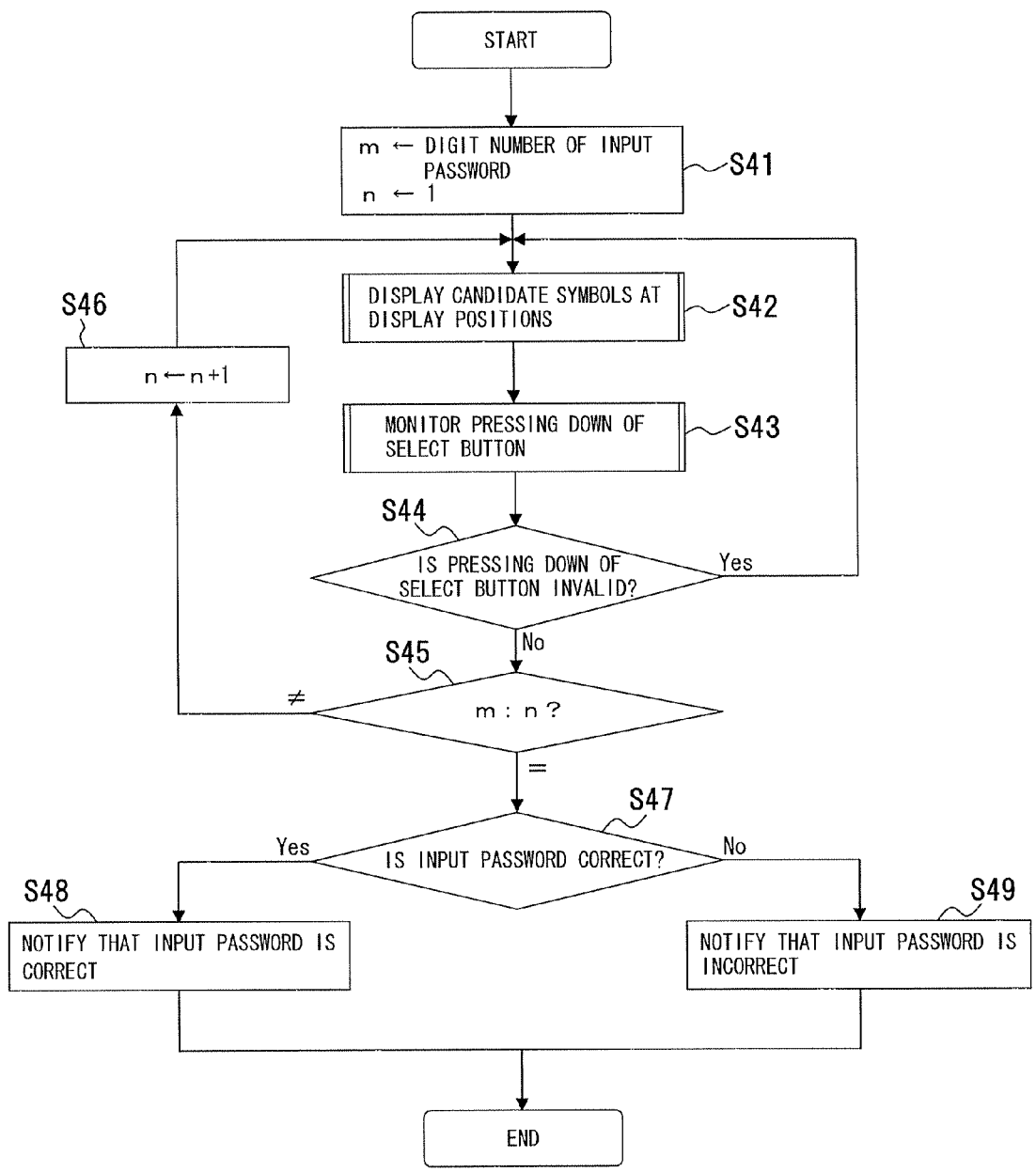
FIG. 15 is a flowchart of a process procedure for password input and authentication.

A process procedure of the password input and authentication will be described with reference to FIG. 15. FIG. 15 is a flowchart of a process procedure for the password input and authentication.

This process includes processes of determining the candidate symbols of the password and the display positions thereof, displaying the password, invalidating the pressing down of the invalidated select button and authenticating the input password.

The password input/authentication program 16 is executed and the display positions are determined for the candidate symbols, which are password data (step S41). At step S41, m is a digit number of the input password, and when the password is four-digit, m=4. n is a digit position in digit number m and n=1, 2, 3, . . . .

When the nth digit of the password is specified, the nth-digit candidate symbol are picked up from the password data along with candidate symbols of other digits, and these candidate symbols are displayed as input candidate symbols at the display positions 81, 82, 83, 84 of the displaying unit 8 (step S42). The pressing down of the select buttons 101, 102, 103, 104 is monitored correspondingly to the display (step S43); it is determined whether the pressing down of the select buttons 101, 102, 103, 104 is invalid or not (step S44). In this step S44, it is determined whether the select button set the invalidation is pressed down or not, if the pressing down is invalid the steps S42, S43, S44 are repeated, or if the pressing down is valid the procedure goes to step S45. If any valid one of the select buttons 101, 102, 103, 104 is selected, the number of digits is determined (m:n?) (step S45); a (n+1) process is performed as a process for incrementing the input digit number n until m=n (step S46); and the display of the candidate symbols, the pressing down of the select buttons 101, 102, 103, 104 and the monitoring of the number of the pressing down are performed.

For the input password authentication process, it is determined whether the input password is correct or not, that is, whether the input password is identical to the registered password or not (step S47); if the input password is correct (Yes at step S47), it is notified that the input password is correct (step S48); if the input password is incorrect (No at step S47), it is notified that the input password is incorrect (step S49); and the password input/authentication process is completed. The notification of whether the input password is correct or incorrect may be displayed on the displaying unit 8 or may be displayed on other displaying units of the electronic apparatus.

Figure 16:
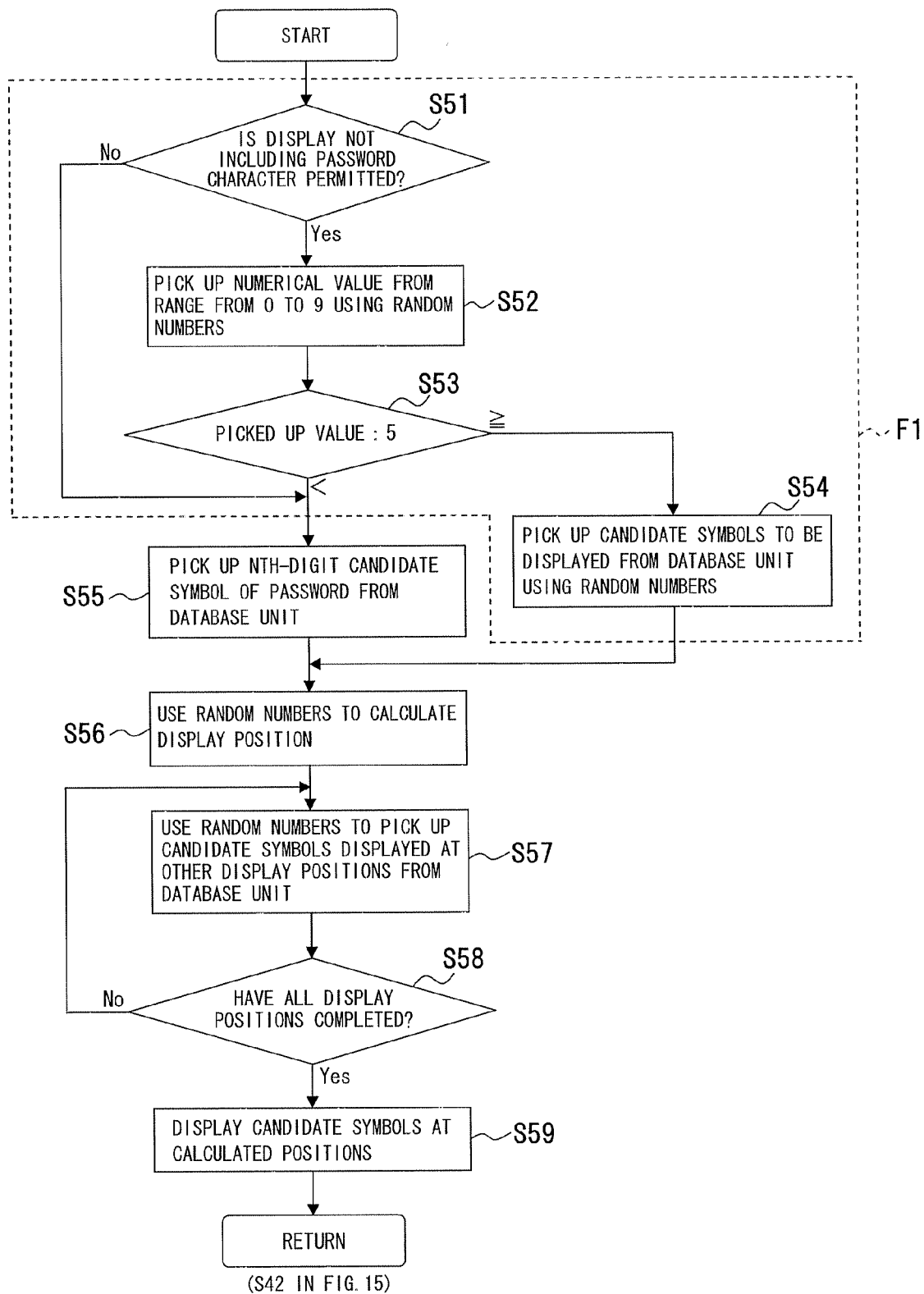
FIG. 16 is a flowchart of an example of a process procedure for input candidates of a password.

Description will be made of the display of the input candidate symbols on the displaying unit 8 with reference to FIG. 16. FIG. 16 is a flowchart of an example of a process procedure for input candidates of a password.

This process procedure includes calculating the display positions of the password data with the use of random numbers, displaying the password data at all the display positions and processing to determine permission or no permission of the display not including the password characters. This process procedure corresponds to the dialogue display screen 214 shown in FIG. 14 and is an example of processing for offering the display not including the password character. In FIG. 16, steps S51, S52, S53 and S54 in a process F1 are processes added to the above stated process procedure (FIG. 5), according to the permission of the display not including the password characters. In this case, the display not including the password characters is offered, for example, at a fifty percent success rate with the use of the random numbers.

In this process procedure, it is determined whether permission of the display not including the password characters is set or not (step S51); if the permission is set, a numerical value is picked up from the range from 0 to 9 using the random numbers (step S52). It is determined whether or not the picked up value is not less than a reference value, for example 5 (step S53); if the picked up value is not less than 5 ($\geq$5), the candidate symbols to be displayed is picked up from the database unit 12 using the random numbers (step S54); if the picked up value is less than 5 (<5), the nth-digit candidate symbol of the password is picked up from the database unit 12 (step S55). In this case, if the permission of the display not including the password characters is not set (No at step S51), the procedure goes to step S55, skipping steps S52 and S53.

Based on the execution of the password input/authentication program 16, any one of the display positions 81, 82, 83, 84 is calculated with the use of the random numbers generated by the random-number generating unit 14 (step S56). If the display position 81 is calculated, the candidate symbols to be displayed at the other display positions 82, 83, 84 are picked up from the database unit 12 using the random numbers (step S57); it is determined whether all the display positions 81, 82, 83, 84 are completed or not (step S58); and the processes of steps S57 and S58 are performed until all the display positions 81, 82, 83, 84 and the candidate symbols to be displayed are determined. When all the display positions 81, 82, 83, 84 and the candidate symbols are selected (Yes at step S58), the candidate symbols are displayed at the calculated display positions 81, 82, 83, 84 (step S59), and the procedure goes back to step S42 (FIG. 15).

In such a process, the candidate symbols of the password are displayed at arbitrary display positions 81, 82, 83, 84 to perform the input preparation process for the password.

Figure 17:
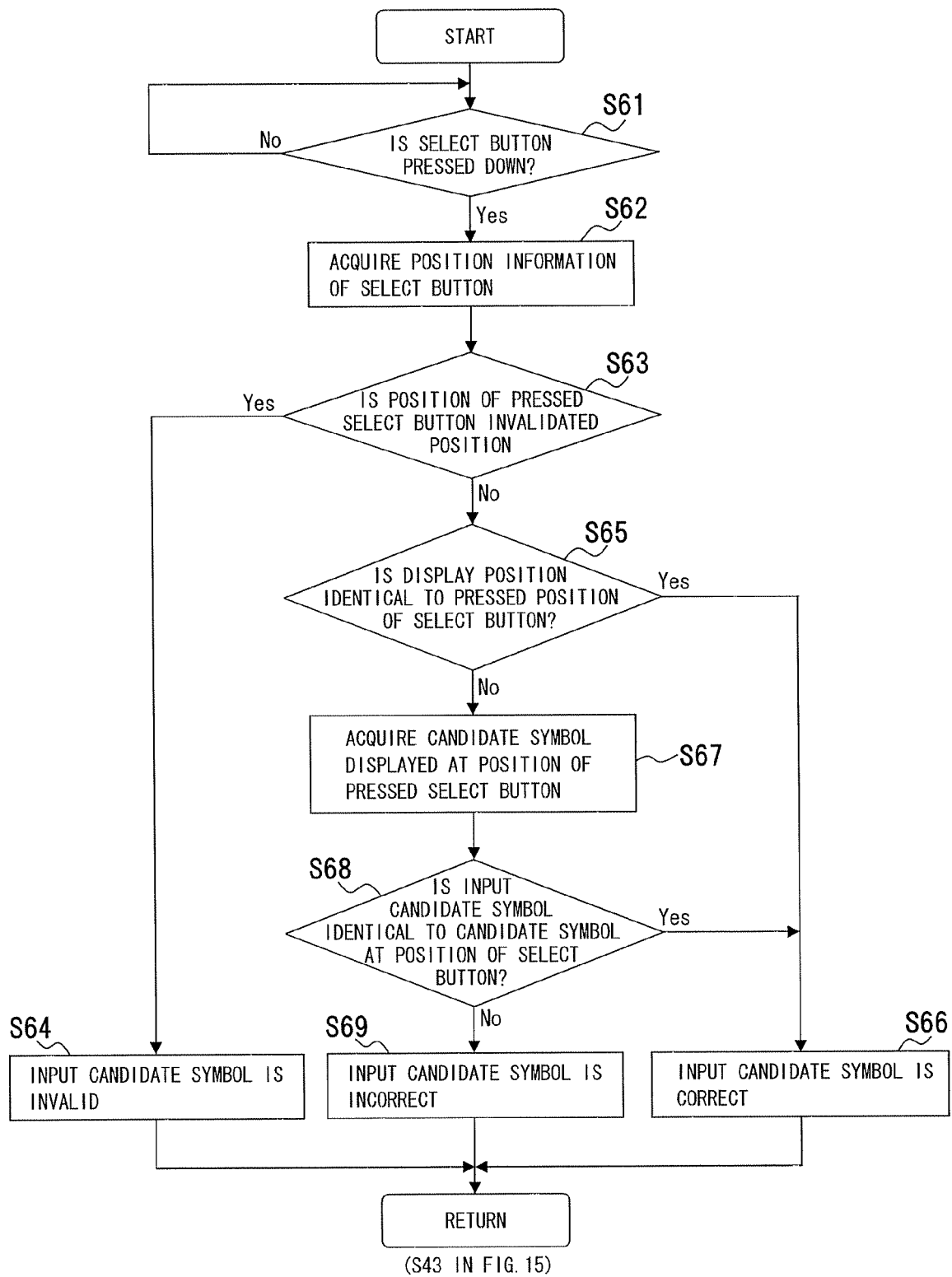
FIG. 17 is a flowchart of an example of a process procedure for monitoring the select buttons.

Description will be made of the monitoring process for the select buttons with reference to FIG. 17. FIG. 17 is a flowchart of an example of a process procedure for monitoring the select buttons.

This process procedure includes processes of pressing down the select buttons 101, 102, 103, 104, invalidating the pressing down thereof, acquiring the position information accompanying the pressing down, determining whether the input password is correct or incorrect, etc.

In the process procedure, it is determined whether any one of the select buttons 101, 102, 103, 104 is pressed down or not (step S61) and if any one of the buttons is pressed down (Yes at step S61), the position information representing the pressed select button 101, 102, 103 or 104 is acquired (step S62). This position information is information that identifies the select buttons 101, 102, 103 or 104 as described above.

It is determined whether or not the position of the pressed select button 101, 102, 103 or 104 is the invalidated position from the position information (step S63). If the position of the pressed select button is the invalidated position (Yes at step S63), the input candidate symbol is determined to be invalid (step S64), and the procedure goes to step S43 (FIG. 15).

If the position of the pressed select button 101, 102, 103 or 104 is not the invalidated position (No at step S63), based on the acquired position information, it is determined whether or not the display position 81, 82, 83 or 84 is identical to the position of the pressed select button 101, 102, 103 or 104 (step S65), and since the display position 81, 82, 83 or 84 of the candidate symbol constituting the password is determined at step S56 of the flowchart shown in FIG. 16 and the display is performed at step S59 through step S56 (FIG. 16), if the positions are identical (Yes at step S65), it is determined that the input password data is correct, that is, the candidate symbol is correct (step S66).

If the display position 81, 82, 83 or 84 of the candidate symbol of the password is not identical to the operated position of the select button 101, 102, 103 or 104 (No at step S65), the candidate symbol displayed at the position of the pressed select button 101, 102, 103 or 104 is acquired (step S67). It is determined whether or not the input candidate symbol inputted by the pressed select button 101, 102, 103 or 104 is identical to the candidate symbol constituting the password (step S68), and if the symbols are identical (Yes at step S68), it is determined that the input candidate symbol is correct (step S66). If the candidate symbol inputted by pressing down any one of the select buttons 101, 102, 103, 104 is not identical to the candidate symbol of the password (No at step S68); it is determined that the input candidate symbol is incorrect (step S69) and the procedure goes back to step S43 (FIG. 15).

In such a process, when the candidate symbols of the password are displayed at the display positions 81, 82, 83, 84, the candidate symbol is acquired by pressing down the select button 101, 102, 103 or 104 at the position of the candidate symbol. In this case, if invalidation is set on the position of the select button 101, 102, 103 or 104, for example, the invalidation is set to the select button 102, the pressing down thereof is invalidated and the pressing down the valid select buttons 101, 103, 104 acquires the candidate symbol constituting the password. In this case, even when the same candidate symbols are displayed at two or more display positions 81, 82, 83, 84 at a time, if any one of the corresponding select button 101, 102, 103 or 104 is pressed down, the candidate symbol can be inputted and the input password can be matched with the registered password by steps S67 and S68.

The setting of the dialogue display screen 214 and the password input process will be described on processes in cases where (1) the invalidation is not set and the display not including the password character is not permitted, (2) the invalidation is set and (3) the invalidation is set and the display not including the password character is permitted.

(1) The Case where the Invalidation is not Set and the Display not Including the Password Character is not Permitted As shown in FIG. 14, this is the case where the check boxes 220 and 222 are not checked and which are applied. FIGS. 18A to 18D show an example of the display of the candidate symbols and the input operation in this case. In such a setting, the password is, for example, "PASS".

Figure 18A:
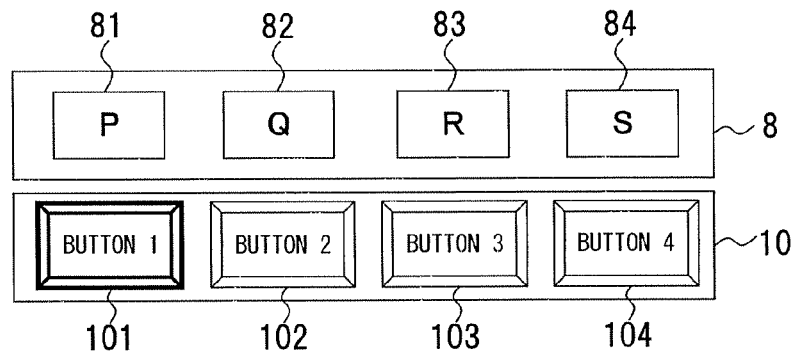
FIGS. 18A, 18B, 18C and 18D show an example of the display of the candidate symbols and the input operation.
Figure 18B:
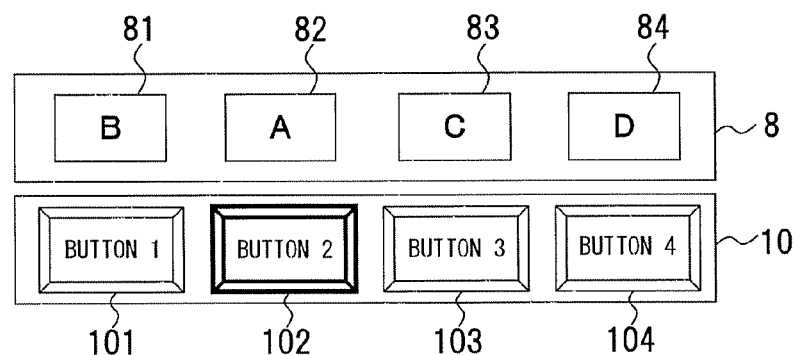
Figure 18C:
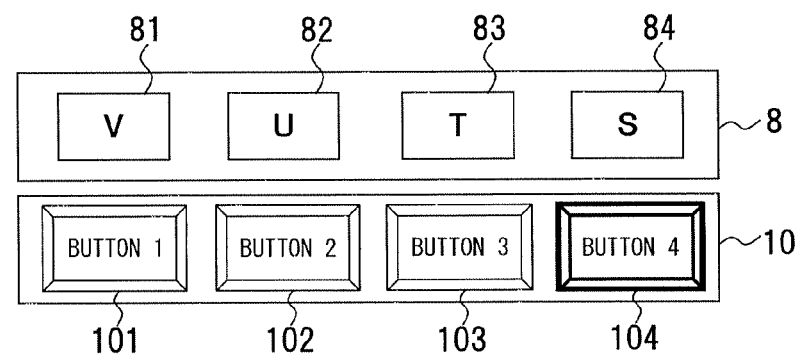
Figure 18D:
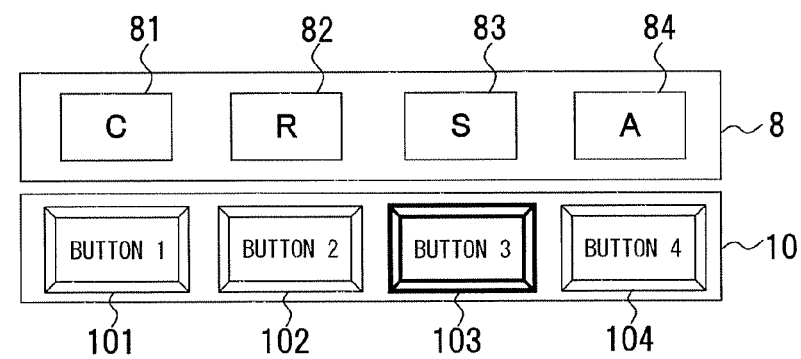

As shown in FIG. 18A, for the first time if for example a symbol string "PQRS" including the candidate symbol "P" is displayed at the display positions 81, 82, 83, 84 of the displaying unit 8 by the position control using the random numbers, the candidate symbol "P" is selected from the symbol string by pressing down the select button 101 at the display position 81 of the candidate symbol "P" of the password. After this selection, as shown in FIG. 18B, for the second time if a symbol string "BACD" including the candidate symbol "A" of the password is displayed at the display positions 81, 82, 83, 84 of the displaying unit 8, the candidate symbol "A" is selected from the displayed symbol string by pressing down the select button 102 at the display position 81 of the candidate symbol "A" of the password. As shown in FIG. 18C, for the third time if a symbol string "VUTS" including the candidate symbol "S" of the password is displayed at the display positions 81, 82, 83, 84 of the displaying unit 8, the candidate symbol "S" is selected from the displayed symbol string by pressing down the select button 104 at the display position 84 of the candidate symbol "S" of the password. As shown in FIG. 18D, for the fourth time if a symbol string "CRSA" including the candidate symbol "S" of the password is displayed at the display positions 81, 82, 83, 84 of the displaying unit 8, the candidate symbol "S" is selected from the displayed symbol string by pressing down the select button 103 at the display position 83 of the candidate symbol "S" of the password. In this way, the password "PASS" is inputted.

The input password is compared with the registered password, and if the input password is identical to the registered password, the input of the password is completed.

(2) The Case where the Invalidation is Set

Figure 19:
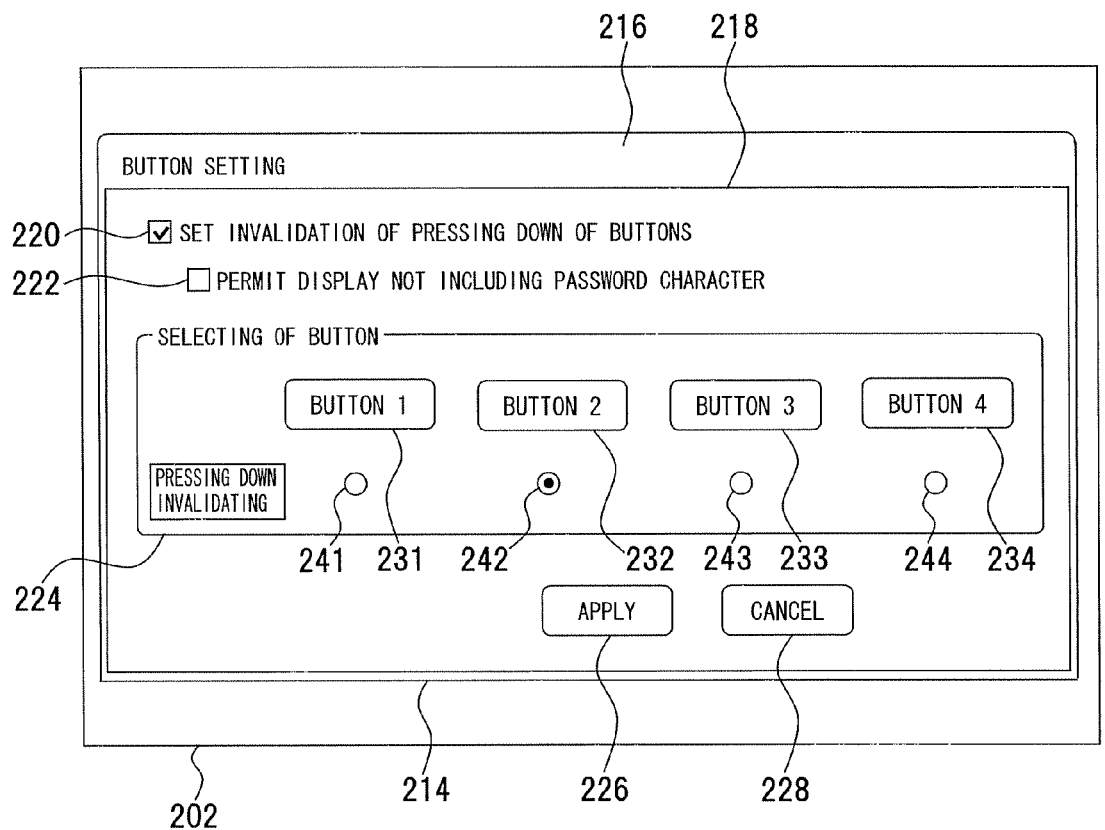
FIG. 19 shows a dialogue display screen.

As shown in FIG. 19, this is the case where only the check box 220 is checked so that only the invalidation is applied. In this example, the invalidation is set to the select button 102, that is, corresponding to the position of the select button 102, the invalidation is set to the display position 82. In this case, the check box 222 is not checked so that the display not including the password characters is not permitted. FIGS. 20A to 20G show an example of the display of candidate symbols and the input operation in this case. In such a setting, the password is for example "PASS" as well as the case of (1).

Figure 20A:
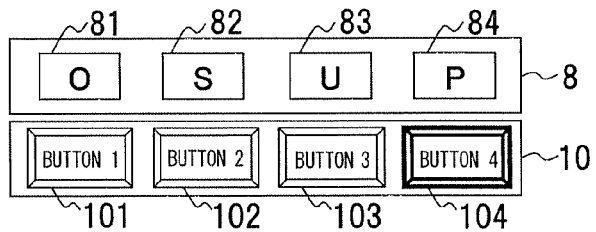
FIGS. 20A, 20B, 20C, 20D, 20E, 20F and 20G show an example of the display of candidate symbols and the input operation.

As shown in FIG. 20A, for the first time if for example a symbol string "OSUP" including the candidate symbol "P" is displayed at the display positions 81, 82, 83, 84 of the displaying unit 8 by the position control using the random numbers, the candidate symbol "P" is selected from the symbol string by pressing down the select button 104 at the display position 84 of the candidate symbol "P" of the password.

Figure 20B:
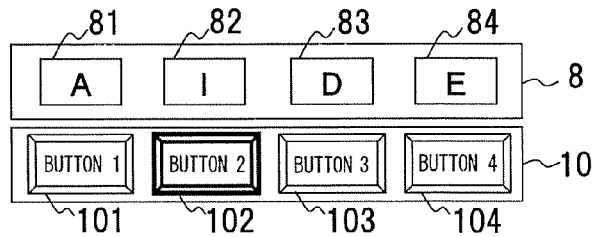
Figure 20C:
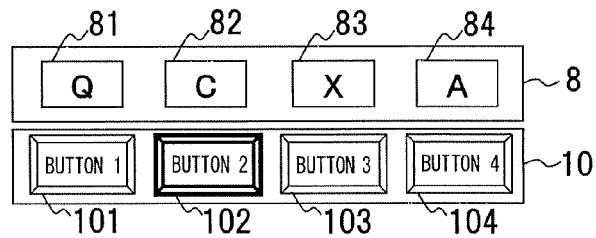

After this selection, as shown in FIG. 20B, for the second time, it is assumed that a symbol string "AIDE" including the candidate symbol "A" of the password is displayed at the display positions 81, 82, 83, 84 of the displaying unit 8. If, without pressing down the select button 101 at the display position 81 of the candidate symbol "A" of the password in the displayed symbol string, the select button 102 of the other display position 82 where the invalidation has been set is pressed down, the candidate symbol "I" is selected but the selection of the input candidate symbol "I" is invalidated because the invalidation has been set. As shown in FIG. 20C, for the third time as well, it is assumed that a symbol string "QCXA" including the candidate symbol "A" of the password is displayed at the display positions 81, 82, 83, 84 of the displaying unit 8. If, without pressing down the select button 104 at the display position 84 of the candidate symbol "A" of the password in the displayed symbol string, the select button 102 of the other display position 82 where the invalidation has been set is pressed down, the candidate symbol "C" is selected but the selection of the input candidate symbol "C" is invalidated because the invalidation has been set.

Figure 20D:
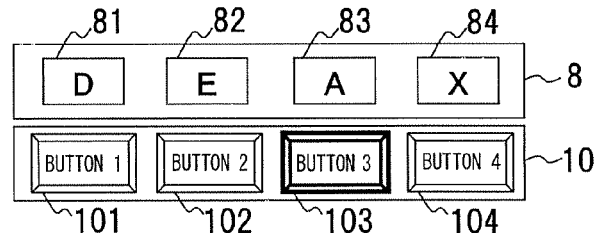
Figure 20E:
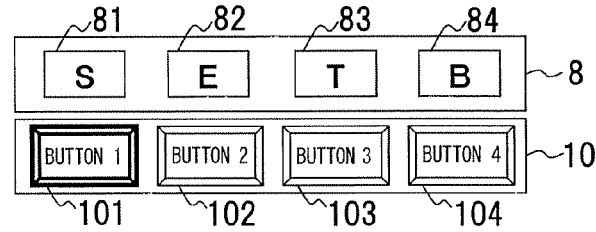

As shown in FIG. 20D, for the fourth time, it is assumed that a symbol string "DEAX" including the candidate symbol "A" of the password is displayed at the display positions 81, 82, 83, 84 of the displaying unit 8. If pressed down is the select button 103 at the display position 83 of the candidate symbol "A" of the password in the displayed symbol string, the candidate symbol "A" is selected. After this selection, as shown in FIG. 20E, for the fifth time, it is assumed that a symbol string "SETB" including the candidate symbol "S" of the password is displayed at the display positions 81, 82, 83, 84 of the displaying unit 8. If pressed down is the select button 101 at the display position 81 of the candidate symbol "S" of the password in the displayed symbol string, the candidate symbol "S" is selected.

Figure 20F:
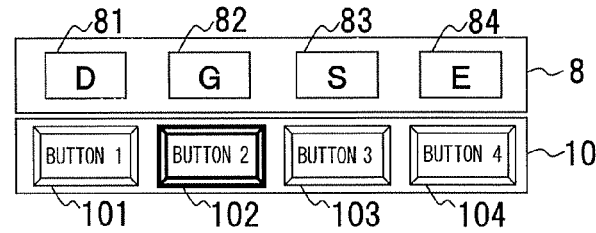
Figure 20G:
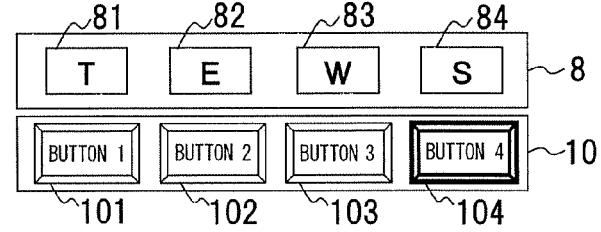

After this selection, as shown in FIG. 20F, for the sixth time as well, it is assumed that a symbol string "DGSE" including the candidate symbol "S" of the password is displayed at the display positions 81, 82, 83, 84 of the displaying unit 8. If, without pressing down the select button 103 at the display position 83 of the candidate symbol "S" of the password in the displayed symbol string, the select button 102 of the other display position 82 where the invalidation has been set is pressed down, the candidate symbol "G" is selected but the selection of the input candidate symbol "G" is invalidated because the invalidation has been set. As shown in FIG. 20G, for the seventh time, it is assumed that a symbol string "TEWS" including the candidate symbol "S" of the password is displayed at the display positions 81, 82, 83, 84 of the displaying unit 8. If pressed down is the select button 104 at the display position 84 of the candidate symbol "S" of the password in the displayed symbol string, the candidate symbol "S" is selected. In this way, the input of the password "PASS" is completed.

Similarly, the input password is compared with the registered password, and if the input password is identical to the registered password, the input of the password is completed. In this case, the symbol string of the password is "PASS", however, the inputted symbol string is not "PASS" but "PICASGS". So, even if the pressing down and display of the select buttons are peeped during the operation of the password input, it is impossible to perceive that the "PASS" is the password. As described above, the invalidation being set to the pressing down of the select button adds the input skip operation by the pressing down the invalidated select button and the dummy input operation by the invalidated select button. Accordingly, the relation between the input operation and the password input is complicated, the password can be prevented from leaking out due to peeking etc., and the security of passwords can be enhanced.

Figure 21:
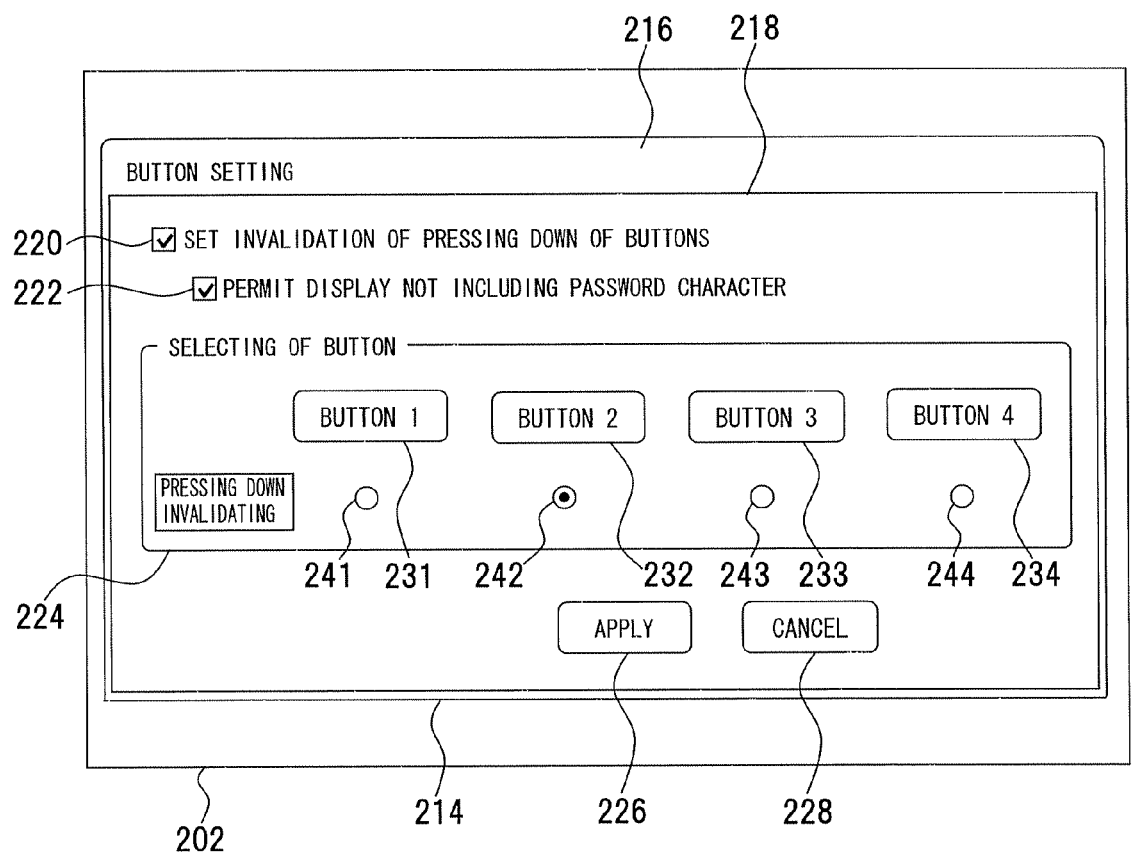
FIG. 21 shows a dialogue display screen.

(3) The Case where the Invalidation is Set and the Display not Including the Password Character is Permitted As shown in FIG. 21, this is the case where the check boxes 220 and 222 are checked so that the invalidation is set and the display not including the password characters is permitted. In this example, the invalidation is set to the select button 102, that is, corresponding to the position of the select button 102, the invalidation is set to the display position 82. FIGS. 22A to 22G show an example of the display and the input operation in this case. In such a setting, the password is for example "PASS" as well as the case of (1).

Figure 22A:
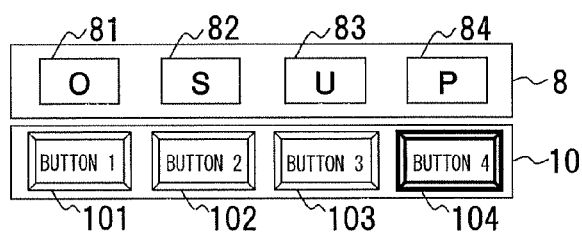
FIGS. 22A, 22B, 22C, 22D, 22E, 22F and 22G show an example of the display of candidate symbols and the input operation.

As shown in FIG. 22A, for the first time if for example a symbol string "OSUP" including the candidate symbol "P" is displayed at the display positions 81, 82, 83, 84 of the displaying unit 8 by the position control using the random numbers, the candidate symbol "P" is selected from the symbol string by pressing down the select button 104 at the display position 84 of the candidate symbol "P" of the password.

Figure 22B:
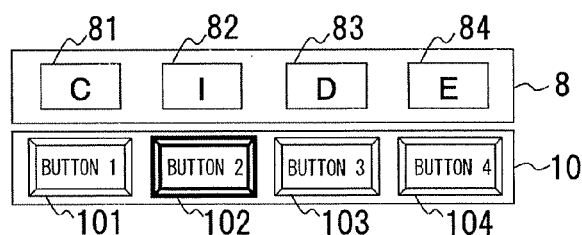
Figure 22C:
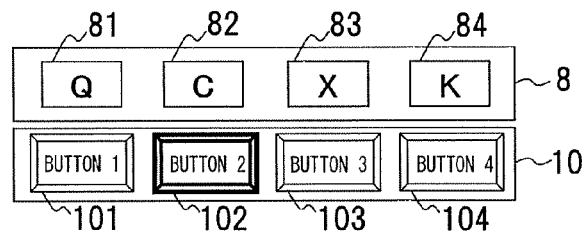

After this selection, as shown in FIG. 22B, for the second time, it is assumed that a symbol string "CIDE" not including the candidate symbol "A" of the password is displayed at the display positions 81, 82, 83, 84 of the displaying unit 8. If pressed down is the select button 102 at the display position 82 in the displayed symbol string, the candidate symbol "I" is selected but the selection of the input candidate symbol "I" is invalidated because the invalidation has been set. As shown in FIG. 22C, for the third time as well, it is assumed that a symbol string "QCXK" not including the candidate symbol of the password is displayed at the display positions 81, 82, 83, 84 of the displaying unit 8. If pressed down is the select button 102 at the display position 82 in the displayed symbol string, the selection of the input candidate symbol "C" is invalidated because the invalidation has been set.

Figure 22D:
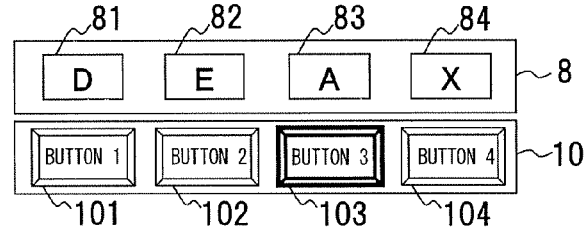
Figure 22E:
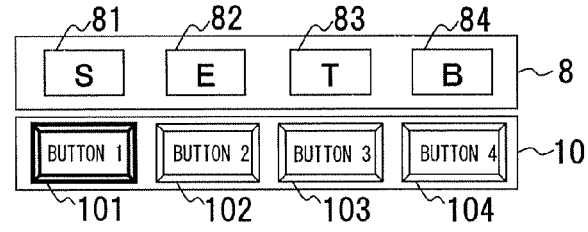

As shown in FIG. 22D, for the fourth time, it is assumed that a symbol string "DEAX" including the candidate symbol "A" of the password is displayed at the display positions 81, 82, 83, 84 of the displaying unit 8. If pressed down is the select button 103 at the display position 83 of the candidate symbol "A" of the password in the displayed symbol string, the candidate symbol "A" is selected. After this selection, as shown in FIG. 22E, for the fifth time, it is assumed that a symbol string "SETB" including the candidate symbol "S" of the password is displayed at the display positions 81, 82, 83, 84 of the displaying unit 8. If pressed down is the select button 101 at the display position 81 of the candidate symbol "S" of the password in the displayed symbol string, the candidate symbol "S" is selected.

Figure 22F:
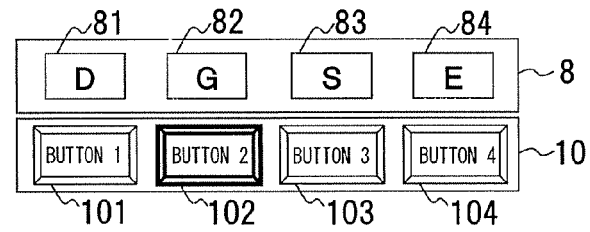
Figure 22G:
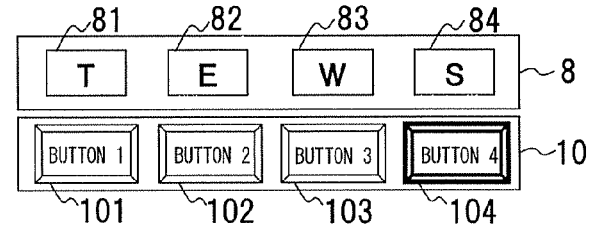

After this selection, as shown in FIG. 22F, for the sixth time, it is assumed that a symbol string "DGSE" including the candidate symbol "S" of the password is displayed at the display positions 81, 82, 83, 84 of the displaying unit 8. If, without pressing down the select button 103 at the display position 83 of the candidate symbol "S" of the password in the displayed symbol string, the select button 102 of the other display position 82 where the invalidation has been set is pressed down, the candidate symbol "G" is selected but the selection of the input candidate symbol "G" is invalidated because the invalidation has been set. As shown in FIG. 22G, for the seventh time, it is assumed that a symbol string "TEWS" including the candidate symbol "S" of the password is displayed at the display positions 81, 82, 83, 84 of the displaying unit 8. If pressed down is the select button 104 at the display position 84 of the candidate symbol "S" of the password in the displayed symbol string, the candidate symbol "S" is selected. In this way, the input of the password "PASS" is completed.

Similarly, the input password is compared with the registered password, and if the input password is identical to the registered password, the input of the password is completed. In this way, accompanied by the invalidation of the pressing down of the select button as well as the display not including the password character, the dummy input not involving the password character is incorporated as well as the dummy input by the pressing down of the invalidated select button. As a result, number of input operations is increased, and the relation between the candidate symbol and the passwords input is complicated. So, the password can be prevented from leaking out due to peeking, etc. In this example of the input operation, in case where the display not including the password character is permitted based on the setting of the dialogue display screen 214 (FIG. 21), the invalidated select button can be pressed down without relation to the password character input, and it is possible to avoid confusion of whether the password character is inputted. This example of the input operation is effective.

Fifth Embodiment

Figure 23:
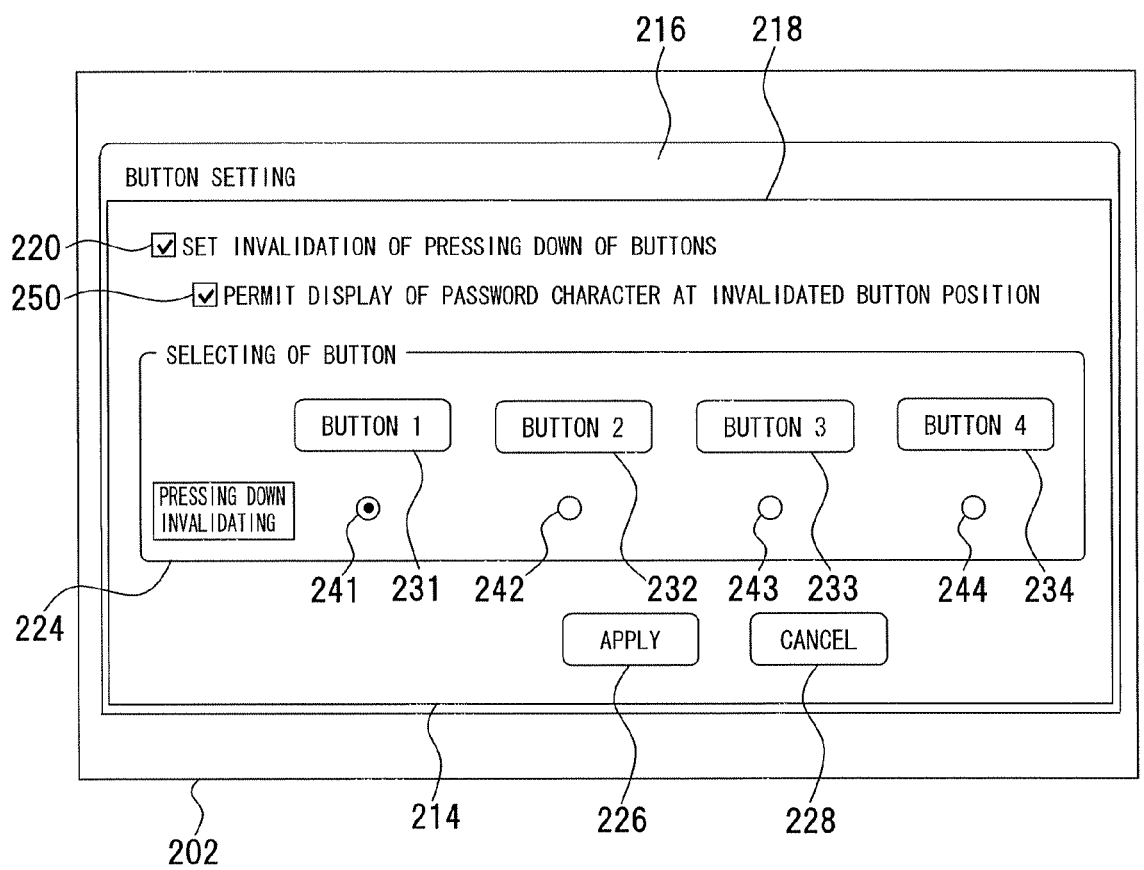
FIG. 23 is a diagram of an example of a dialogue display screen according to a fifth embodiment.
Figure 24:
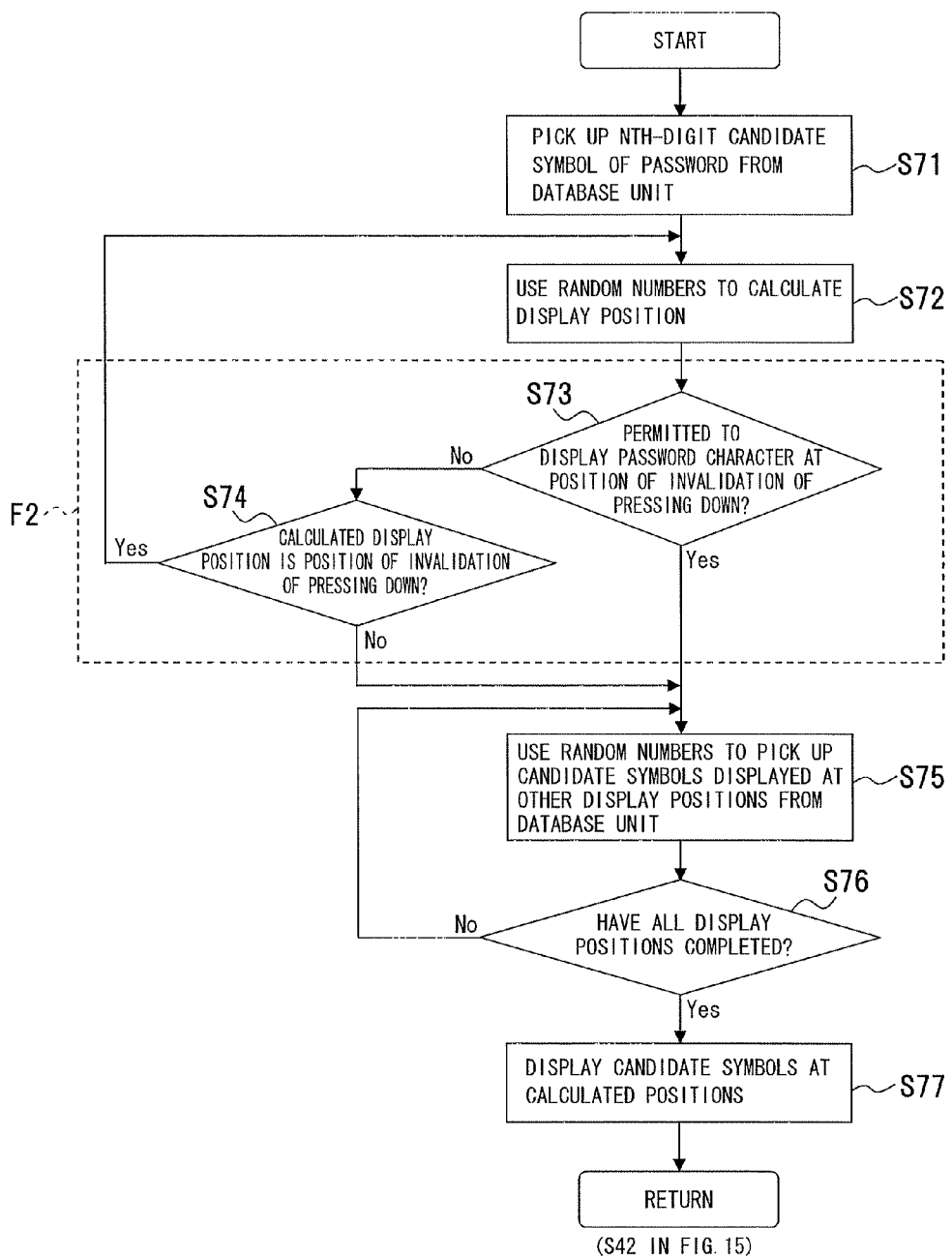
FIG. 24 is a flowchart of an example of a process procedure of input candidates of a password.

A fifth embodiment of the present invention will be described with reference to FIGS. 23 and 24. FIG. 23 is a diagram of an example of the dialogue display screen according to the fifth embodiment. FIG. 24 is a flowchart of an example of a process procedure of input candidates of a password. In FIG. 23, the same numerals are added to the portions same as FIG. 14.

Also in the embodiment, used are the password input/authentication system shown in FIG. 12 and the process procedure for the password input and authentication shown in FIG. 15.

As shown in FIG. 23, a dialogue display screen 214 of this embodiment realizes the invalidation setting of the button pressing down and a function for permitting display of the password character at the display position corresponding to the invalidated button position. On the dialogue display field 218 is displayed a check box 220 with "Setting the invalidation of the pressing down of the buttons" as an example of a message for indicating setting content to be selected. Below thereof is displayed a check box 250 with "permitting the display of the password character on the invalidated button position" as an example of a message for indicating permitting display of the password character on the position of the invalidated select button 101, 102, 103 or 104 as setting content to be selected. The other configurations are same as the fourth embodiment (FIG. 14).

In this case, each of the check boxes 220 and 250 is checked so that the invalidation of the pressing down of the button is set and it is permitted to display the password character on the invalidated button position. The check button 241 is checked so that the invalidation is set to the select button 101.

As shown in FIG. 24, the process procedure is a process example corresponding to the dialogue display screen 214 (FIG. 23). In this process procedure, process F2 is added to the processes of calculating the display positions of the password data with the use of random numbers and displaying the password data at all the display positions, it is permitted to display the password character at the invalidated select button and display position by steps S73 and S74 of the process F2. In this case, since the invalidation is set to the select button 101 and display position 81, the password character can be displayed on the position.

In this process procedure, the nth-digit candidate symbol of the password is picked up from the database unit 12 (step S71); based on the execution of the password input/authentication program 16, any one of the display positions 81, 82, 83, 84 is calculated with the use of the random numbers generated by the random-number generating unit 14 (step S72). It is determined whether or not it is permitted to display the password character on the position of the invalidation of the pressing down (step S73); if the display is not permitted (No at step S73), it is determined whether or not the calculated display position is the position of the invalidation of the pressing down (step S74); if the display position is the position of the invalidation of the pressing down (Yes at step S74), the procedure goes back to step S72.

In either of cases where it is permitted to display the password character on the position of the invalidation of the pressing down (Yes at step S73) or the display position is not the position of the invalidation of the pressing down (No at step S74) the candidate symbols to be displayed at the other display positions are picked up from the database unit 12 using the random numbers (step S75); it is determined whether all the display positions 81, 82, 83, 84 are completed or not (step S76); and the processes of steps S75 and S76 are performed until all the display positions 81, 82, 83, 84 and the candidate symbols to be displayed are determined. When the selections of all the display positions 81, 82, 83, 84 and the candidate symbols are completed (Yes at step S76), the candidate symbols are displayed at the calculated display positions 81, 82, 83, 84 (step S77), and the procedure goes back to step S42 (FIG. 15).

In such a process, the candidate symbols of the password are displayed at arbitrary display positions 81, 82, 83, 84 to perform the input preparation process for the password.

In this embodiment, since the candidate symbol of the password is displayed at the display position being set the invalidation of the pressing down, the user can input the password along with the operation such as avoiding the pressing down at the invalidated position. Accordingly, the relation between the candidate symbols and the password inputs is complicated, so the password can be protected from peeking of the password input, etc.

Sixth Embodiment

Figure 25:
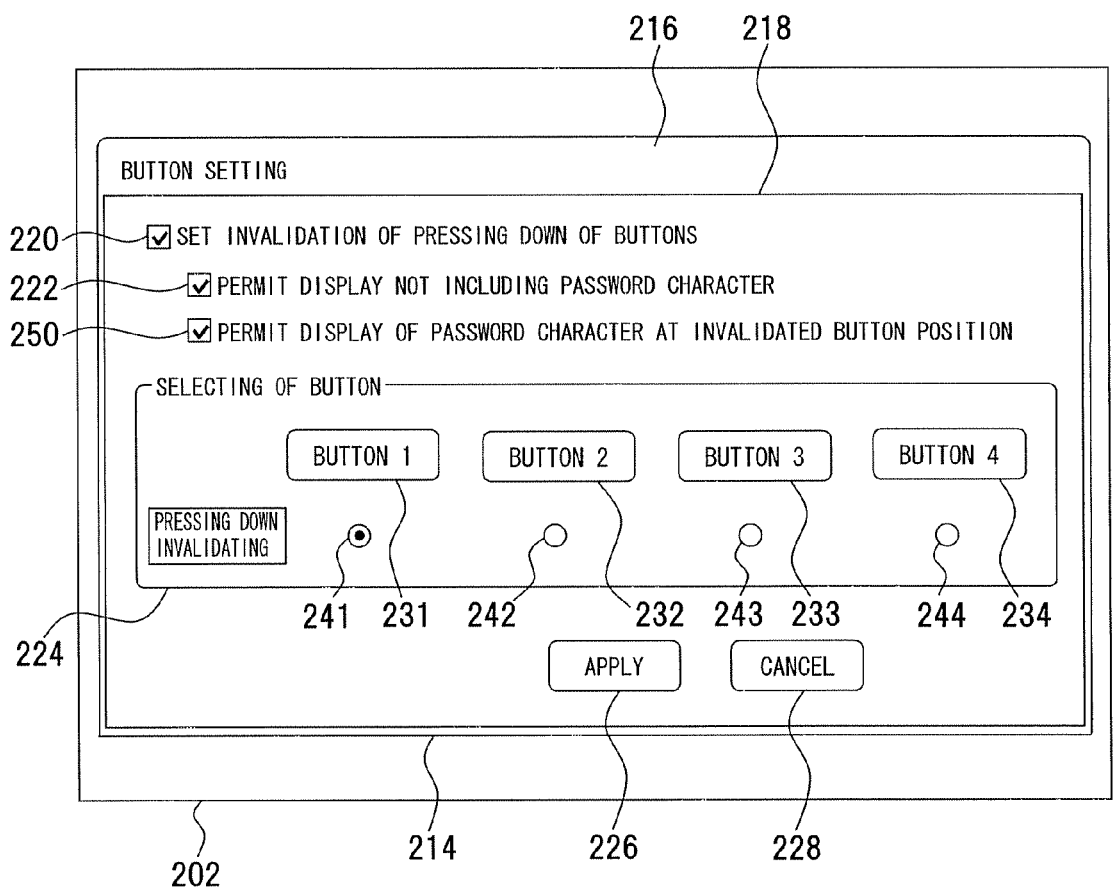
FIG. 25 is a diagram of an example of a dialogue display screen according to a sixth embodiment.
Figure 26:
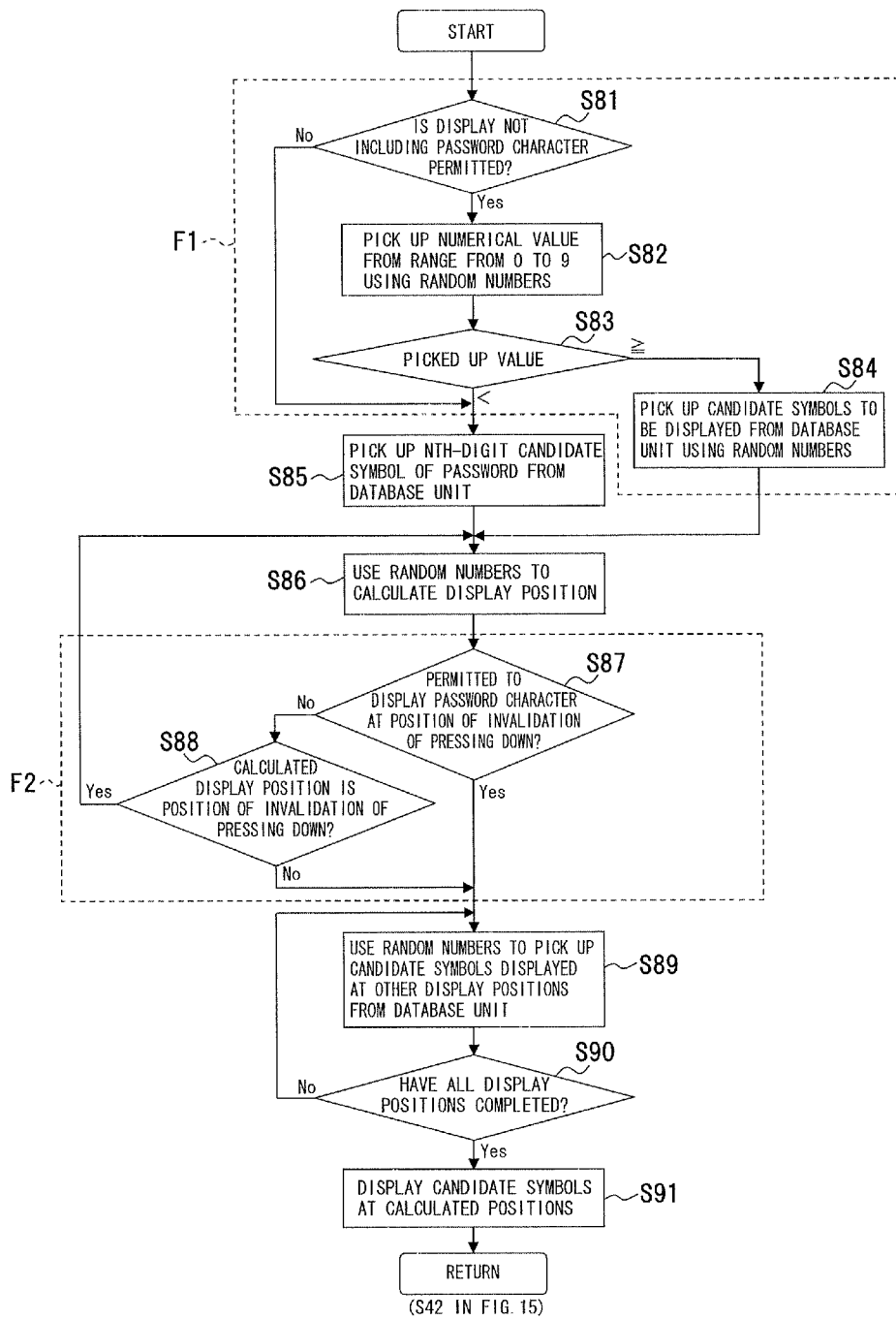
FIG. 26 is a flowchart of an example of a process procedure of input candidates of a password.

A sixth embodiment of the present invention will be described with reference to FIGS. 25 and 26. FIG. 25 is a diagram of an example of the dialogue display screen according to the sixth embodiment. FIG. 26 is a flowchart of an example of a process procedure of input candidates of a password. In FIG. 25, the same numerals are added to the portions same as FIGS. 21 and 23.

Also in the embodiment, used are the password input/authentication system shown in FIG. 12 and the process procedure for the password input and authentication shown in FIG. 15.

As shown in FIG. 25, a dialogue display screen 214 of this embodiment is a dialogue display for realizing processes that are invalidation setting of the pressing down of the select button, display of candidate symbol not including the password character, and permission of the display of the password character at the invalidated display position. On the dialogue display field 218 is displayed a check box 220 with "Setting the invalidation of the pressing down of the buttons" as an example of a message for indicating setting content to be selected. Below thereof, as with the fourth embodiment, is displayed a check box 222 with "Permitting display not including the password character" as an example of a message for indicating permitting display not including the password character. Below thereof, as with the fifth embodiment, is displayed a check box 250 with "permitting the display of the password character on the invalidated button position" as an example of a message for indicating permitting display of the password character on the position of the invalidated select button 101, 102, 103 or 104 as setting content to be selected. The other configurations are same as the fifth embodiment (FIG. 23).

In this case, each of the check boxes 220, 222, 250 is checked so that the invalidation of the pressing down of the button, the permission of the display not including the password character and the permission of the display of the password character at the invalidated button position are set. The check box 241 is checked so that the invalidation is set to the select button 101.

As shown in FIG. 26, the process procedure is a process example performing the function displayed in the dialogue display screen 214 (FIG. 25). In this process procedure, processes F1 and F2 are added to the processes of calculating the display positions of the password data with the use of random numbers and displaying the password data at all the display positions. The process F1 is a process associated with the permission of the display not including the password character. The process F2 is a process for permitting to display the password character at the invalidated select button and display position.

In this process procedure, it is determined whether the permission of the display not including the password characters is set or not (step S81); if the permission is set, a numerical value is picked up out of the range from 0 to 9 using the random numbers (step S82). It is determined whether or not the picked up value is not less than a reference value, for example 5 (step S83); if the picked up value is not less than 5 ($\geq 5$), the candidate symbols to be displayed is picked up from the database unit 12 using the random numbers (step S84); if the picked up value is less than 5 (<5), the nth-digit candidate symbol of the password is picked up from the database unit 12 (step S85). In this case, if the permission of the display not including the password characters is not set (No at step S81), the procedure goes to step S85, skipping steps S82 and S83.

Based on the execution of the password input/authentication program 16, any one of the display positions 81, 82, 83, 84 is calculated with the use of the random numbers generated by the random-number generating unit 14 (step S86). It is determined whether or not it is permitted to display the password character on the position of the invalidation of the pressing down (step S87); if the display is not permitted (No at step S87), it is determined whether or not the calculated display position is the position of the invalidation of the pressing down (step S88) if the display position is the position of the invalidation of the pressing down (Yes at step S88), the procedure goes back to step S86.

In either of cases where it is permitted to display the password character on the position of the invalidation of the pressing down (Yes at step S87) or the display position is not the position of the invalidation of the pressing down (No at step S88) the candidate symbols to be displayed at the other display positions are picked up from the database unit 12 using the random numbers (step S89); it is determined whether or not all the display positions 81, 82, 83, 84 are completed or not (step S90); and the processes of steps S89 and S90 are performed until all the display positions 81, 82, 83, 84 and the candidate symbols to be displayed are determined. When the selections of all the display positions 81, 82, 83, 84 and the candidate symbols are completed (Yes at step S90), the candidate symbols are displayed at the calculated display positions 81, 82, 83, 84 (step S91), and the procedure goes back to step S42 (FIG. 15).

In such a process, the candidate symbols of the password are displayed at arbitrary display positions 81, 82, 83, 84 to perform the input preparation process for the password.

In this embodiment, since the invalidation of the pressing down is set, the display not including the password characters is permitted, and the candidate symbol of the password is displayed at the display position being set the invalidation, the relation between the displays of the candidate symbols and dummy symbols and the password inputs is complicated, so the password can be protected from peeking of the password input, etc.

Seventh Embodiment

Figure 27:
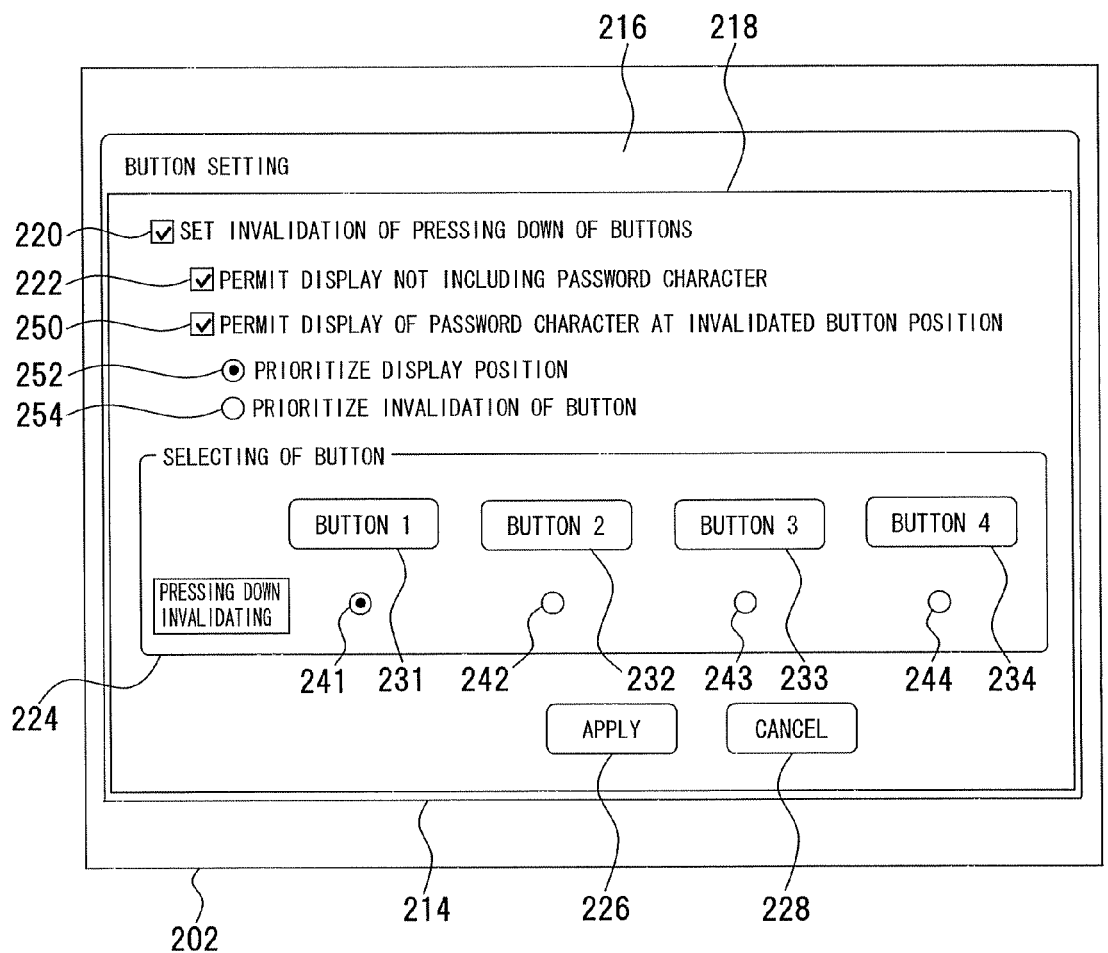
FIG. 27 is a diagram of an example of a dialogue display screen according to a seventh embodiment.
Figure 28:
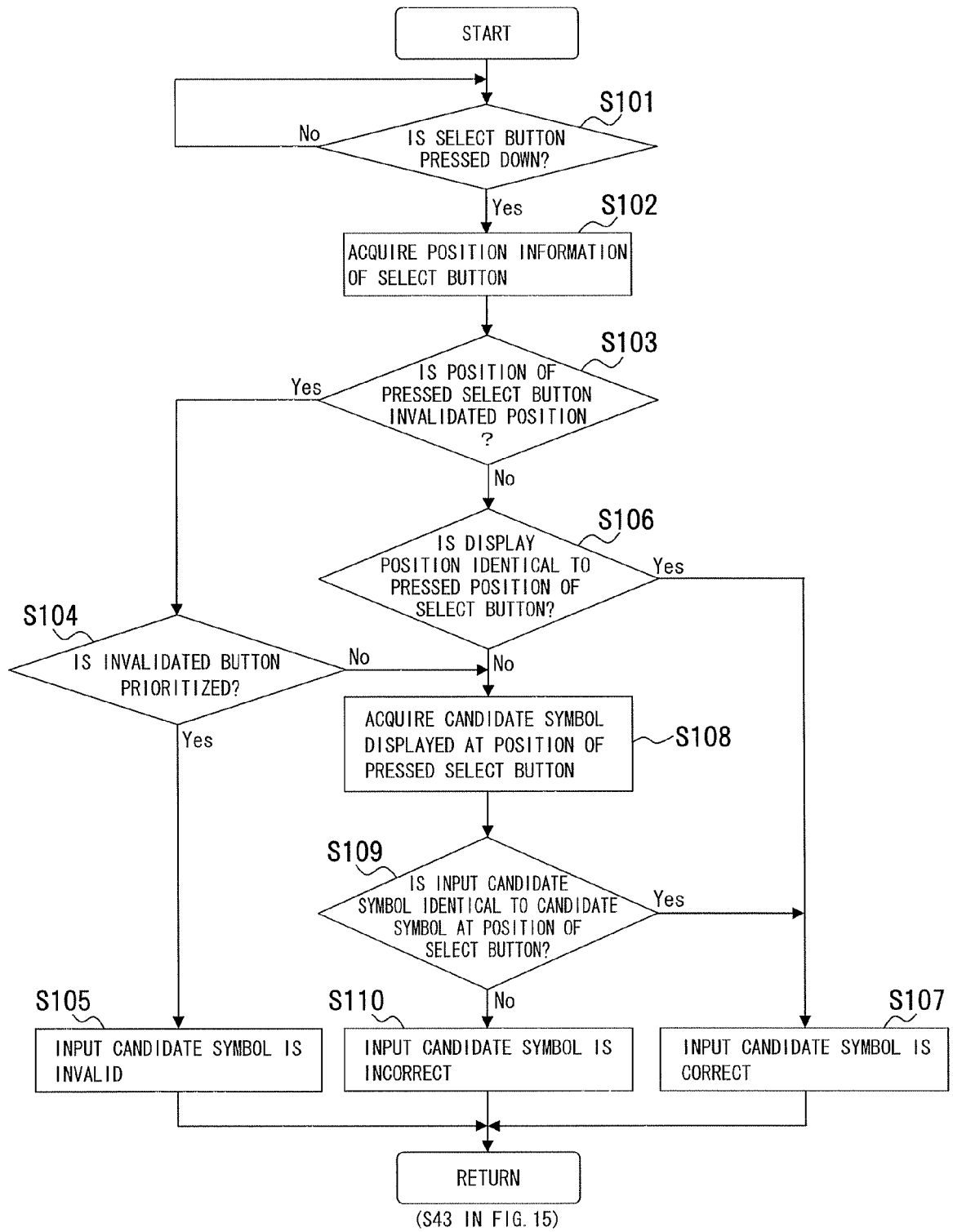
FIG. 28 is a flowchart of an example of a process procedure for monitoring the select buttons.

A seventh embodiment of the present invention will be described with reference to FIGS. 27 and 28. FIG. 27 is a diagram of an example of the dialogue display screen according to the seventh embodiment. FIG. 28 is a flowchart of an example of a process procedure for monitoring the select buttons. In FIG. 27, the same numerals are added to the portions same as FIG. 25.

Also in the embodiment, used are the password input/authentication system shown in FIG. 12 and the process procedure for the password input and authentication shown in FIG. 15.

As shown in FIG. 27, a dialogue display screen 214 of this embodiment is a dialogue display for realizing a function able to select a priority when pressing down the select button in case where the password character is displayed on the select button and display position to which the invalidation of the pressing down is set. On a dialogue display field 218, as with the sixth embodiment, the check boxes 220, 222, 250 are set. On the dialogue display field 218 is displayed a check box 252 with "Prioritize the display button" as an example of a message for indicating setting content to be selected. Below thereof is displayed a check box 254 with "Prioritize the invalidation of the button" as an example of a message for indicating that the invalidation of the button is given priority. The other configurations are same as the sixth embodiment (FIG. 25).

In this case, each of the check boxes 220, 222, 250, 252 is checked so that the invalidation of the pressing down of the button, the permission of the display not including the password character and the permission of the display of the password character at the invalidated button position are set as well as the process for prioritizing the display button is performed. The check box 241 is checked so that the select button 101 is selected to be set the invalidation.

As shown in FIG. 28, the process procedure is an example of a process to which a process of the select function of the priority corresponding to the dialogue display screen 214 (FIG. 27) is added. In this process procedure, it is determined whether or not any one of the select buttons 101, 102, 103, 104 is pressed down (step S101); if any one of the select buttons is pressed down (Yes at step S101), the position information representing the pressed select button 101, 102, 103 or 104 is acquired (step S102). As stated above, this position information is information that identifies the select buttons 101, 102, 103 or 104.

Based on the position information, it is determined whether or not the position of the select buttons 101, 102, 103 or 104 is the invalidated position (step S103); if it is the invalidated position (Yes at step S103), it is determined whether or not the invalidated button is prioritized (step S104); if the invalidated button is prioritized (Yes at step S104), the input candidate symbol is invalidated (step S105); the procedure goes back to step S43 in FIG. 15. If the invalidated button is not prioritized (No at step S104), the procedure goes back to step S108.

If the position of the pressed select button 101, 102, 103 or 104 is not the invalidated position (No at step S103), based on the acquired position information, it is determined whether or not the display position 81, 82, 83 or 84 of the candidate symbol of the password is identical to the position of the pressed select button 101, 102, 103, 104 (step S106); and since the display position 81, 82, 83 or 84 of the candidate symbol constituting the password is determined at step S56 of the flowchart shown in FIG. 16 and the display is performed at step S59 through step S56 (FIG. 16), if the positions are identical (Yes at step S106), it is determined that the input password data is correct, that is, the candidate symbol is correct (step S107).

If the display position 81, 82, 83 or 84 of the candidate symbol of the password is not identical to the operated position of the select button 101, 102, 103 or 104 (No at step S106), the candidate symbol displayed at the position of the pressed select button 101, 102, 103 or 104 is acquired (step S108). It is determined whether or not the input candidate symbol inputted by the pressed select button 101, 102, 103 or 104 is identical to the candidate symbol constituting the password (step S109); if the symbols are identical (Yes at step S109), it is determined that the input candidate symbol is correct (step S107). The procedure goes back to step S43 (FIG. 15). If the candidate symbol inputted by pressing down any one of the select button 101, 102, 103 or 104 is not identical to the candidate symbol of the password (No at step S109), it is determined that the input candidate symbol is incorrect (step S110) and the procedure goes back to step S43 (FIG. 15).

In such a process, when the candidate symbol of the password is displayed at the display position 81, 82, 83 or 84, the candidate symbol is acquired by pressing down the select button 101, 102, 103 or 104 at the position of the candidate symbol. In this case, if the invalidation is set to one or more of the select buttons 101, 102, 103, 104, for example if the invalidation is set to the select button 101, the pressing down thereof is invalidated and the pressing down the valid select button 102, 103 or 104 acquires the candidate symbol constituting the password. In this case, even when the same candidate symbols are displayed at two or more of the display positions 81, 82, 83, 84 at the same time, if any one of the corresponding select buttons 101, 102, 103, 104 is pressed down, by step S108 and S109, the candidate symbol can be inputted and the input password can be matched with the registered password.

In such a process, the candidate symbols of the password are displayed at arbitrary display positions 81, 82, 83, 84 to perform the input preparation process for the password.

In this embodiment, since the invalidation of the pressing down is set, the display not including the password character is permitted, the candidate symbol of the password is displayed at the display position being set the invalidation of the pressing down, and the processes of the priority of the invalidation of the button and the priority of the display character are added, the relation between the displays of the candidate symbols and dummy symbols and the password inputs is more complicated, so the password can be protected from peeking of the password input, etc.

Eighth Embodiment

Figure 29:
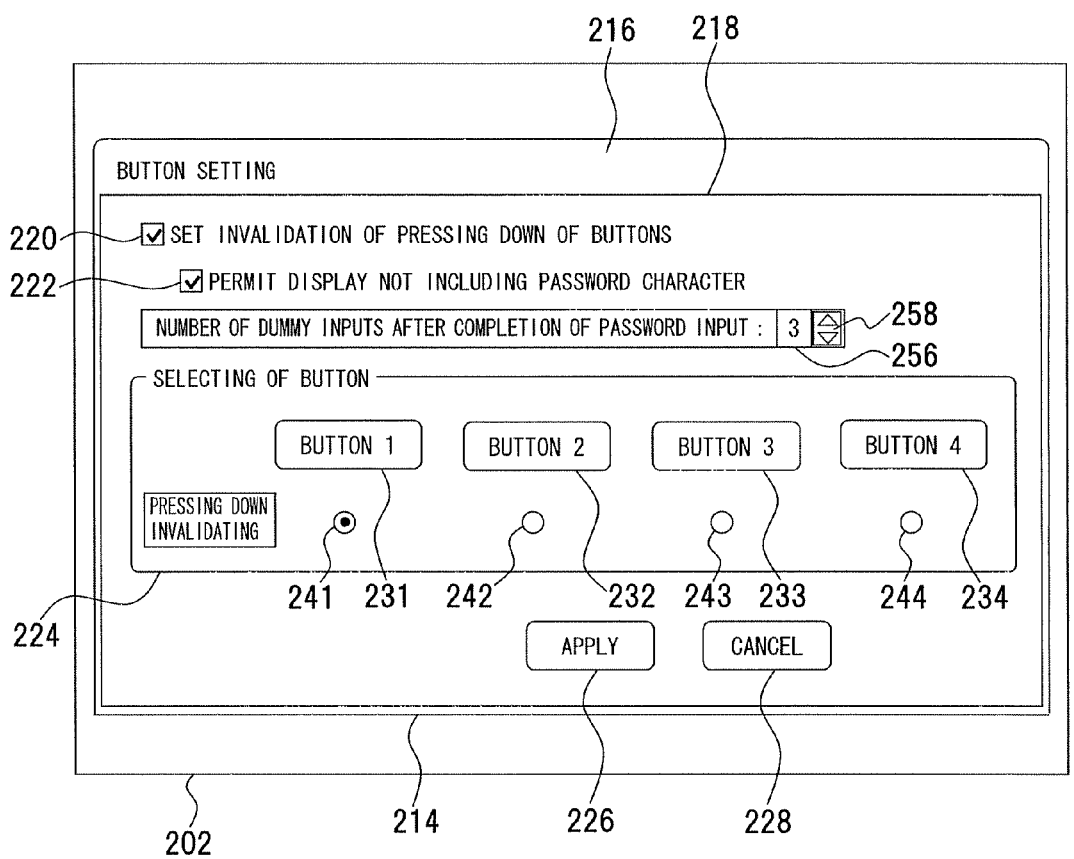
FIG. 29 is a diagram of an example of a dialogue display screen according to an eighth embodiment.
Figure 30:
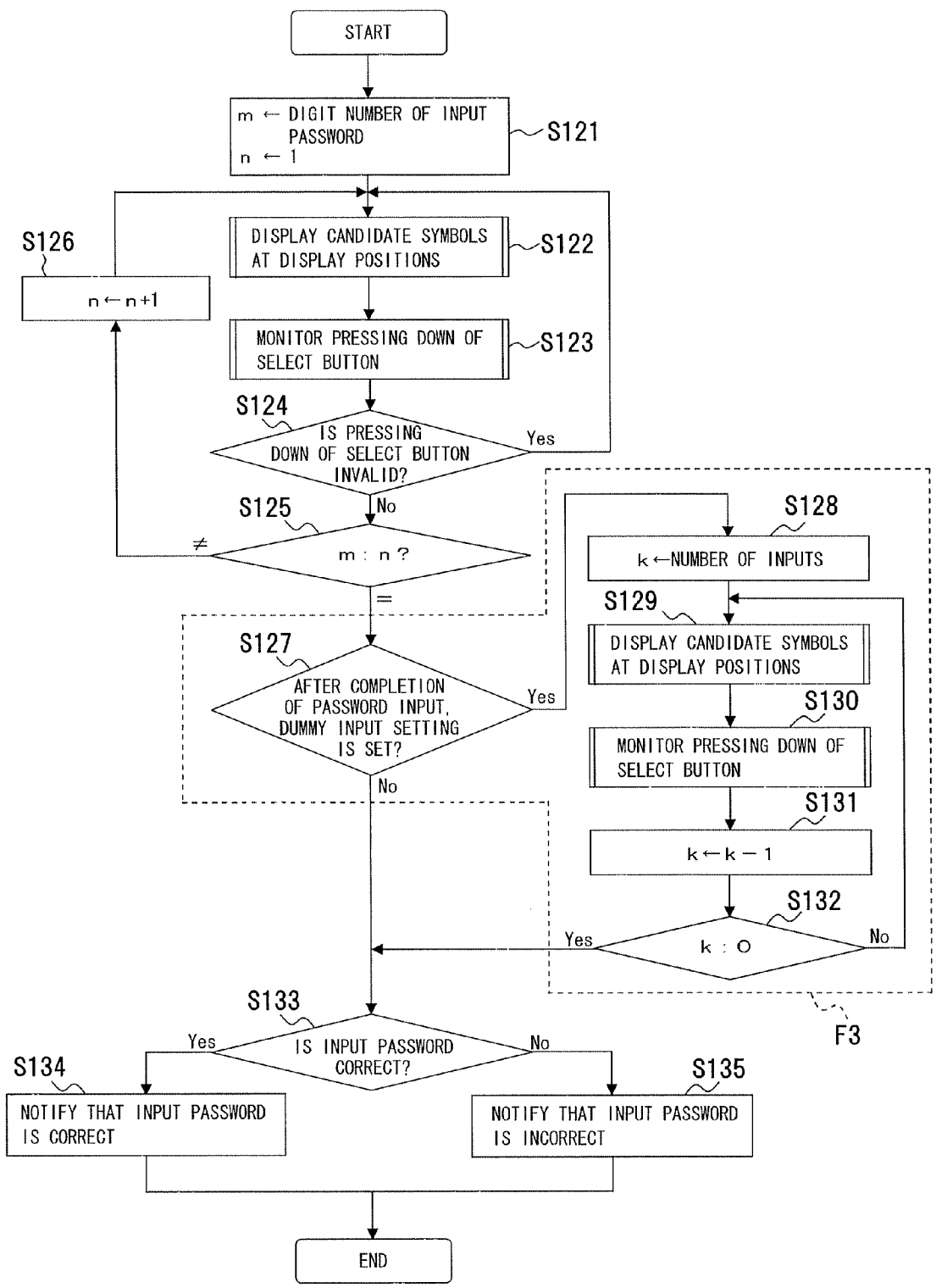
FIG. 30 is a flowchart of an example of a process procedure for a password input and authentication.

An eighth embodiment of the present invention will be described with reference to FIGS. 29 and 30. FIG. 29 is a diagram of an example of the dialogue display screen according to the eighth embodiment. FIG. 30 is a flowchart of an example of a process procedure for the password input and authentication. In FIG. 29, the same numerals are added to the portions same as FIG. 21.

Also in this embodiment, the password input/authentication system shown in FIG. 12 is used.

As shown in FIG. 29, a dialogue display screen 214 of this embodiment is a dialogue display for realizing a setting which performs the dummy input after the completion of the password input. As with the fourth embodiment, on the dialogue display field 218 is displayed a check box 220 with "Setting the invalidation of the pressing down of the buttons" as an example of a message for indicating setting content to be selected. Below thereof is displayed a check box 222 with "Permitting display not including the password character" as an example of a message for indicating permitting display not including the password character. Below thereof is displayed "number of the dummy inputs after the completion of the password input" as an example of a message for indicating setting content about the dummy input setting after the completion of the password input, and are set a number-of-times input field 256 and a spin button 258 for specifying the number of times to be inputted to the number-of-times input field 256. The other configurations are same as the dialogue display field 214 in FIG. 21.

In this case, each of the check boxes 220, 222 is checked so that the invalidation of the pressing down of the button and the permission of the display not including the password character are set and "3" is set as the number of the dummy inputs after the completion of the password input.

As shown in FIG. 30, this process procedure is an example of a process to which the dummy input process corresponding to the dialogue display screen 214 (FIG. 29) is added. Steps S127, S128, S129, S130, S131 and S132 in a process F3 is a part of the dummy input process. In this process procedure, by executing the password input/authentication program 16, the display positions are determined for the candidate symbols, which are password data (step S121). At step S121, m is a digit number of the input password, and when the password is four-digit, m=4. n is a digit position in digit number m and n=1, 2, 3, . . . .

When the nth digit of the password is specified, the nth-digit candidate symbol and candidate symbols of the other digits are picked up from the password data and these candidate symbols are displayed as input candidate symbols at the display positions 81, 82, 83, 84 of the displaying unit 8 (step S122). The pressing down of the select buttons 101, 102, 103, 104 is monitored correspondingly to the display (step S123); if anyone of the select buttons 101, 102, 103, 104 is selected, it is determined whether the input candidate symbol is invalid or not (step S124). If the input candidate symbol is invalid (Yes at step S124), the procedure goes back to step S122. If the input candidate symbol is not invalid (No at step S124), the number of digits is determined (m:n?) (step S125); a (n+1) process is performed as a process for incrementing the input digit number n until m=n (step S126); and the display of the candidate symbols and the monitoring of the pressing down of the select buttons 101, 102, 103, 104 are performed.

When m=n, after the completion of the password input, it is determined whether or not the dummy input setting is set (step S127), if the dummy input setting is set (Yes at step S127), "k" as the number of the dummy inputs is set (step S128). Regarding this dummy input, the input candidate symbols are displayed at the display positions 81, 82, 83, 84 of the displaying unit 8 (step S129); corresponding to this display, the monitoring of the pressing down of the select buttons 101, 102, 103, 104 are performed (step S130); a (k−1) process is performed as a process for decrementing the input number k until k=0 (step S131); the display of the candidate symbols and the monitoring of the pressing down of the select buttons 101, 102, 103, 104 are performed, it is determined whether or not k gets to k=0 (step S132).

In step S132, when k gets to k=0 (Yes at step S132), or when the dummy input setting is not set (No at step S127), for the input password authentication process, it is determined whether the input password is correct or not, that is, whether the input password is identical to the registered password or not (step S133); if the input password is correct (Yes at step S133), it is notified that the input password is correct (step S134); if the input password is incorrect (No at step S133), it is notified that the input password is incorrect (step S135); and the password input/authentication process is completed. The notification of whether the input password is correct or incorrect may be displayed on the displaying unit 8 or may be displayed on the displaying unit 202.

In this way, since the dummy input is added to the password input, the password can be protected from peeking of the password input, etc.

Ninth Embodiment

Figure 31:
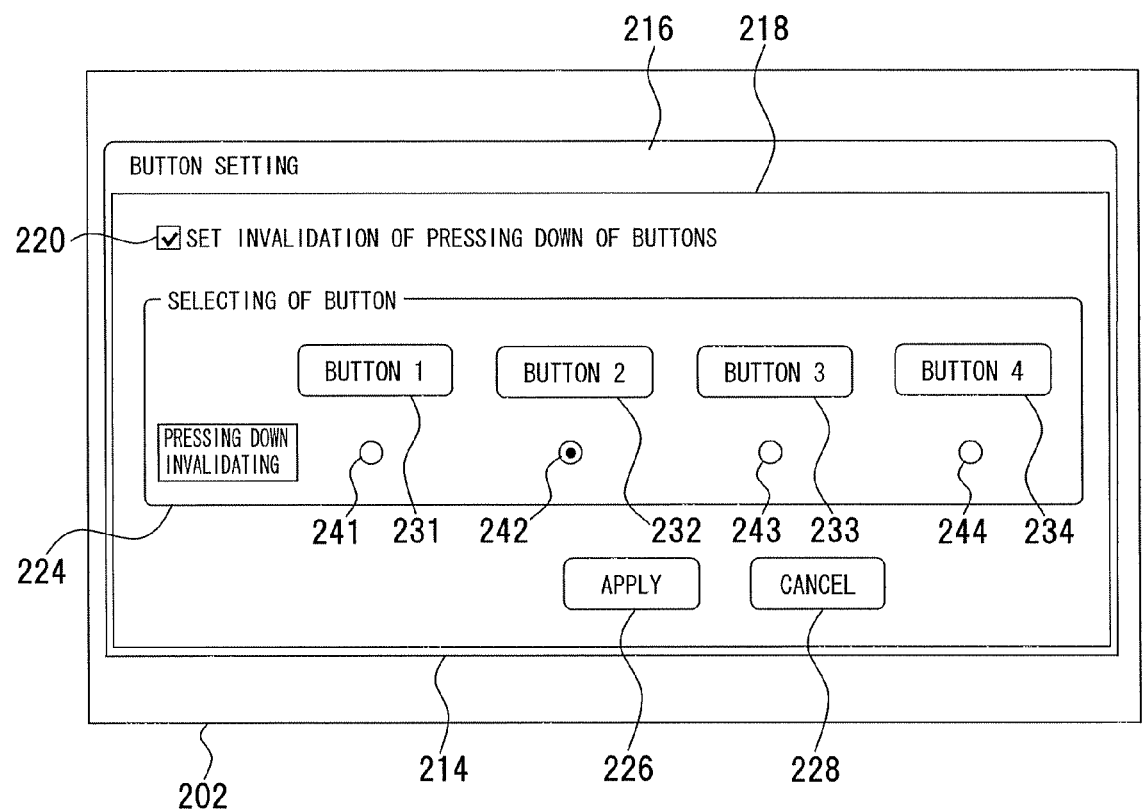
FIG. 31 is a diagram of an example of a dialogue display screen according to a ninth embodiment.
Figure 32:
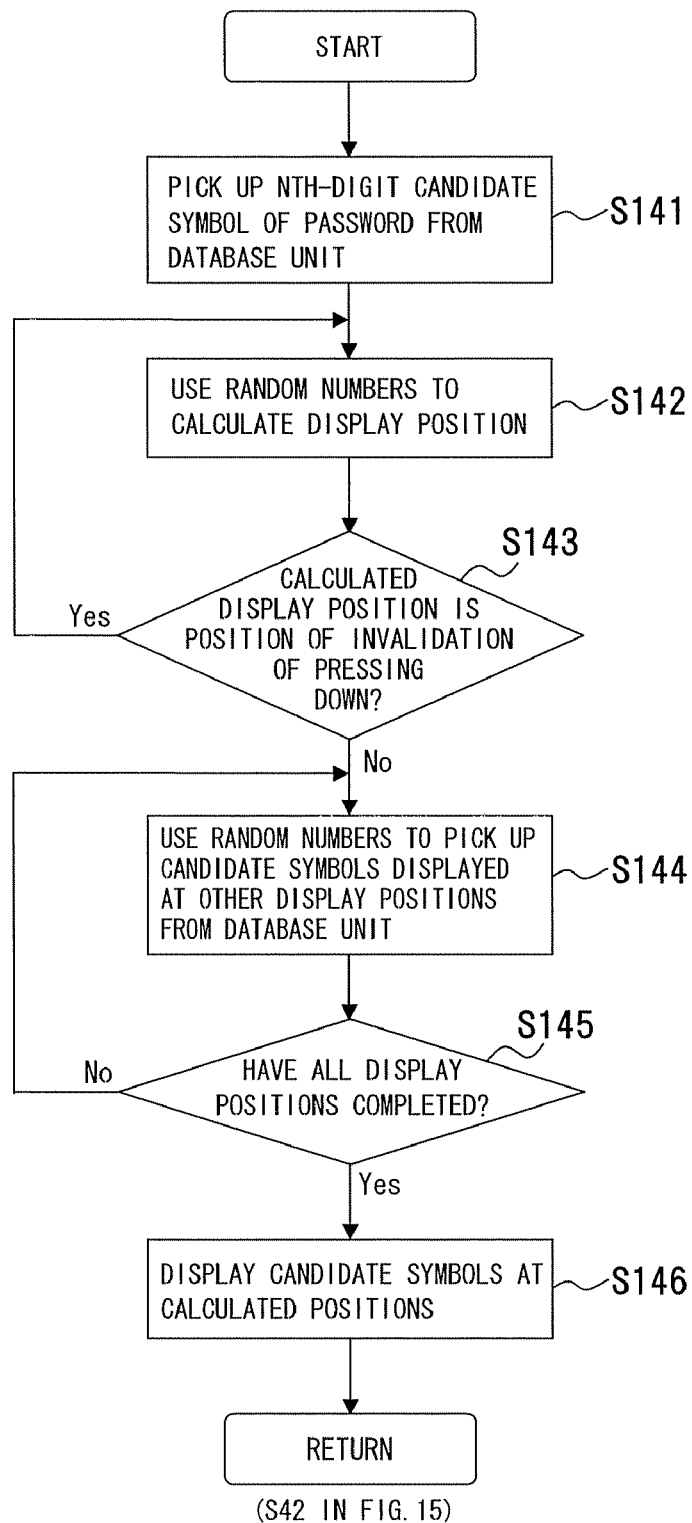
FIG. 32 is a flowchart of an example of a process procedure for input candidates of a password.

A ninth embodiment of the present invention will be described with reference to FIGS. 31 and 32. FIG. 31 is a diagram of an example of the dialogue display screen according to the ninth embodiment. FIG. 32 is a flowchart of an example of a process procedure for input candidates of a password. In FIG. 31, the same numerals are added to the portions same as FIG. 14.

Also in this embodiment, the password input/authentication system shown in FIG. 12 is used. Regarding setting for invalidating the pressing down the select button, on a dialogue display field 218 of a dialogue display screen 214 of this embodiment is displayed a check box 220 for the selection input together with "Setting the invalidation of the pressing down of the buttons" as an example of a message for indicating the setting content to be selected. The other configurations are same as the fourth embodiment (FIG. 14).

In this case, the check box 220 is checked so that the invalidation of the pressing down of the button is set; the check box 242 is checked so that the invalidation is set to the select button 102.

As shown in FIG. 32, the process procedure involves the processes of calculating the display positions of the password data with the use of random numbers, displaying the password data at all the display positions, setting the invalidation of the select buttons 101, 102, 103, 104, and so on. In this case, the invalidation is set to the select button 102 and the display position 82.

In this process procedure, the nth-digit candidate symbol of the password is picked up from the database unit 12 (step S141); based on the execution of the password input/authentication program 16, any one of the display positions 81, 82, 83, 84 is calculated with the use of the random numbers generated by the random-number generating unit 14 (step S142). It is determined whether or not the calculated display position is the position of the invalidation of the pressing down (step S143). If the display position is the position of the invalidation of the pressing down (Yes at step S143), the procedure goes back to step S142.

If the display position is not the position of the invalidation of the pressing down (No at step S143), the candidate symbols to be displayed at the other display positions are picked up from the database unit 12 using the random numbers (step S144); it is determined whether or not all the display positions 81, 82, 83, 84 are completed or not (step S145); and the processes of steps S144 and S145 are performed until all the display positions 81, 82, 83, 84 and the candidate symbols to be displayed are determined. When the selections of all the display positions 81, 82, 83, 84 and candidate symbols are completed (Yes at step S145), the candidate symbols are displayed at the calculated display positions 81, 82, 83, 84 (step S146), and the procedure goes back to step S42 (FIG. 15).

In this embodiment, since the invalidation of the pressing down is set, the password input can be performed while accompanying the operation such as avoiding the pressing down of the invalidated position. Accordingly, the relation between the candidate symbols and the password inputs is complicated, so the password can be protected from peeking of the password input, etc.

Tenth Embodiment

Figure 33:
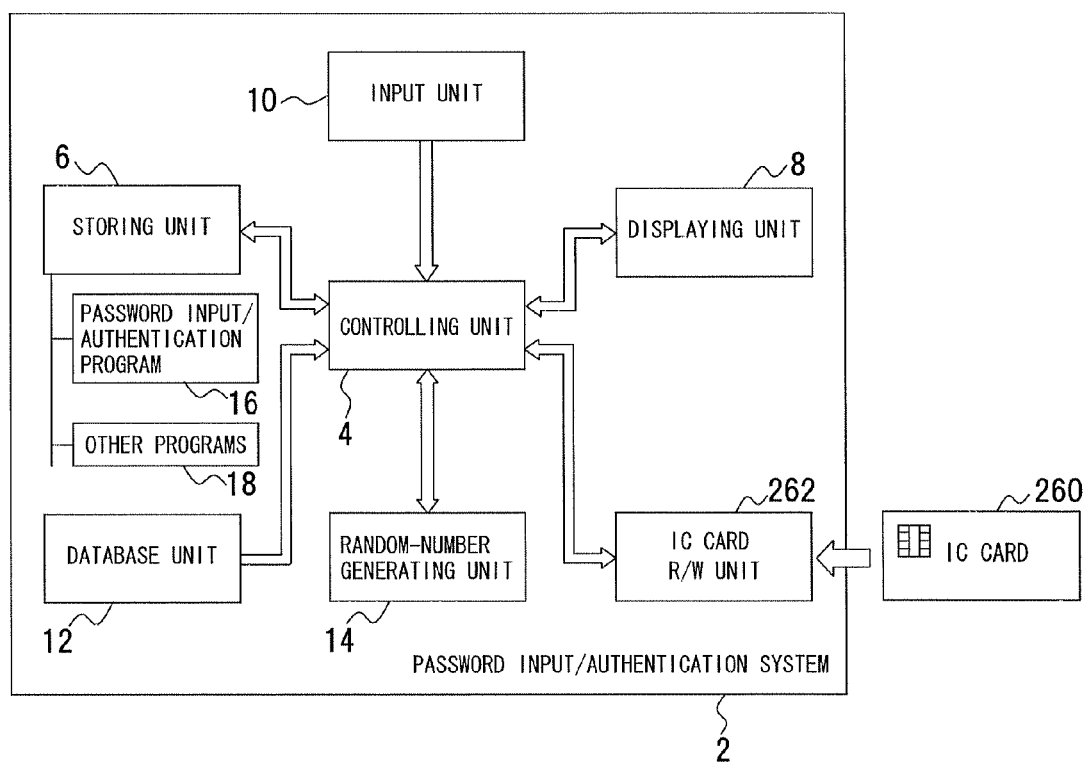
FIG. 33 is a block diagram of one configuration example of a password input/authentication system according to a tenth embodiment.
Figure 34:
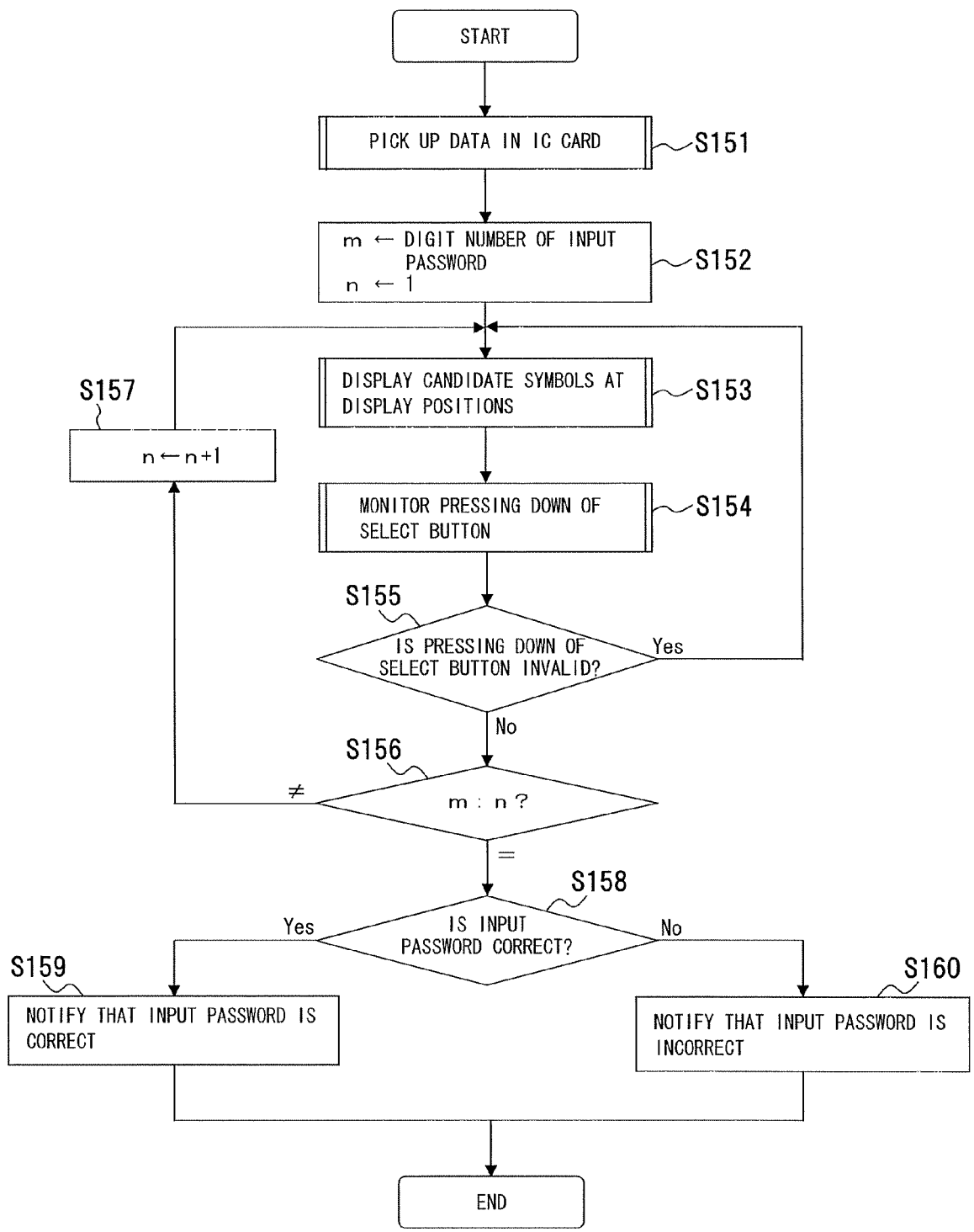
FIG. 34 is a flowchart of an example of a process procedure for password input and authentication.
Figure 35:
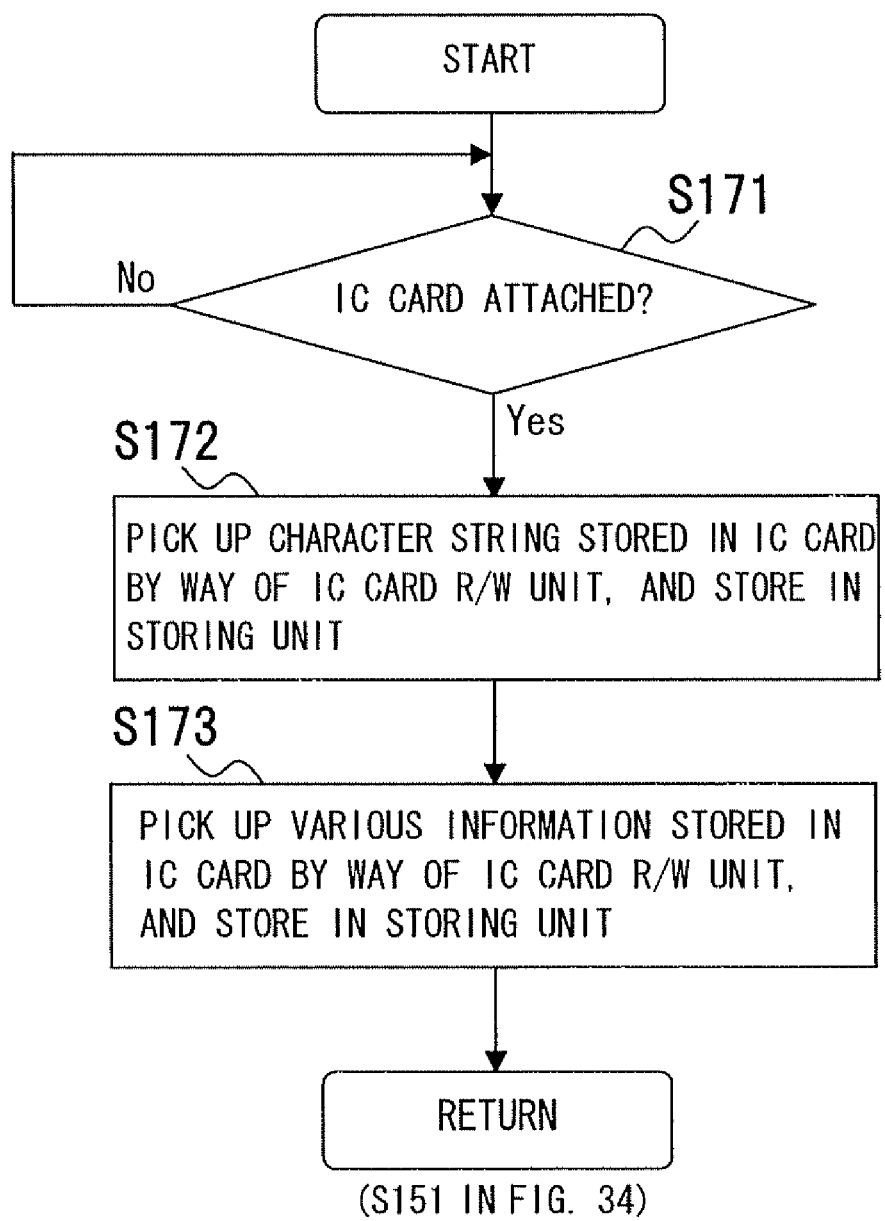
FIG. 35 is a diagram of an example of a process procedure for picking up data from an IC (Integrated Circuit) card.

A Tenth embodiment of the present invention will be described with reference to FIGS. 33, 34 and 35. FIG. 33 is a block diagram of one configuration example of a password input/authentication system. FIG. 34 is a flowchart of an example of a process procedure for the password input and authentication. FIG. 35 is a diagram of an example of a process procedure for retrieving data from an IC (Integrated Circuit) card. In FIG. 33, the same numerals are added to the portions same as FIG. 1.

The password input/authentication system 2 in this embodiment is an example of electronic apparatuses such as a PC and is used to input a password and to authenticate the password. The password input/authentication system 2 is, for example, constituted by a PC or with including a PC, so as to equip the password input and password authentication function described above. Unlike the above described embodiment, the password input/authentication system 2 in this embodiment uses an IC card 260 as an external memory device needing the password input and is provided with an IC card reading/writing (R/W) unit 262 as an external data input-output unit corresponding to the IC card 260. The other configurations are same as the password input/authentication system 2 in FIG. 1.

The IC card 260 stores setting information, etc. of the invalidated select button. The IC card R/W unit 262 corresponding to the IC card 260 is a part where the IC card 260 is attached as well as an input-output unit for reading out data from the IC card 260 and/or writing data into the IC card 260.

As shown in FIG. 35, this process procedure in this embodiment includes process for detecting the attachment of the IC card 260 and process for reading out the password and other process information, for example the button position of the invalidation of pressing down, etc. from data in the IC card 260 to the storing unit 6.

By executing the password input/authentication program 16, attaching the IC card 260 to the IC card R/W unit 262 picks up the stored data out of the IC card 260 to store the data into the storing unit 6 (step S151); the display positions of the candidate symbols of the password are determined (step S152). At step S152, m is a digit number of the input password, and when the password is four-digit, m=4. n is a digit position in digit number m and n=1, 2, 3, . . . .

When the nth digit of the password is specified, the nth-digit candidate symbol and candidate symbols of the other digits are picked up from the password data and these candidate symbols are displayed as input candidate symbols at the display positions 81, 82, 83, 84 of the displaying unit 8 (step S153). The pressing down of the select buttons 101, 102, 103, 104 is monitored correspondingly to the display (step S154); if anyone of the select buttons 101, 102, 103, 104 is selected, it is determined whether the pressing down of the select button is invalid or not (step S155). If the pressing down of the select button is invalid (Yes at step S155), the procedure goes back to step S153. If the pressing down of the select button is not invalid (No at step S155), the number of digits is determined (m:n?) (step S156); a (n+1) process is performed as a process for incrementing the input digit number n until m=n (step S157); and the display of the candidate symbols and the monitoring of the pressing down of the select buttons 101, 102, 103, 104 are performed.

For the input password authentication process, it is determined whether the input password is correct or not, that is, whether the input password is identical to the registered password or not (step S158); if the input password is correct (Yes at step S158), it is notified that the input password is correct (step S159); if the input password is incorrect (No at step S158), it is notified that the input password is incorrect (step S160); and the password input/authentication process is completed. The notification of whether the input password is correct or incorrect may be displayed on the displaying unit 8 or may be displayed on the displaying unit 202. This embodiment includes the process of the determination of the invalidation of the pressing down of the select button (step S155), whereas, it is possible to applied to the case where such a process is not included, and structures using together with the processes shown in the sixth, seventh and eighth embodiment may be adopted.

In the process procedure of the process where the data in the IC card 260 is picked up (step S151), as shown in FIG. 35, it is determined whether or not the IC card 260 is attached (step S171); if the IC card 260 is attached (Yes at step S171); a character string stored in the IC card 260 is picked up by way of the IC card R/W unit 262 to store the character string in the storing unit 6 (step S172). Besides, various information stored in the IC card 260 are picked up by way of the IC card R/W unit 262 to store them in the storing unit 6 (step S173). Where the various information stored in the IC card 260 include the items such as the button position of the invalidation of the pressing down set at the dialogue display screen 214.

In such a password input/authentication system 2, by storing the setting information such as the invalidation information of the select button in the IC card 260 needing the password input, it is possible to invalidate the pressing down of the select button not only at the specific device but also in every environment able to use the setting information stored in the IC card 260. So the peeking of the password is prevented. The password input is simplified while the user is not forced to bear the burden. The security for the password, such as preventions of the peeking and the leaking out the password, is enhanced.

Other Embodiments

Other embodiments of the present invention are listed as follows.

Figure 36:
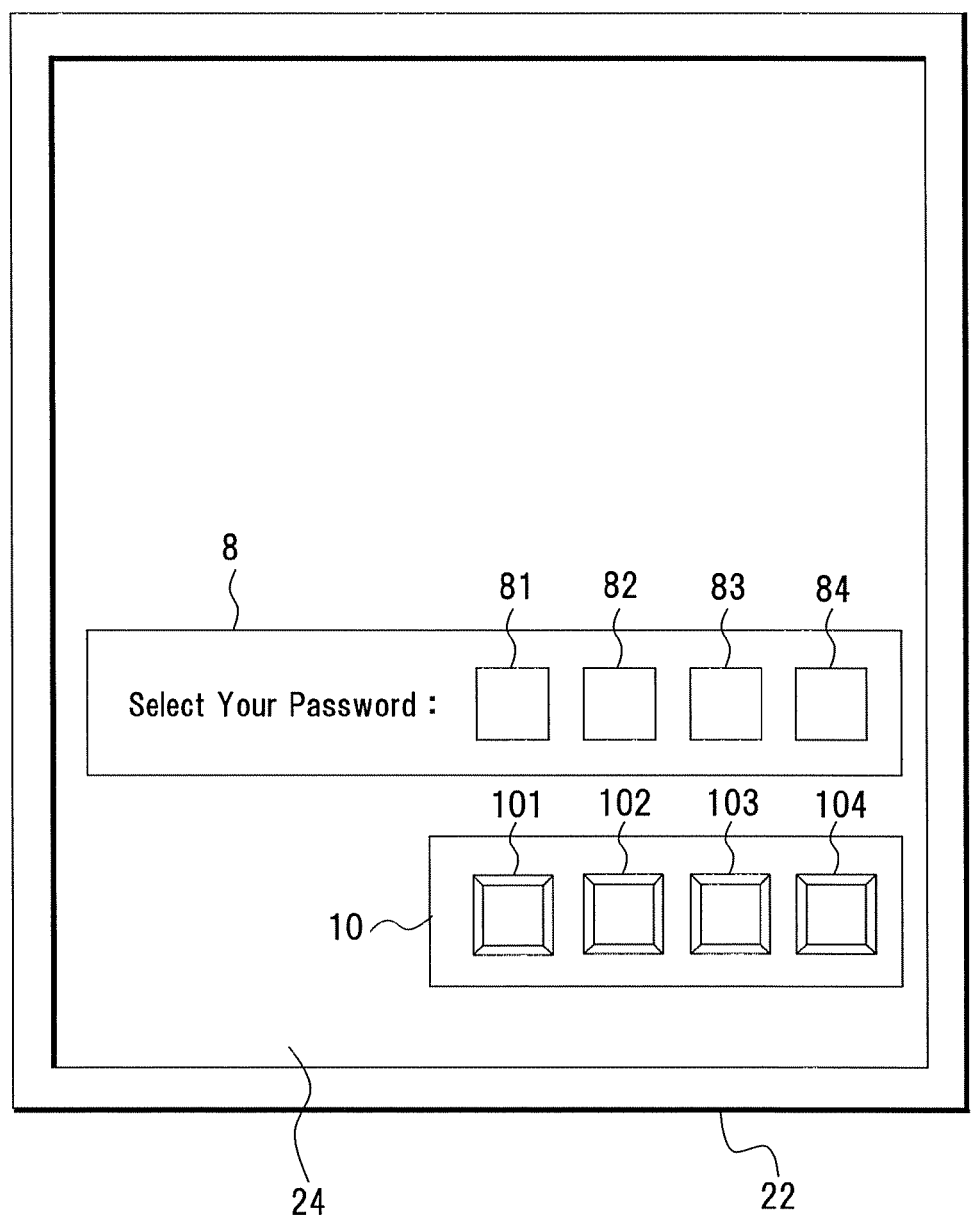
FIG. 36 shows an image display device that is an example of the displaying unit, according to other embodiments.

(1) Although description has been made of the configuration example using the sub-display for the displaying unit 8 by way of example in the above embodiments, the password input/authentication system may include a process or step that generates the displaying unit 8 and the input unit 10 as images on a display screen and, for example, as shown in FIG. 36, the displaying unit 8 and the input unit 10 may be displayed as images on a display screen 24 of a main display 22. In this case, the main display 22 is an image display device or a displaying unit of an electronic apparatus such as a personal computer and a cellular phone; the display positions 81, 82, 83, 84 displaying the password candidate symbols are formed as images on the display screen 24 of the main display 22; the select buttons 101, 102, 103, 104 are displayed as images at the positions corresponding to the display positions 81, 82, 83, 84; the select buttons 101, 102, 103, 104 are pressed down by key operations or cursor operations, etc. for the password candidate symbol displayed at the display position 81, 82, 83, 84; and the candidate symbols are selected to input the password.

Figure 37:
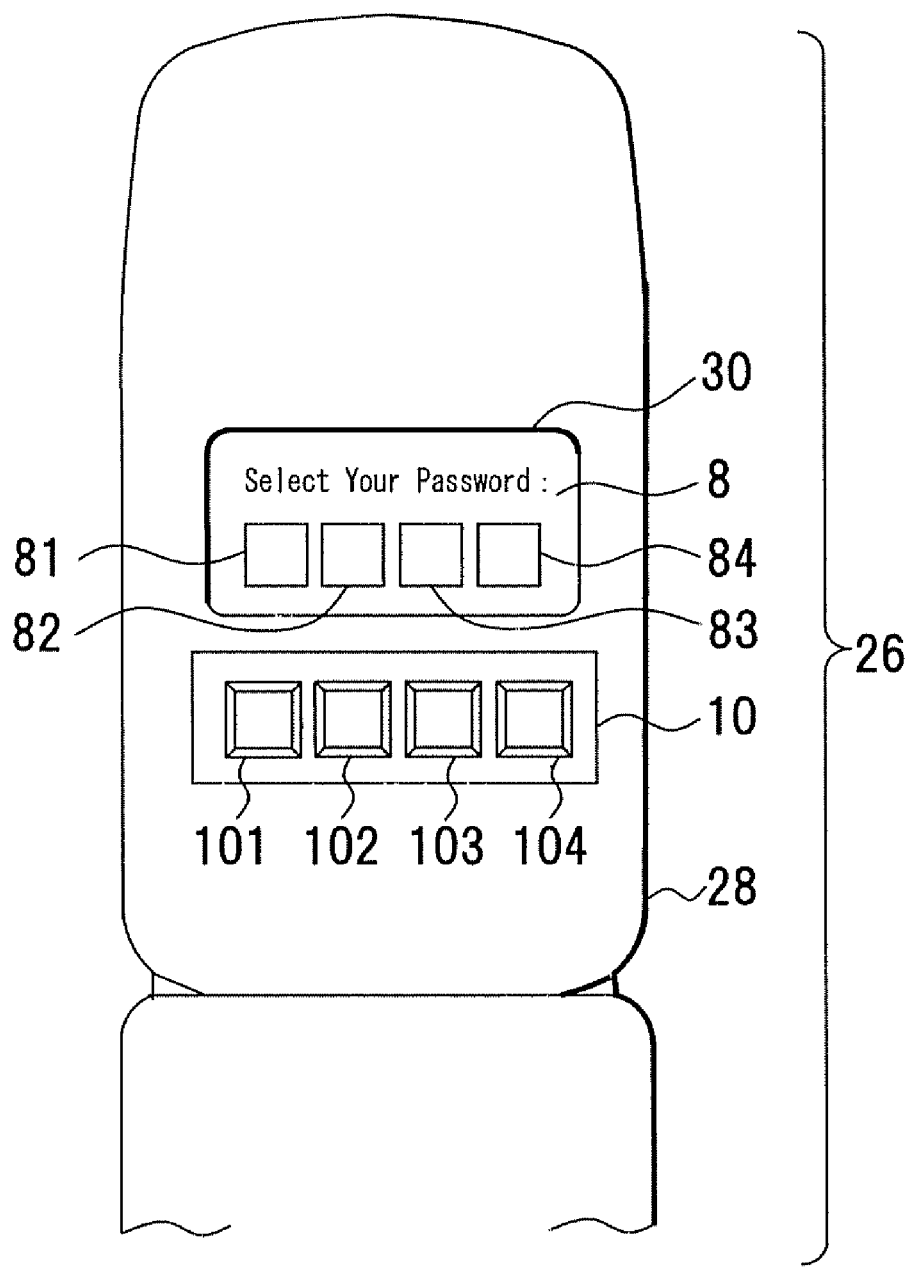
FIG. 37 shows a portable terminal device that is an example of an electronic apparatus using the password input/authentication system.
Figure 38:
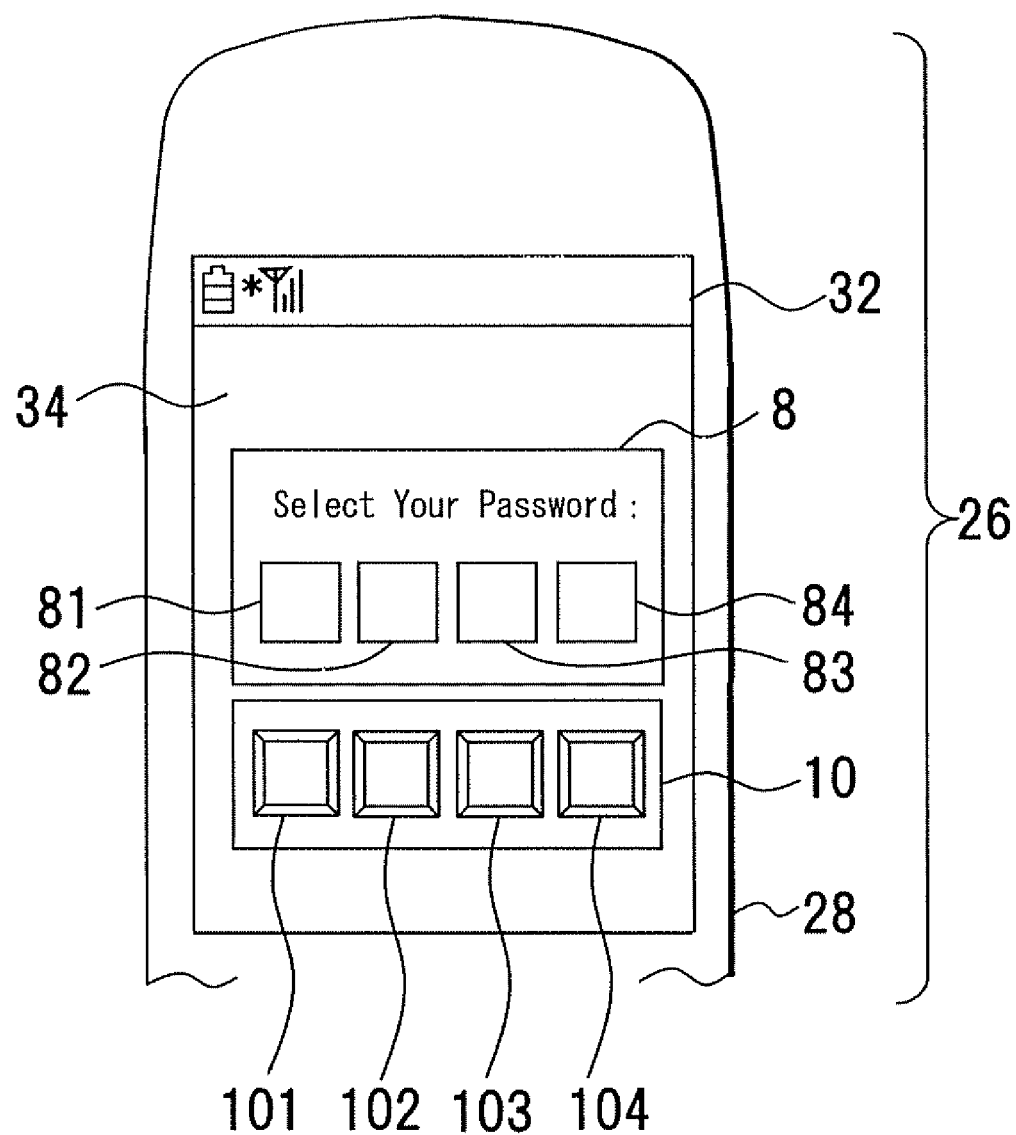
FIG. 38 shows a portable terminal device that is an example of an electronic apparatus using the password input/authentication system.

(2) The password input/authentication system 2 of the above embodiments can be used in various electronic apparatuses and can be used in a portable terminal device 26 as shown in FIG. 37, for example. In this case, the displaying unit 8 may be constituted by a sub-display 30 installed on a case 28 of the portable terminal device 26, and the select buttons 101, 102, 103, 104 of the input unit 10 may be disposed correspondingly to the display positions 81, 82, 83, 84 of the displaying unit 8, or as shown in FIG. 38, a display screen 34 of a main display 32 may display the display positions 81, 82, 83, 84 of the displaying unit 8 and the select buttons 101, 102, 103, 104 of the input unit 10 to input the password as in the case of (1) described above.

Figure 39:
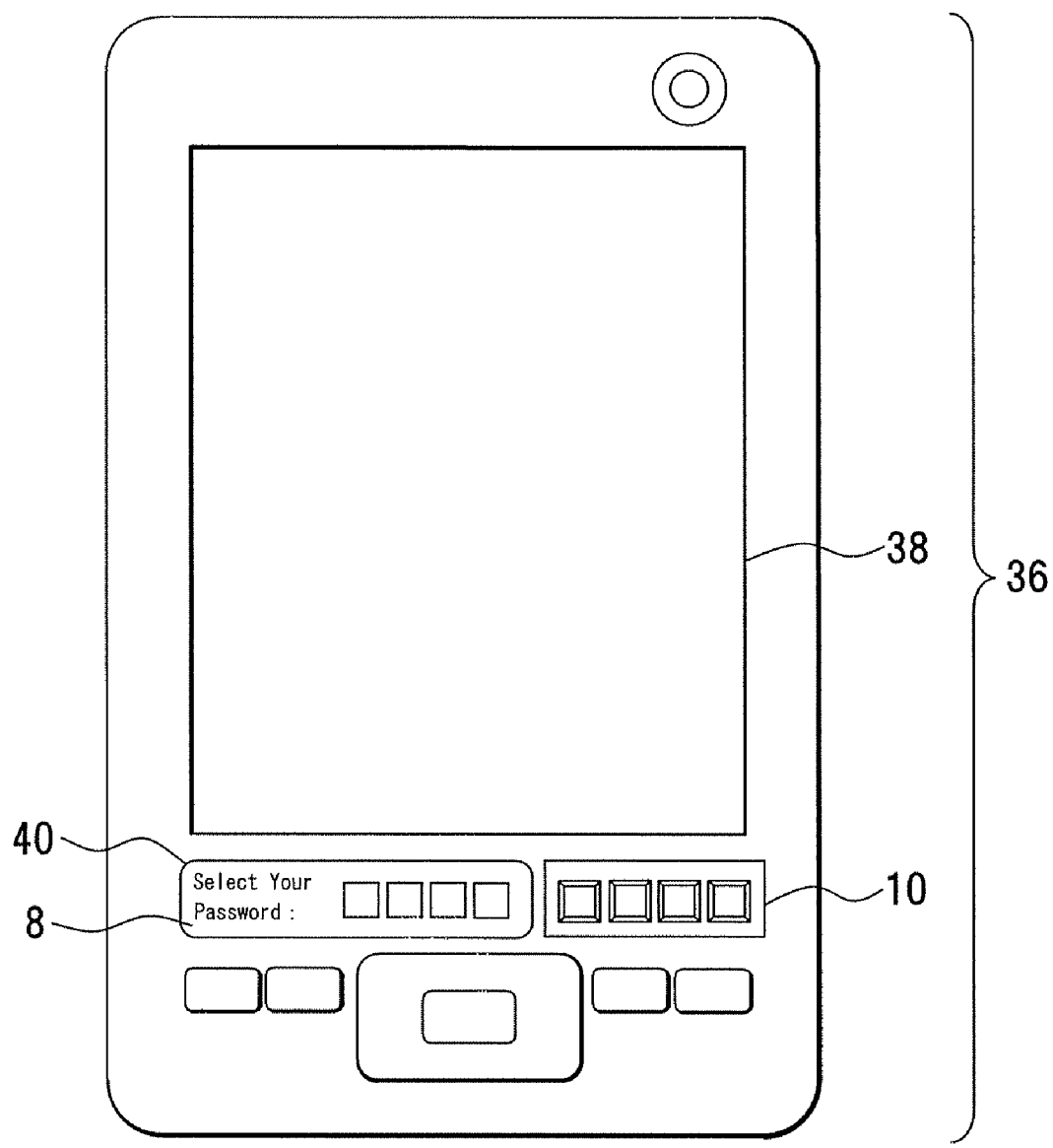
FIG. 39 shows a PDA that is an example of an electronic apparatus using the password input/authentication system.
Figure 40:
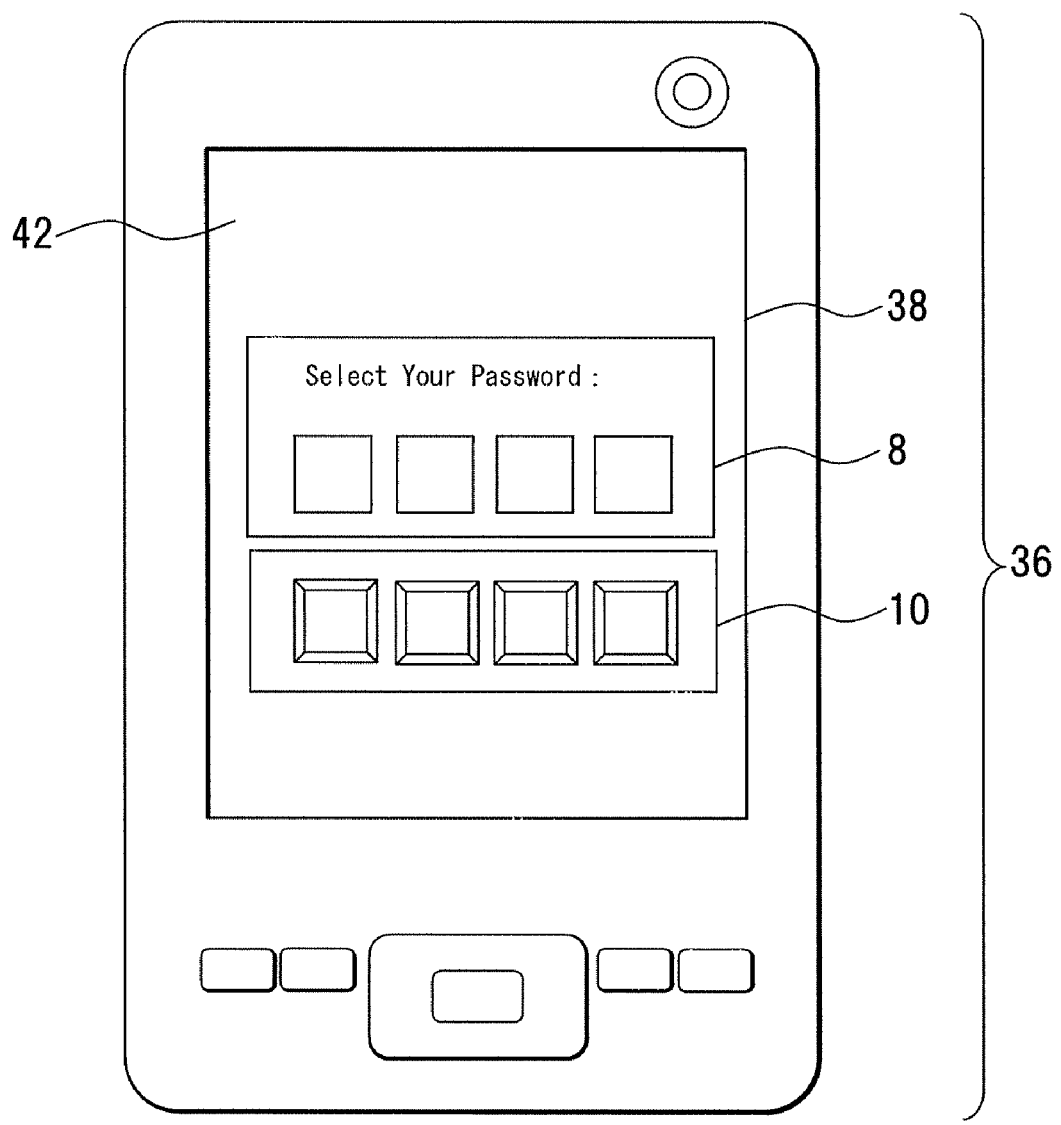
FIG. 40 shows a PDA that is an example of an electronic apparatus using the password input/authentication system.

(3) The password input/authentication system 2 can be used in a personal digital assistant (PDA) 36 as shown in FIG. 39. In this case, a sub-display 40 may be formed adjacent to a main display 38 on the PDA 36 and this sub-display 40 may constitute the displaying unit 8, or as shown in FIG. 40, a display screen 42 of the main display 38 may display the display positions 81, 82, 83, 84 of the displaying unit 8 and the select buttons 101, 102, 103, 104 of the input unit 10 to input the password as in the case of (1) described above.

Figure 41:
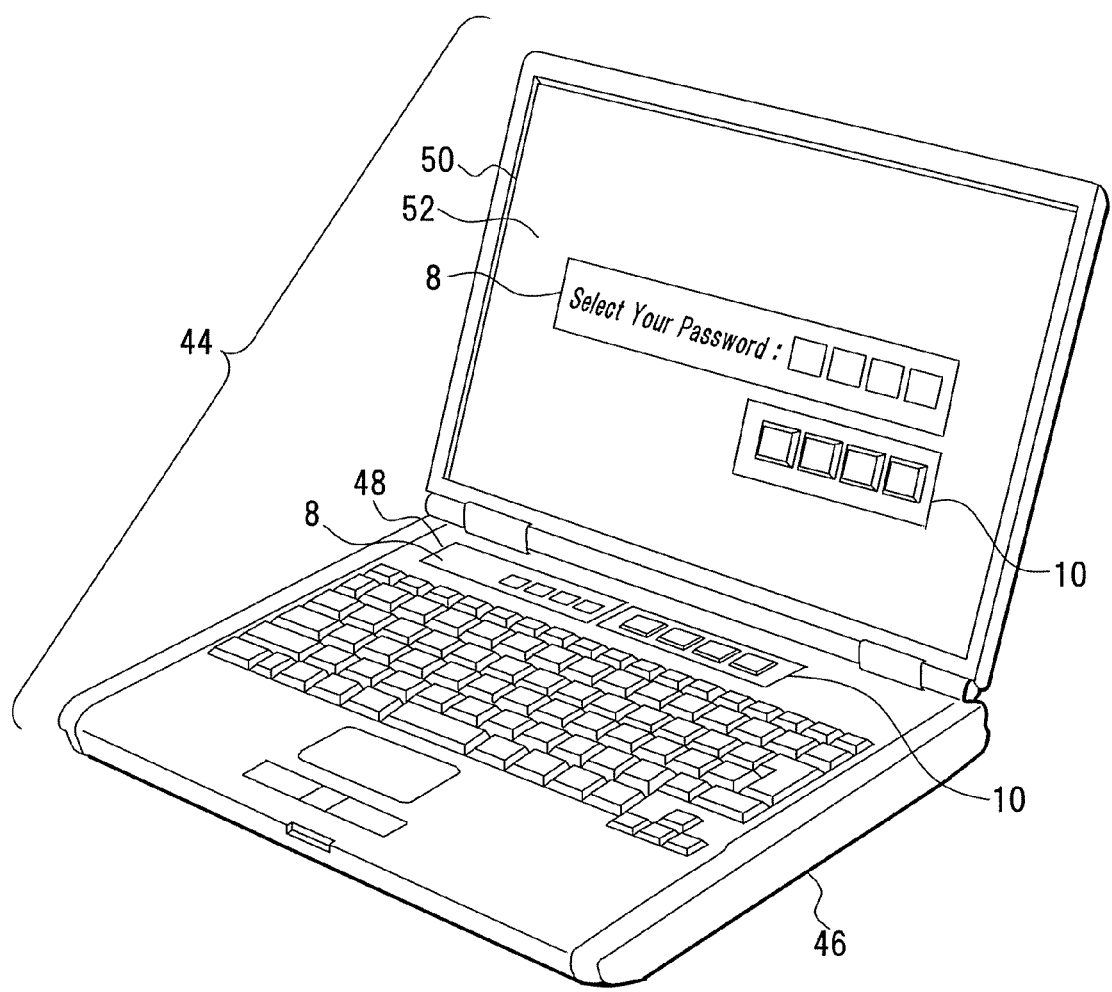
FIG. 41 shows a PC that is an example of an electronic apparatus using the password input/authentication system.

(4) The password input/authentication system 2 can be used in a personal computer (PC) 44 as shown in FIG. 41. In this case, the displaying unit 8 may be constituted by a sub-display 48 on a surface of a main body 46 of the PC 44, and the select buttons 101, 102, 103, 104 of the input unit 10 may be set at the side of the displaying unit 8. A display screen 52 of a main display 50 of the PC 44 may display the display positions 81, 82, 83, 84 of the displaying unit 8 and the select buttons 101, 102, 103, 104 of the input unit 10 to input the password. In such a configuration, the password can be inputted from the input unit 10 of the main body 46 when turning on power, and the aforementioned password input and authentication can be used when an application program is launched after starting the operation.

(5) Although description has been made by illustrating a four-digit password in above embodiments, the present invention can be used for inputting a five or more digit password or a three or less digit password and is not limited by the digit number.

(6) Although the candidate symbol of the registered password is made appear and displayed when displaying the candidate symbols of the password in above embodiments, a candidate symbol string not included in the registered password may be displayed for a certain time and the displayed symbol string may be updated every time the certain time has elapsed to enable the input from the select button, and the present invention is not limited to including the registered candidate symbol of the password into the displayed symbol string.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

In various electronic apparatuses, etc. using the password input, the present invention can contribute to simplification and acceleration of the password input and is useful.

What is claimed is:

1. An electronic apparatus that accepts password input, comprising:
   a displaying unit that includes a plurality of display positions, the display positions displaying a symbol string of a plurality of digits, and displays candidate symbols for inputting a password at each of the display positions;
   an input unit that includes a plurality of select buttons corresponding to the display positions of the displaying unit, and selects the candidate symbols by each operation of the select buttons corresponding to the candidate symbols displayed on the display positions; and
   a processing unit that generates a plurality of the candidate symbols to display the generated candidate symbols at the display positions of the displaying unit randomly, and invalidates the operation of at least one of the select buttons of the input unit,
   wherein the processing unit ignores the operation of the select button, the operation of which is invalidated, accepts selection of the candidate symbols by the operation of the select buttons, the operation of which is not invalidated, defines the candidate symbols which are accepted as an input password, and determines whether the input password is correct or not.

2. The electronic apparatus of claim 1, further comprising:
   a random-number generating unit that generates random numbers; and
   a database that stores the candidate symbols of the password,
   wherein, using the random numbers acquired from the random-number generating unit, the processing unit acquires the candidate symbols from the database and displays the candidate symbols at the display positions of the displaying unit.

3. The electronic apparatus of claim 1, wherein
   the processing unit sets a display permission permitting a scenario in which none of the candidate symbols displayed at the display positions correspond to a character of the password.

4. The electronic apparatus of claim 1, further comprising:
   a second display unit that displays a dialogue display screen for setting invalidation based on pressing down of the select button, selection of at least one of the select buttons where the invalidation is set, permission to display with not including a candidate character applicable to the password at the display positions, or permission to display the candidate character applicable to the password at the display position corresponding to the select button where the invalidation is set, or any combination thereof.

5. The electronic apparatus of claim 1, wherein
   the processing unit sets a select button selected from the select buttons of the input unit to the select button, the operation of which is invalidated.

6. The electronic apparatus of claim 1, wherein
   the processing unit sets permission to display the candidate symbol applicable to the password at the display position corresponding to the select button, operation of which is invalidated, so as to display the candidate symbol at the display position.

7. The electronic apparatus of claim 1, wherein
   the operation of the select button is to press down the select button, and
   the processing unit selects a setting for invalidating pressing down of the select button and a setting for permitting display of the candidate symbol applicable to the password at the display position corresponding to the select button, the operation of which is invalidated, so as to make it possible to set prioritization of the settings.

8. The electronic apparatus of claim 1, wherein
   the processing unit sets input of a candidate symbol not applicable to the password after completion of input of the password.

9. The electronic apparatus of claim 1,
   wherein the displaying unit is constituted of a portion of a main display or a sub-display, the main display or the sub-display being installed in the electronic apparatus.

10. The electronic apparatus of claim 1,
    wherein the displaying unit is constituted of images on a display screen.

11. The electronic apparatus of claim 1,
    wherein the select buttons are constituted of images on a display screen.

12. The electronic apparatus of claim 1,
    wherein the candidate symbols include characters or graphics.

13. A non-transitory computer-readable recording medium storing a password input program, the program causing a computer to perform a method, the method comprising:
    generating a plurality of candidate symbols for inputting a password;
    displaying the generated candidate symbols at a plurality of display positions randomly;
    invalidating operation of at least one of a plurality of select buttons corresponding to the display positions;
    ignoring the operation of the select button, the operation of which is invalidated;
    accepting selection of the candidate symbols by the operation of the select buttons, the operation of which is not invalidated; and
    defining the candidate symbols which are accepted as an input password, and determining whether the input password is correct or not.

14. The recording medium of claim 13, the method further comprising:
  generating random numbers; and
  using the random numbers to acquire the candidate symbols of the password stored in a database.

15. The recording medium of claim 13, the method further comprising:
  setting a display permission permitting a scenario in which none of the candidate symbols displayed at the display positions correspond to a character of the password.

16. The recording medium of claim 13, the method further comprising:
  displaying a dialogue display screen for setting invalidation based on pressing down of the select button, selection of at least one of the select buttons where the invalidation is set, permission to display with not including a candidate character applicable to the password at the display positions, or permission to display the candidate character applicable to the password at the display position corresponding to the select button where the invalidation is set, or any combination thereof.

17. The recording medium of claim 13, the method further comprising:
  setting permission to display the candidate symbol applicable to the password at the display position corresponding to the select button, the operation of which is invalidated.

18. The recording medium of claim 13, wherein the operation of the select button is to press down the select button, the method further comprising:
  selecting a setting for invalidating pressing down of the select button and a setting for permitting display of the candidate symbol applicable to the password at the display position corresponding to the select button, the operation of which is invalidated; and
  setting prioritization of the settings.

19. The recording medium of claim 13, the method further comprising:
  setting input of a candidate symbol not applicable to the password after completion of input of the password.

20. The recording medium of claim 13, the method further comprising generating the display positions on images on a display screen.

21. The recording medium of claim 13, the method further comprising taking in one of the candidate symbols at one of the display positions with one of the select buttons selected.

22. The recording medium of claim 13, the method further comprising generating the select buttons on images on a display screen.

* * * * *